United States Patent
Mello

(10) Patent No.: US 9,732,525 B1
(45) Date of Patent: Aug. 15, 2017

(54) METHOD AND APPARATUS FOR MANUFACTURING BUILDING PANELS

(71) Applicant: Bryan Scott Mello, Cincinnati, OH (US)

(72) Inventor: Bryan Scott Mello, Cincinnati, OH (US)

(*) Notice: Subject to any disclaimer, the term of this patent is extended or adjusted under 35 U.S.C. 154(b) by 0 days.

(21) Appl. No.: 15/254,843

(22) Filed: Sep. 1, 2016

(51) Int. Cl.
 *E04B 1/38* (2006.01)
 *E04C 1/40* (2006.01)
 (Continued)

(52) U.S. Cl.
 CPC .............. *E04C 2/521* (2013.01); *B29C 44/10* (2013.01); *B29C 44/186* (2013.01); *B29C 65/48* (2013.01); *E04B 2/02* (2013.01); *E04B 2/562* (2013.01); *E04C 2/284* (2013.01); *E04C 2/46* (2013.01); *E04C 2/526* (2013.01); *E04C 3/29* (2013.01);
 (Continued)

(58) Field of Classification Search
 CPC ...... E04C 2/386; E04B 1/7604; E04B 1/7608; E04B 7/22; E04B 2/54; E04B 5/26; D06N 3/14; D06N 7/0002; E04H 9/10; B29C 44/186; B29C 44/187; E04F 21/085
 USPC ..... 52/745.16, 741.13, 745.06, 309.4, 742.1, 52/784.15, 309.1, 784.14, 309.14, 309.15, 52/309.13, 483.1, 475.1, 508, 506.01; 156/71
 See application file for complete search history.

(56) References Cited

U.S. PATENT DOCUMENTS 3,259,175 A   7/1966  Kraus et al.
3,641,724 A * 2/1972  Palmer ................... E04C 2/386
                                                       156/78
(Continued)

FOREIGN PATENT DOCUMENTS

CA    2660456 A1    2/2007
WO    2007021497 A2 2/2007
WO    2007021867 A1 2/2007

OTHER PUBLICATIONS

Barricade Building Products, Division of Specialty Coating and Laminating, LLC; ICC-ES Report (ESR-1197); R-Wrap® Protective House Wrap, Barricade® Building Wrap, Marvelguard® House Wrap, Barricade Plus® Protective House Wrap and Water-Resistive Barriers; Copyright® 2016 ICC Evaluation Service, LLC; pp. 1-4.

(Continued)

*Primary Examiner* — Chi Q Nguyen
(74) *Attorney, Agent, or Firm* — Hasse & Nesbitt LLC; Daniel F. Nesbitt

(57) ABSTRACT

A method of manufacturing building panels includes assembling a frame of a building panel. The frame defines at least one cavity and at least one injection aperture in fluid communication with the at least one cavity. The method also includes positioning the frame on one of a base and a shelf of a multi-panel consolidation device having a plurality of shelves, with the shelves being in an expanded configuration, and at least substantially enclosing the at least one cavity. The method also includes forcing the shelves of the multi-panel consolidation device into a collapsed configuration, and injecting an expandable polymer through the at least one injection aperture into the at least one cavity. The method further includes forcing the shelves into an (Continued)

expanded configuration after a predetermined period of time selected to permit the expandable polymer to form a foam bonded to the frame.

20 Claims, 62 Drawing Sheets

(51) Int. Cl.

| | |
|---|---|
| E04C 2/52 | (2006.01) |
| E04B 2/00 | (2006.01) |
| E04C 2/284 | (2006.01) |
| E04C 3/29 | (2006.01) |
| E04B 2/56 | (2006.01) |
| E04B 2/02 | (2006.01) |
| B29C 44/10 | (2006.01) |
| B29C 44/18 | (2006.01) |
| B29C 65/48 | (2006.01) |
| B29K 75/00 | (2006.01) |
| B29K 105/04 | (2006.01) |
| B29L 31/10 | (2006.01) |
| E04H 9/10 | (2006.01) |
| E04B 5/26 | (2006.01) |
| E04C 2/38 | (2006.01) |
| E04B 2/54 | (2006.01) |
| E04B 1/76 | (2006.01) |
| E04F 21/08 | (2006.01) |
| E04B 7/22 | (2006.01) |
| D06N 7/00 | (2006.01) |
| D06N 3/14 | (2006.01) |

(52) U.S. Cl.
CPC ........ *B29C 44/187* (2013.01); *B29K 2075/00* (2013.01); *B29K 2105/04* (2013.01); *B29L 2031/10* (2013.01); *D06N 3/14* (2013.01); *D06N 7/0002* (2013.01); *E04B 1/7604* (2013.01); *E04B 1/7608* (2013.01); *E04B 2/54* (2013.01); *E04B 5/26* (2013.01); *E04B 7/22* (2013.01); *E04B 2002/0293* (2013.01); *E04B 2002/0295* (2013.01); *E04C 2/386* (2013.01); *E04F 21/085* (2013.01); *E04H 9/10* (2013.01); *Y10T 428/233* (2015.01)

(56) References Cited

U.S. PATENT DOCUMENTS

| | | | |
|---|---|---|---|
| 3,697,633 A * | 10/1972 | Edgar | B29C 44/1271 156/245 |
| 3,885,008 A | 5/1975 | Martin | |
| 4,185,437 A | 1/1980 | Robinson | |
| 4,246,214 A | 1/1981 | Osswald et al. | |
| 4,260,569 A * | 4/1981 | Hurst | B29C 44/1228 264/45.4 |
| 4,345,888 A | 8/1982 | Brunemann | |
| 4,649,682 A | 3/1987 | Barrett, Jr. | |
| 5,765,330 A * | 6/1998 | Richard | E04C 2/386 52/265 |
| 6,196,830 B1 | 3/2001 | Foltuz et al. | |
| 6,279,289 B1 | 8/2001 | Soder et al. | |
| 6,824,851 B1 * | 11/2004 | Locher | B29C 70/086 156/250 |
| 6,846,445 B2 | 1/2005 | Kim et al. | |
| 7,621,101 B2 | 11/2009 | Solomon et al. | |
| 7,836,663 B2 | 11/2010 | Solomon et al. | |
| 8,567,153 B1 * | 10/2013 | Francavilla | E04C 2/06 52/251 |
| 8,925,270 B2 * | 1/2015 | Grisolia | E04B 2/00 52/309.1 |
| 2004/0261356 A1 * | 12/2004 | Wrass | E04B 7/22 52/782.1 |
| 2005/0055973 A1 * | 3/2005 | Hagen, Jr. | E04B 1/7604 52/741.1 |
| 2005/0188649 A1 * | 9/2005 | Hagen, Jr. | B29C 44/186 52/782.1 |
| 2009/0178354 A1 | 7/2009 | Solomon et al. | |
| 2009/0216503 A1 | 8/2009 | Ossmann | |
| 2011/0302877 A1 * | 12/2011 | Gilgan | E04C 2/386 52/742.13 |
| 2013/0037984 A1 * | 2/2013 | Arnauts | B29C 44/1228 264/46.6 |
| 2013/0224434 A1 | 8/2013 | Hatanaka et al. | |
| 2014/0115989 A1 * | 5/2014 | Sievers | E04C 2/386 52/302.1 |

OTHER PUBLICATIONS

3M™; 2-Component Spray Polyurethane Foam Insulation SFI-175; Jul. 2013; 3M is a trademark of 3M Company Copyright® 2013; pp. 1-3.
3M™ Refillable Spray Foam Insulation System; 3M SFI-175 Product & Equipment Options; 3M is a trademark of 3M Copyright® 2012; pp. 1-2.

* cited by examiner

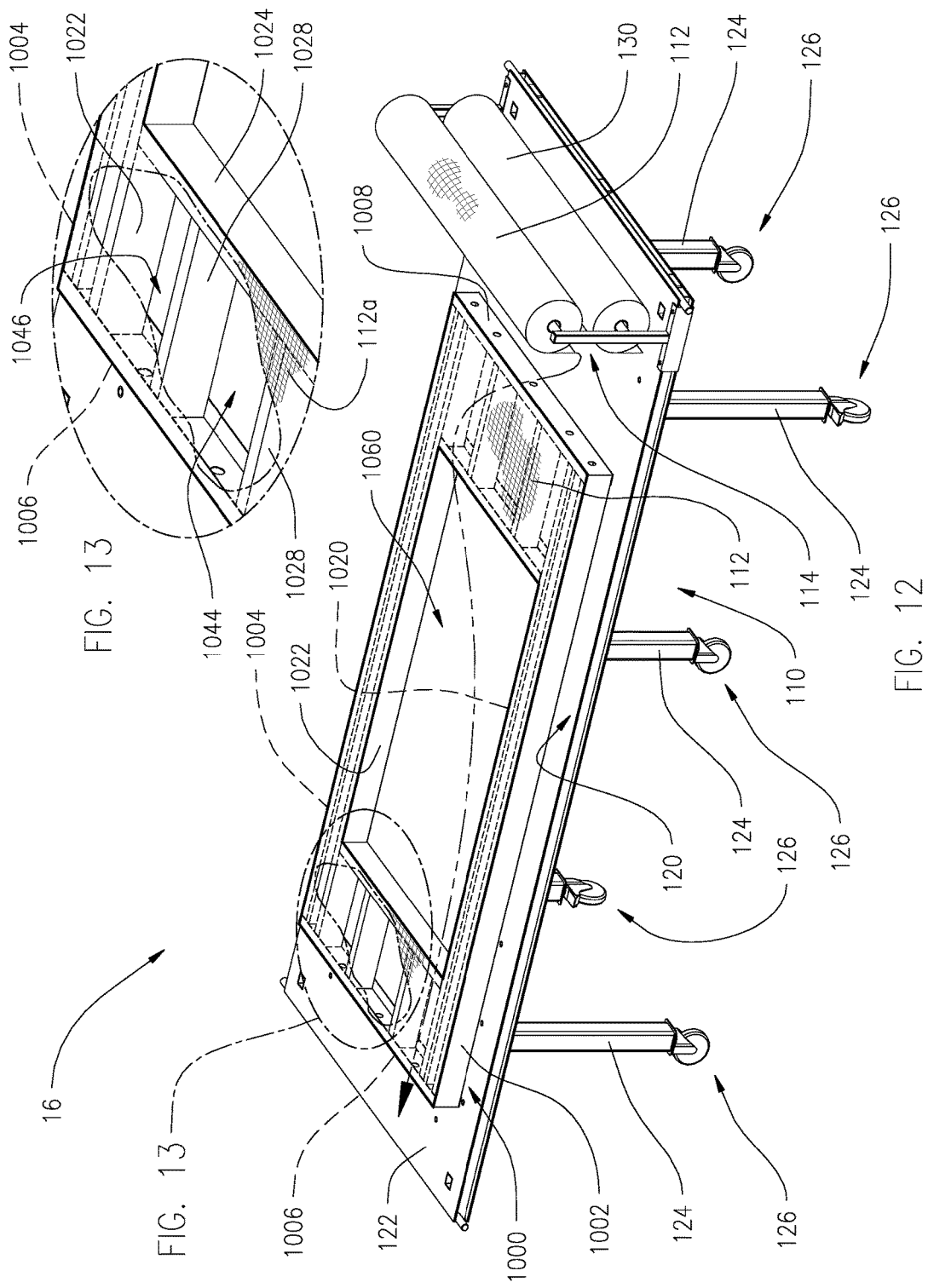

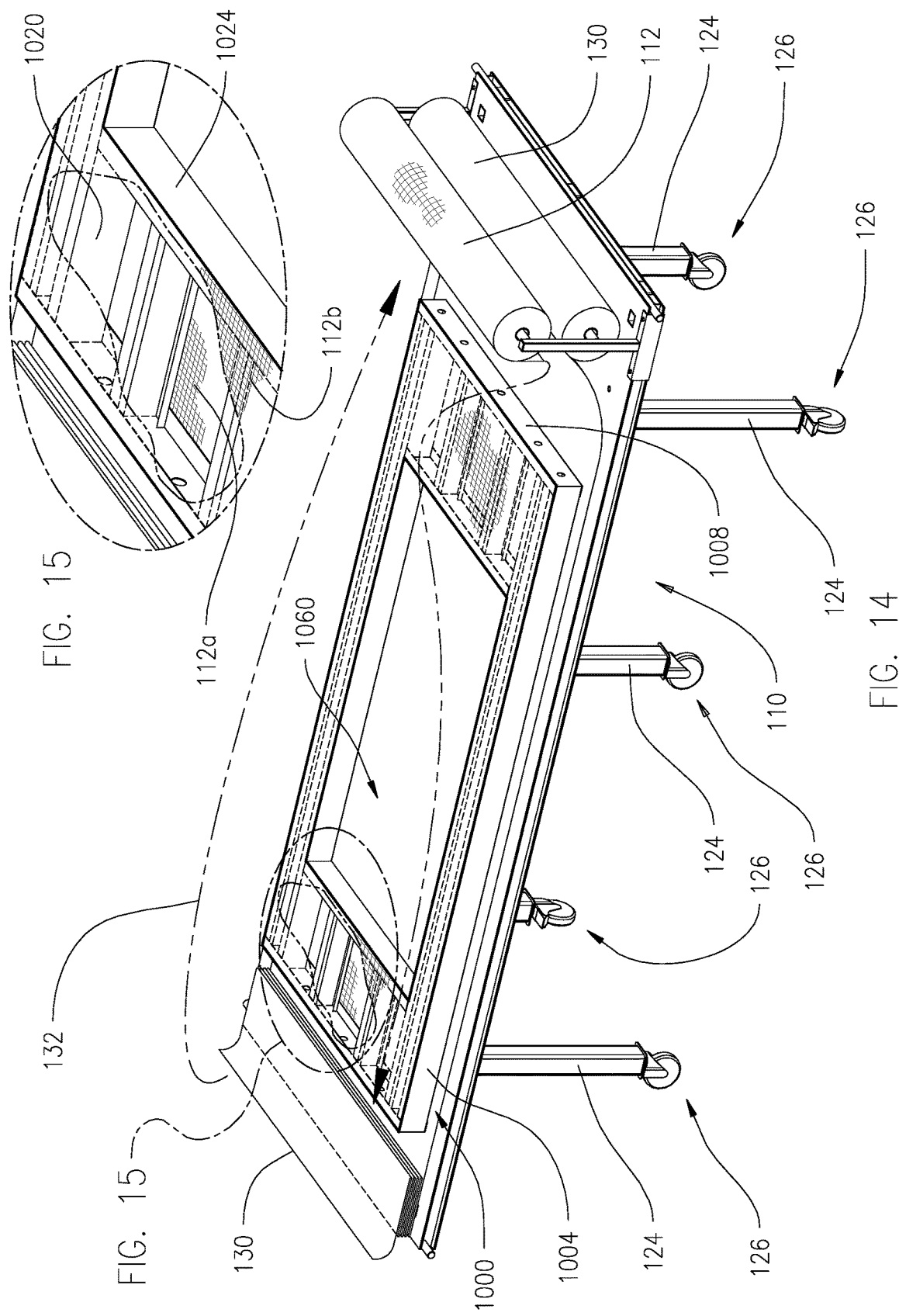

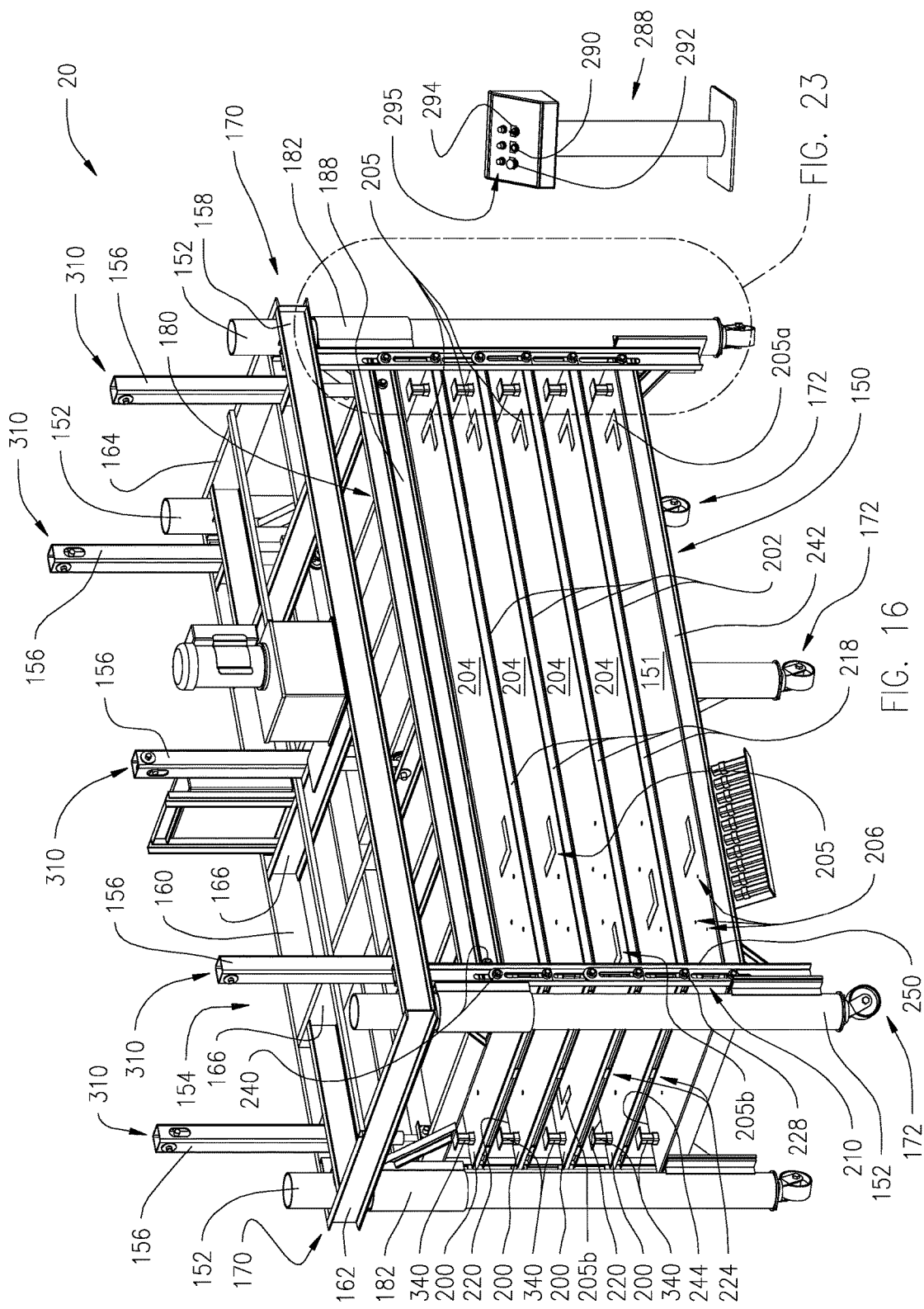

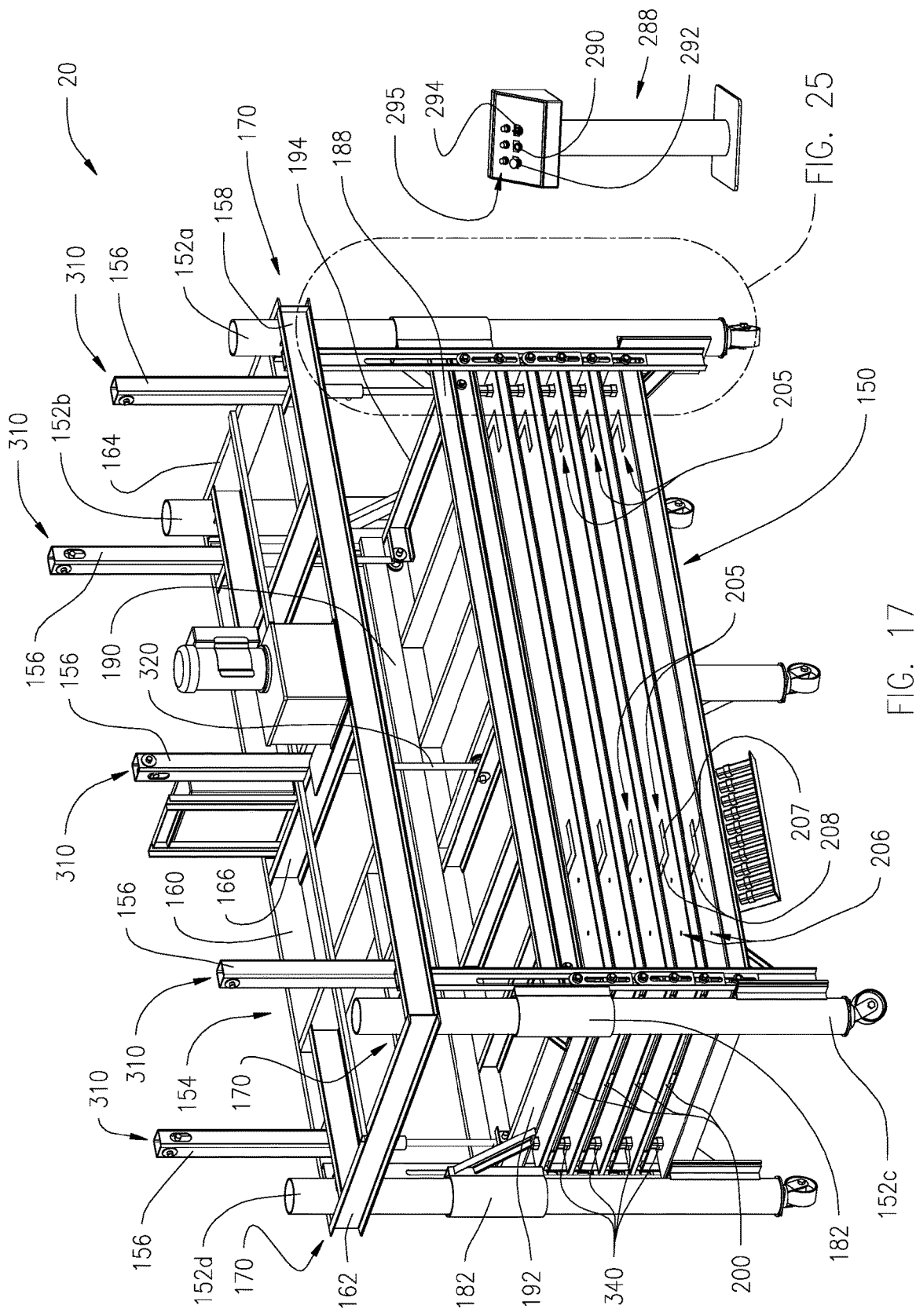

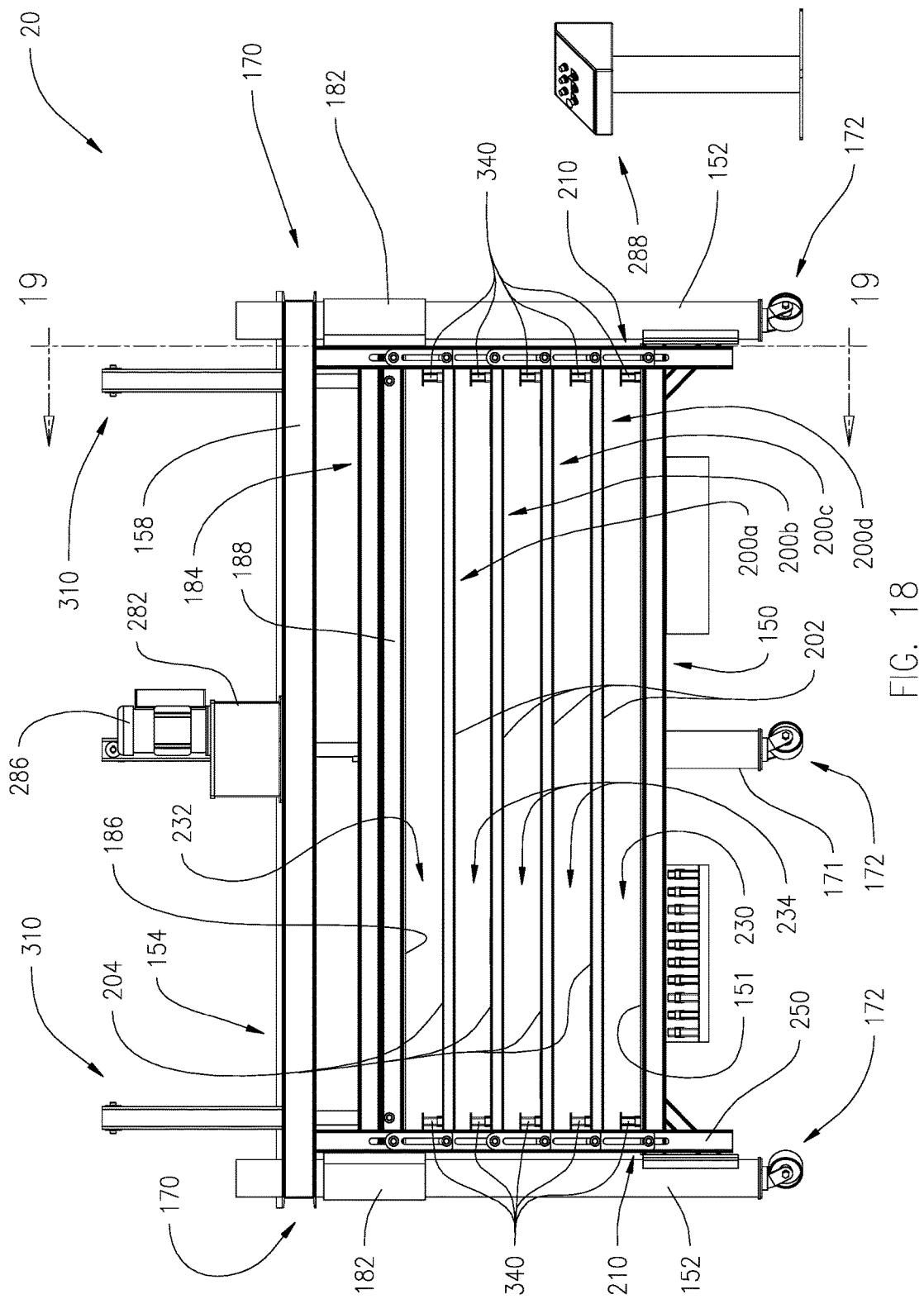

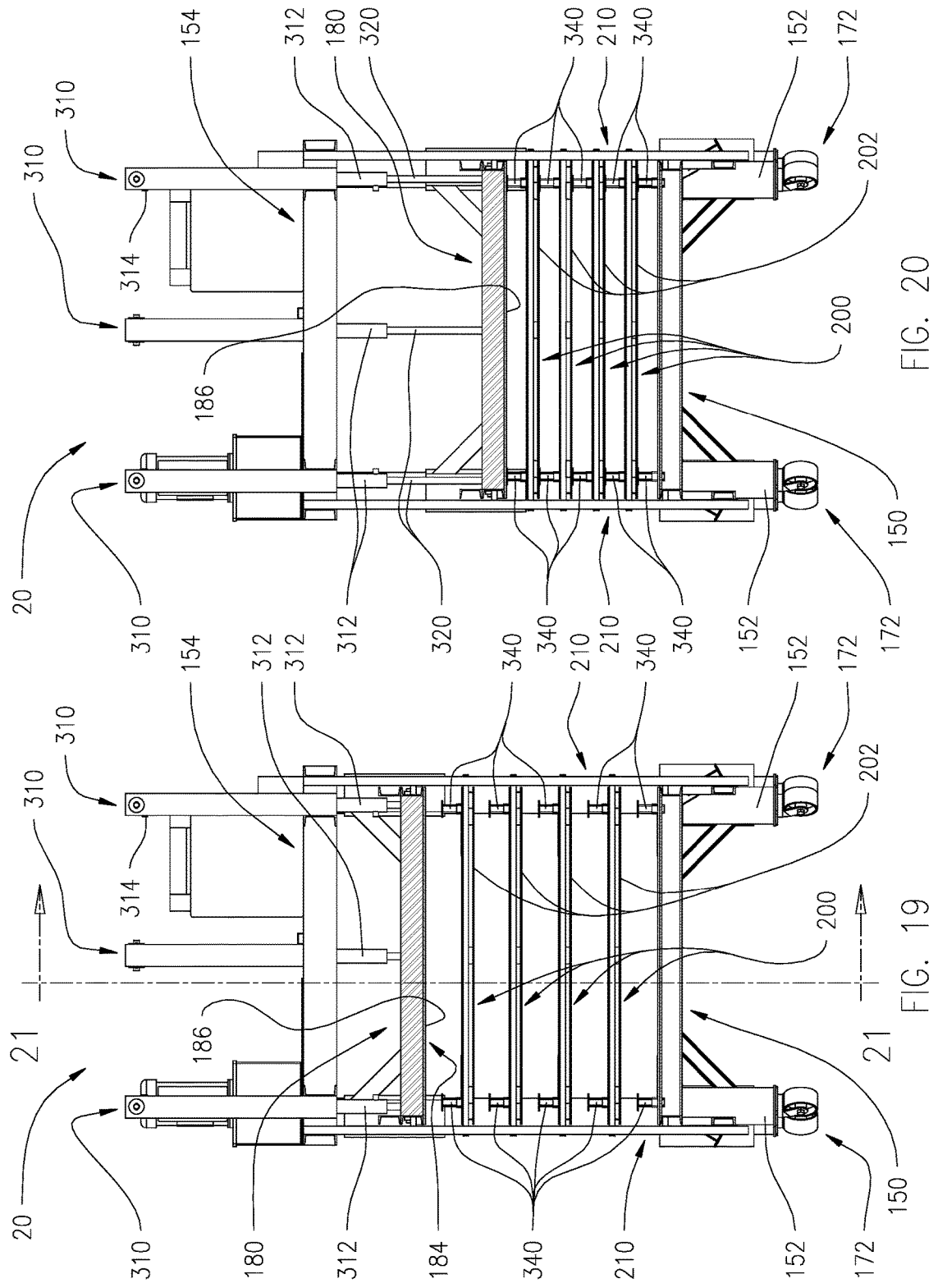

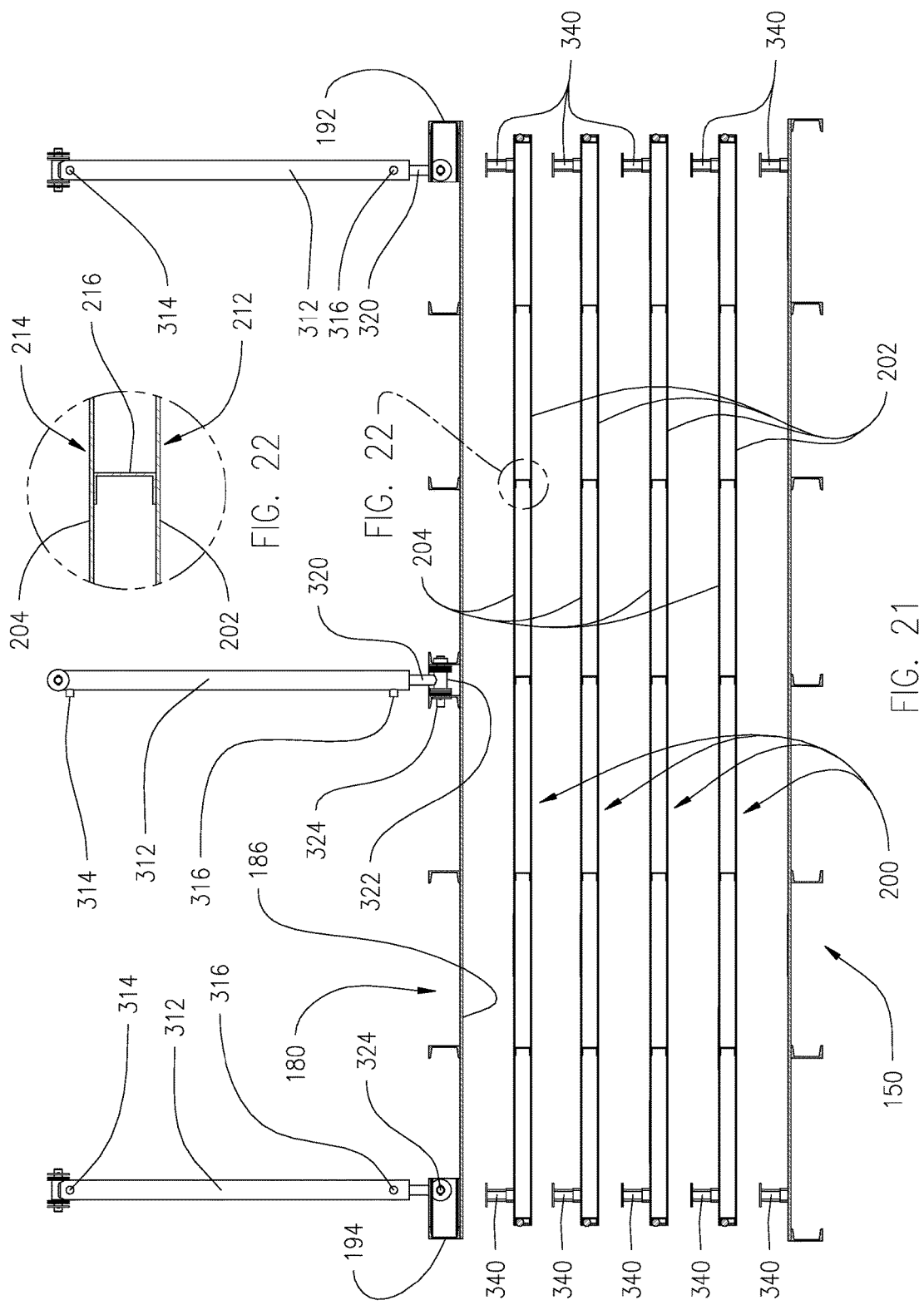

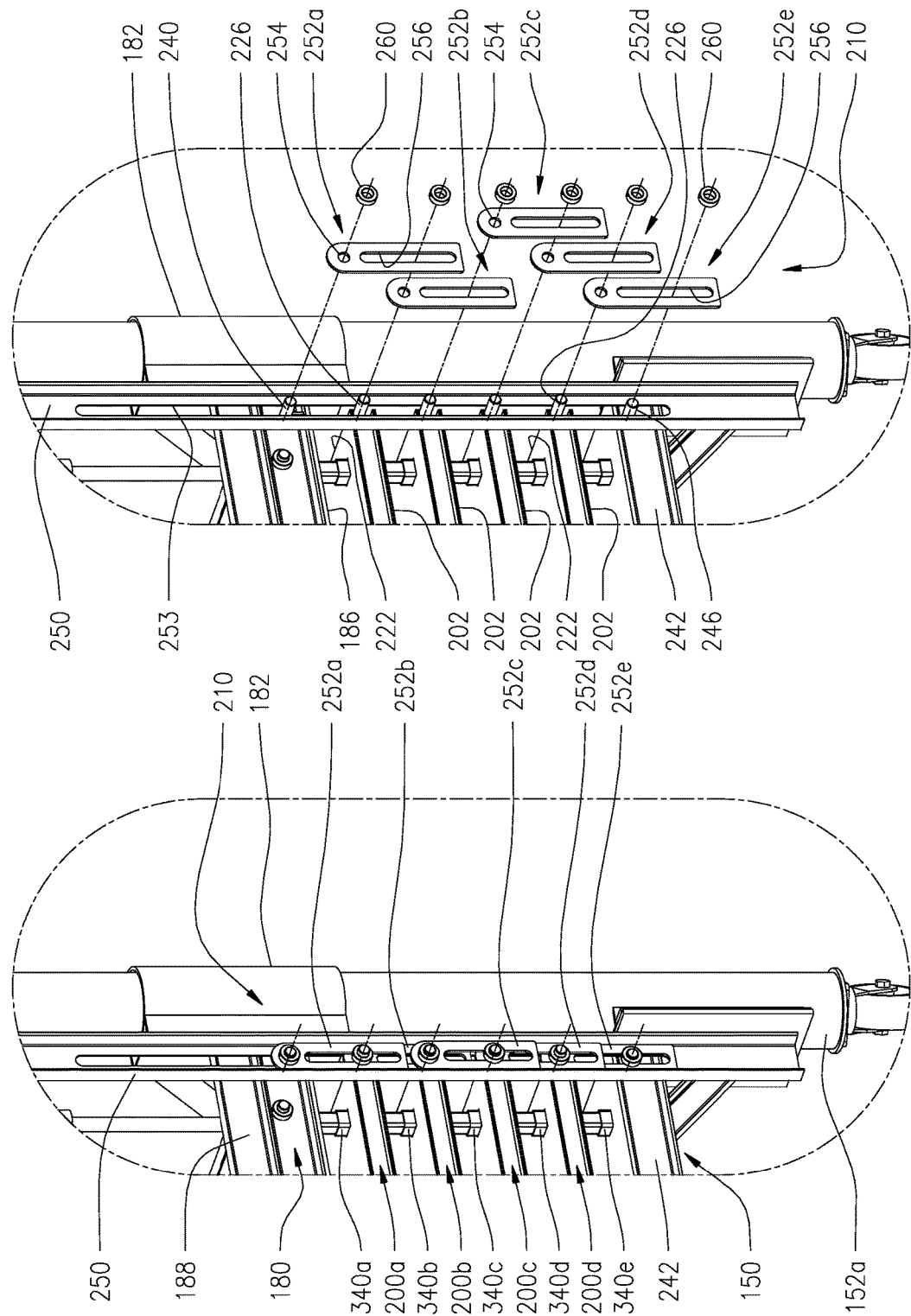

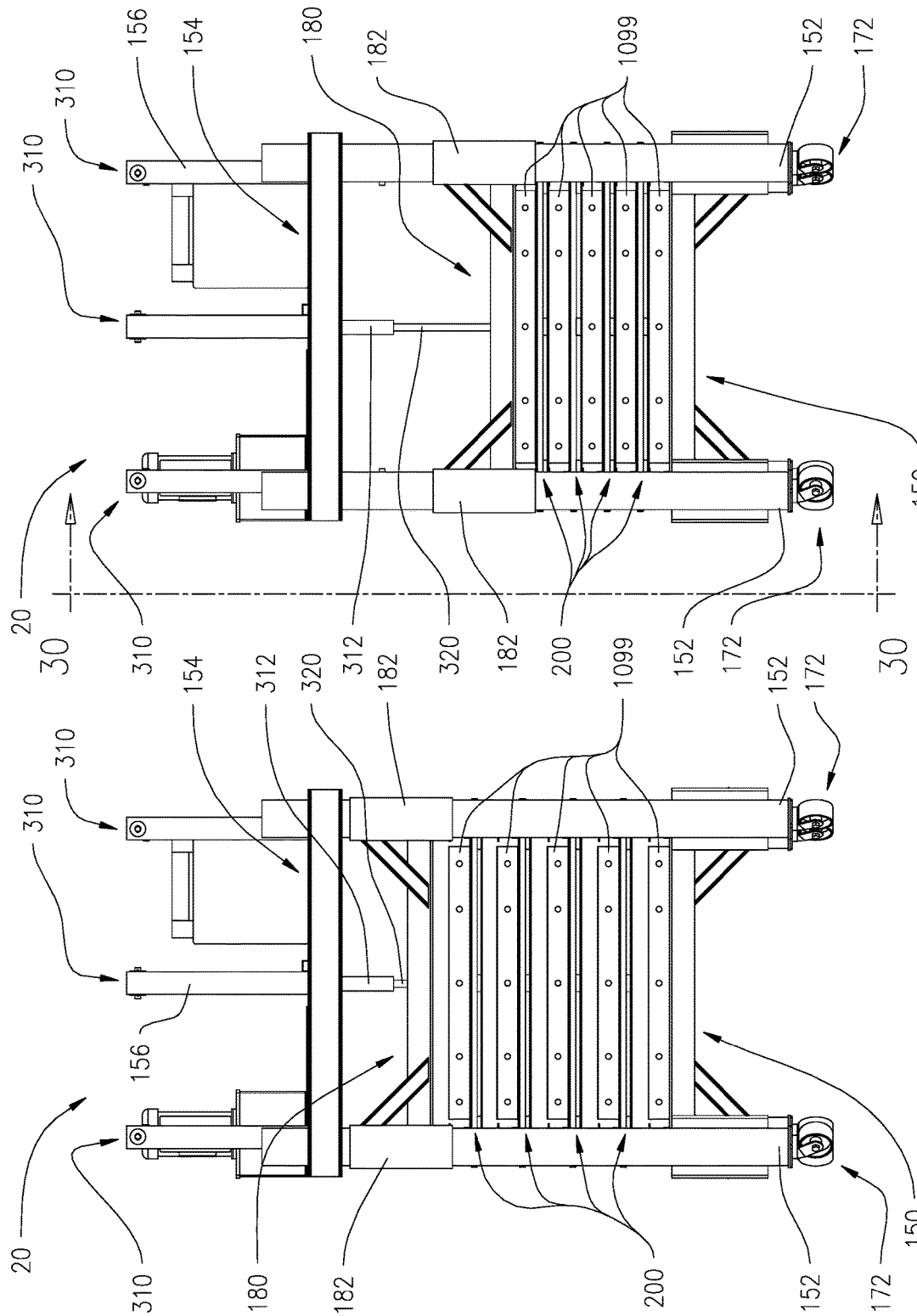

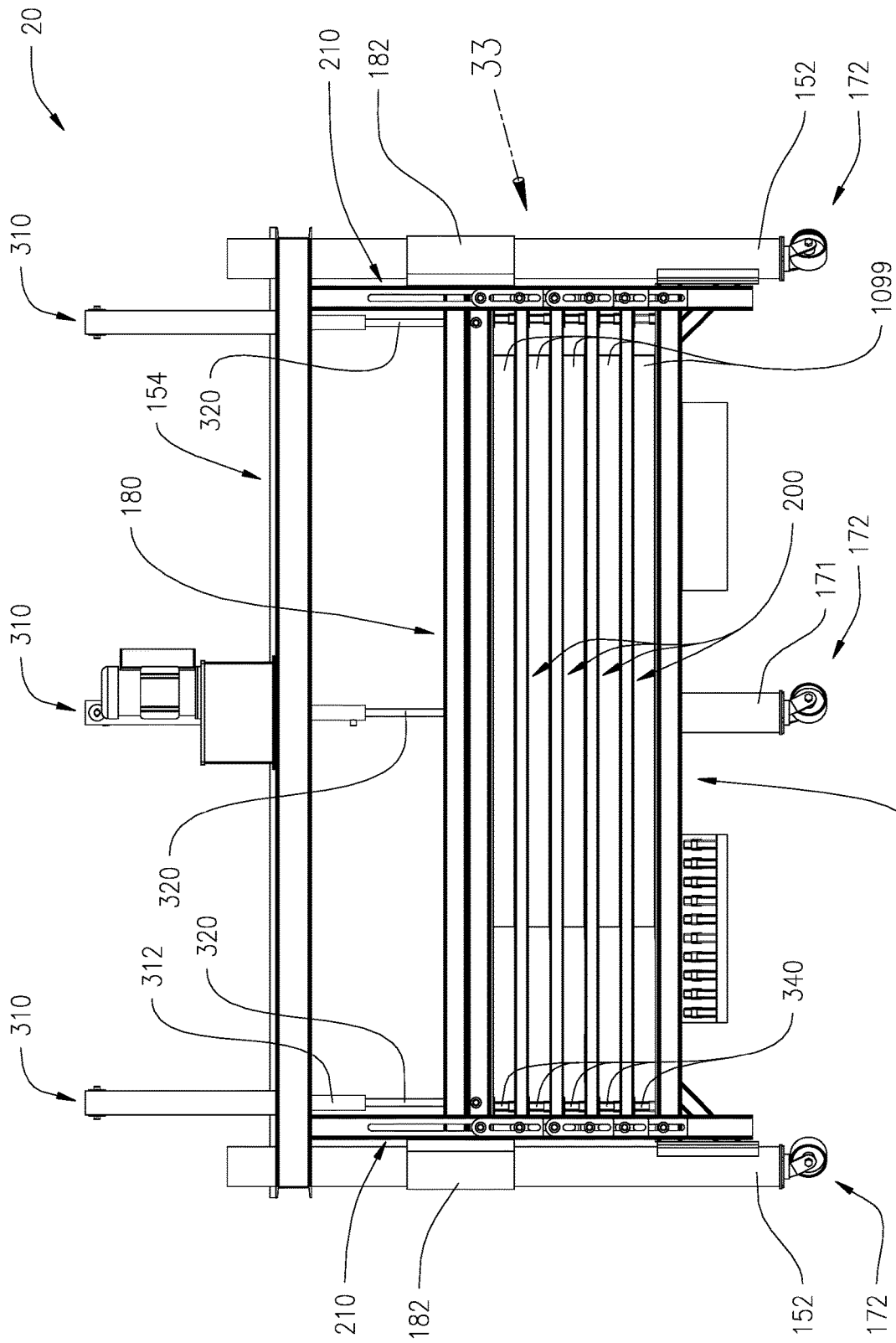

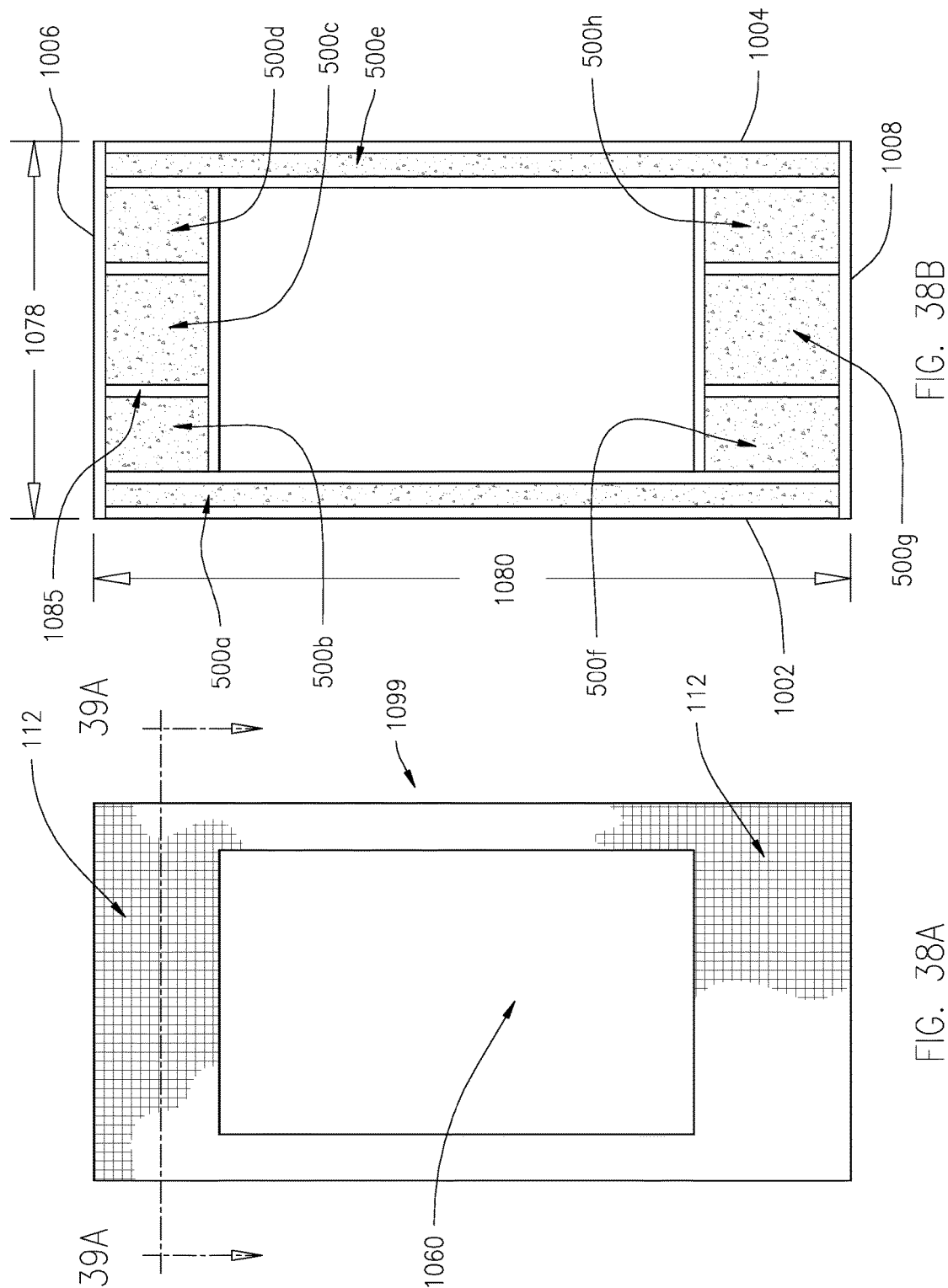

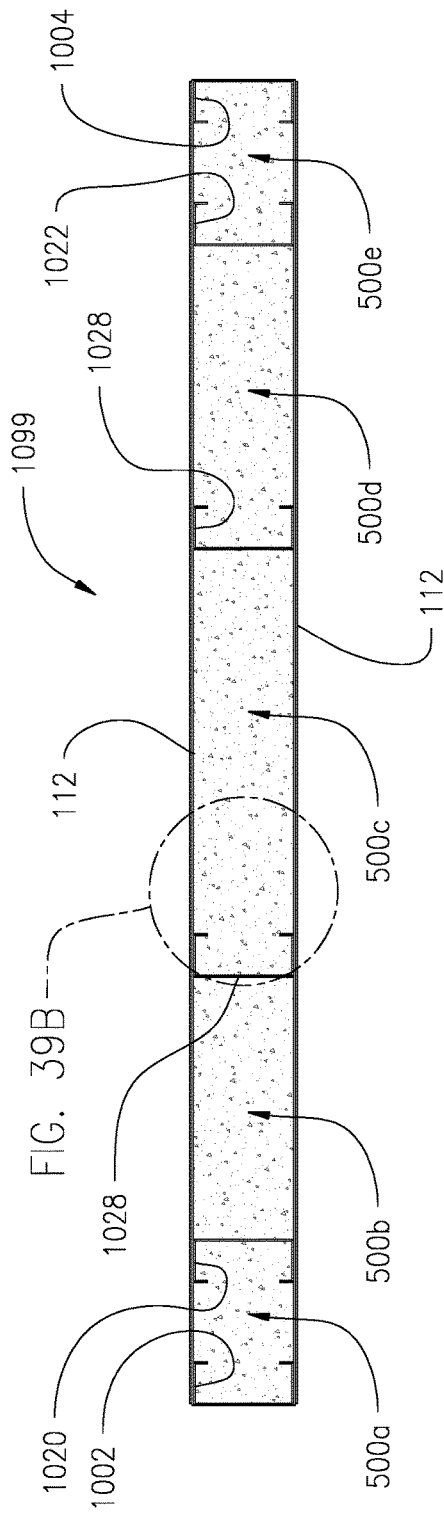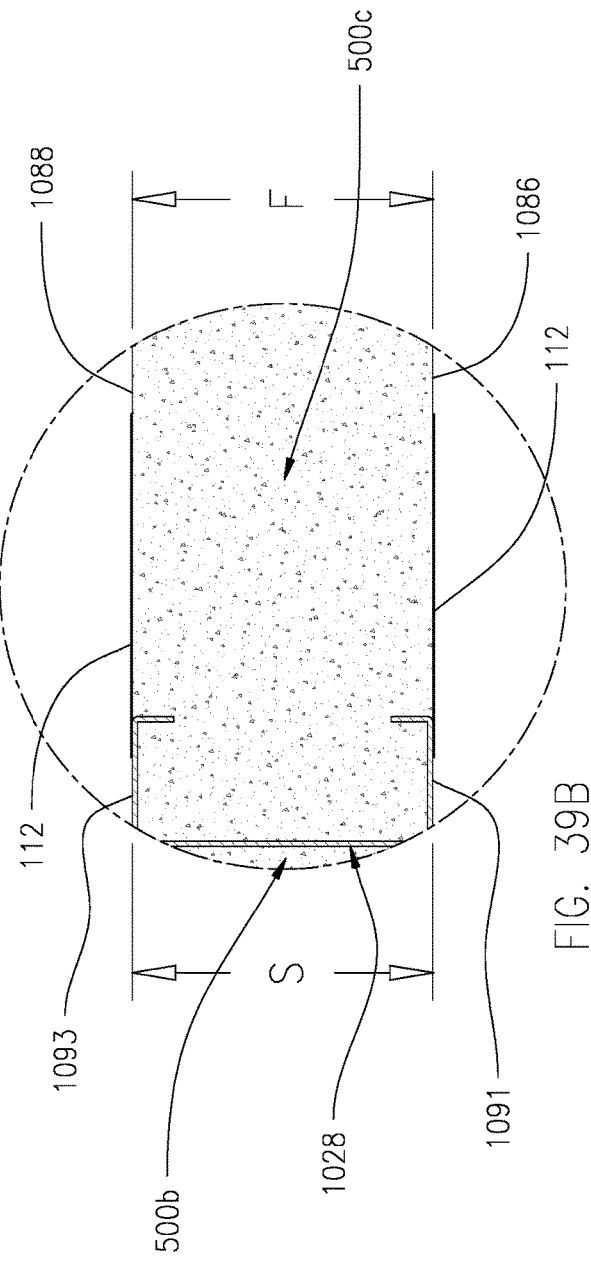
FIG. 39A
FIG. 39B

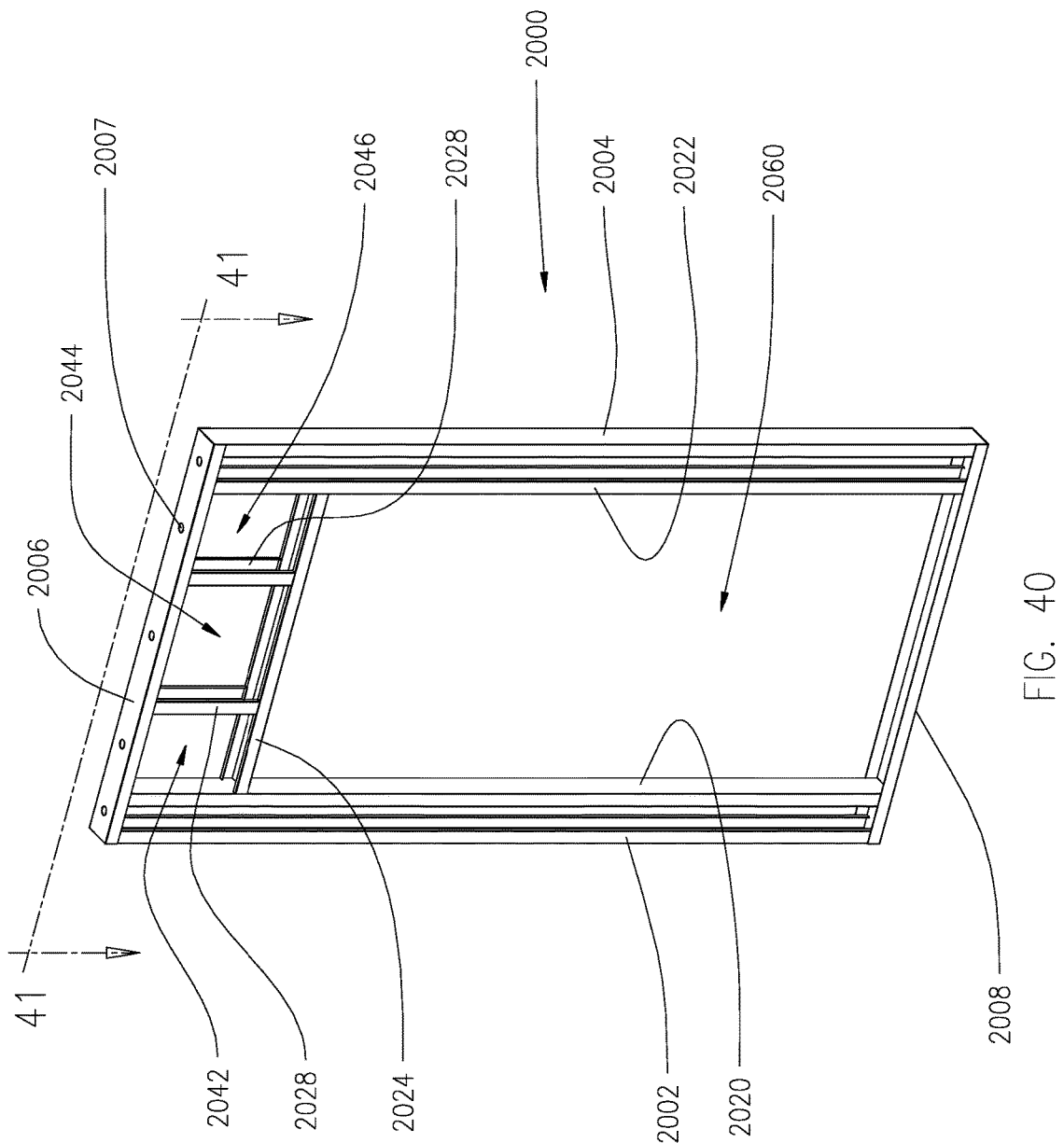

METHOD AND APPARATUS FOR MANUFACTURING BUILDING PANELS

TECHNICAL FIELD

This application relates generally to the manufacture of panels, and more particularly, to a method and apparatus for manufacturing building panels.

BACKGROUND

Building panels are known that include a peripheral frame and a foam that is formed at least within the peripheral frame and is bonded to the frame. The peripheral frame includes top and bottom horizontal stud members, and left and right vertical stud members, which are connected to each of the top and bottom horizontal stud members. The materials of construction for the stud members include metal, wood and plastic. Known materials for the foam include thermoplastic and thermoset materials. Known building panels of this type include those having a fiber reinforced layer applied to an exterior surface of the building panel.

SUMMARY OF THE INVENTION

According to one embodiment, a method of manufacturing building panels includes assembling a frame of a building panel. The frame defines at least one cavity and at least one injection aperture in fluid communication with the at least one cavity. The method also includes positioning the frame on one of a base and a shelf of a multi-panel consolidation device, which includes a plurality of shelves, with the shelves being in an expanded configuration. The method further includes forcing the shelves of the multi-panel consolidation device into a collapsed configuration, and injecting an expandable polymer through the at least one injection aperture into the at least one cavity. The method also includes forcing the shelves of the multi-panel consolidation device into an expanded configuration after a predetermined period of time selected to permit the expandable polymer to form a stable expanded foam within the at least one cavity and bonded to the frame. The forcing the shelves of the multi-panel consolidation device into the collapsed configuration includes applying a compressive force to the frame and constraining expansion of the expandable polymer.

According to one embodiment, a method for making a foam-filled building panel, includes: providing a frame having a front frame surface and a rear frame surface, the frame defining a cavity, the front frame surface defining a front opening and the rear frame surface defining a rear opening; placing a top planar shelf over and in contact with the front frame surface to close the front opening, and a bottom planar shelf over and in contact with the rear frame surface to close the rear frame opening; applying a force against the top planar shelf, and applying a force against the bottom planar shelf; injecting an amount of an expandable polymer through an aperture in the frame, and closing the aperture; maintaining the applied forces for a time sufficient for the expandable polymer to expand and fill the cavity, and to form a stable expanded foam; and releasing the forces and removing the top and bottom planar shelves from the front and rear frame surfaces to form the foam-filled building panel. The force can be sufficient to maintain the top and bottom planar shelves in contact with the front and rear frame surfaces of the frame while the expandable polymer is expanding and filling the cavity. The top planar shelf and the bottom planar shelf can have a rigidity sufficient to maintain planarity against the applied force and an expanding force of the expandable polymer.

According to another embodiment, a panel frame assembly fixture includes a base, a first side frame, a second side frame laterally spaced from the first side frame, a first end structure and a second end structure longitudinally spaced from the first end structure. Each of the first side frame, the second side frame, the first end structure and the second end structure is attached to the base and extends upwardly from the base. Each of the first end structure and the second end structure is attached to each of the first side frame and the second side frame. The first side frame includes a first plurality of longitudinally spaced receptacle support members and a first plurality of receptacles. Each of the first plurality of receptacles defines a pocket. At least one of the first plurality of receptacles is attached to each one of the first plurality of receptacle support members. The first plurality of receptacles are arranged to facilitate assembling a plurality of studs and a plurality of tracks of a frame of a building panel on the first side frame.

According to another embodiment, a panel frame assembly fixture includes a base, a first side frame and a second side frame laterally spaced from the first side frame. The panel frame assembly fixture also includes a first end structure and a second end structure longitudinally spaced from the first end structure. The panel frame assembly fixture also includes a pair of tracks, and a trolley. Each of the first side frame and the second side frame is attached to the base and extends upwardly and inwardly from the base. Each of the first end structure and the second end structure is attached to the base and extends upwardly from the base. Each of the first end structure and the second end structure is attached to each one of the first side frame and the second side frame. The base, the first side frame, the second side frame, the first end structure, and the second end structure cooperate to define at least a portion of an interior space. The pair of tracks is attached to each of the first end structure and the second end structure, and is disposed within the interior space. The trolley is translatable along the pair of tracks.

According to another embodiment, a multi-panel consolidation device includes a base and a plurality of posts attached to the base and extending upwardly from the base. The multi-panel consolidation device also includes an upper structure movably coupled with the posts. The upper structure is movable upwardly and downwardly relative to the posts and the base. The multi-panel consolidation device also includes a plurality of shelves and a plurality of link assemblies. The shelves are vertically spaced and are disposed vertically between the base and the upper structure. Each of the link assemblies is connected to the upper structure and each one of the shelves. The shelves are movable upwardly and downwardly relative to the posts and the base, between an expanded configuration and a collapsed configuration.

According to another embodiment, a multi-panel consolidation device includes a base and a plurality of posts attached to the base. The multi-panel consolidation device also includes an upper structure, a plurality of shelves and a plurality of spacers. The upper structure is movably coupled with the posts, and is movable upwardly and downwardly relative to the base and the posts. The shelves are vertically spaced and disposed vertically between the base and the upper structure. The shelves are connected to the upper structure and are interconnected with one another, and are movable upwardly and downwardly relative to the base and the posts, between an expanded configuration and a collapsed configuration. At least some of the spacers are connected to each of the base, an uppermost one of the shelves, and a lower one of each vertically adjacent pair of the shelves. When the shelves are in the expanded configuration, the spacers connected to the base are vertically spaced from a lowermost one of the shelves, the spacers connected to a lower one of each vertically adjacent pair of the shelves are vertically spaced from an upper one of each vertically adjacent pair of the shelves, and the spacers connected to the uppermost one of the shelves are vertically spaced from the upper structure.

According to another embodiment, a building panel includes a frame and a foam. The frame defines a plurality of cavities and a plurality of injection apertures. Each of the cavities is in fluid communication with one of the injection apertures. The foam is disposed within each of the cavities and is bonded to the frame. Each of the injection apertures is configured to facilitate injecting an expandable polymer into a corresponding one of the cavities. The foam within each of the cavities is formed from the expandable polymer within the cavity.

According to another embodiment, a system for manufacturing building panels includes a panel frame assembly fixture and a multi-panel consolidation device. The panel frame assembly fixture is configured to facilitate assembling a plurality of studs and a plurality of tracks of a frame of a building panel. The multi-panel consolidation device is configured to support a frame of a building panel assembled on the panel frame assembly fixture, to facilitate injection of an expandable polymer into a plurality of cavities defined by the frame. The multi-panel consolidation device is configured to apply a compressive force to the frame and to limit expansion of the expandable polymer.

According to another embodiment, a house includes a foundation and a plurality of U-shaped tracks attached to the foundation. The house also includes a structure that includes a plurality of walls. Each of the walls includes a plurality of building panels. For each of the building panels of each of the walls, the building panel includes a frame and a foam. The frame defines a plurality of cavities and a plurality of injection apertures. Each of the cavities is in fluid communication with one of the injection apertures. The foam is disposed within each of the cavities and is bonded to the frame. Each of the injection apertures is configured to facilitate injecting an expandable polymer into one of the cavities. The foam within each of the cavities is formed from the expandable polymer within the cavity.

According to another embodiment, a building panel includes a frame that includes a plurality of studs and a plurality of tracks. The studs and the tracks are attached to one another. The studs and the tracks cooperate to define at least one cavity. The building panel also includes an expanded foam formed from an expandable polymer and disposed within the at least one cavity. The expanded foam includes a foam structure that includes a front face, a back face and a peripheral edge. The foam structure is confined on its peripheral edge by the frame. Each of the studs includes a front surface, a rear surface and a thickness S from the front surface to the rear surface. The foam structure has a foam thickness F. The foam thickness F is defined as the thickness S with a tolerance having an absolute value of less than 2 mm (0.079 inches), including less than 1 mm (0.039 inches) and including less than 0.5 mm (0.02 inches).

BRIEF DESCRIPTION OF THE DRAWINGS

FIG. 12 is a perspective view similar to FIG. 11, but with a frame of a building panel positioned on a support structure of the panel fabric application assembly, and with a fabric attached to one of a front surface and a rear surface of the frame of the building panel;

FIG. 13 is an enlarged perspective view of an encircled portion of FIG. 12;

FIG. 14 is a perspective view similar to FIG. 12, but with the fabric applied to both of the front and rear surfaces of the frame of the building panel, and with cellophane wrapped around a portion of the frame;

FIG. 15 is an enlarged perspective view of an encircled portion of FIG. 14;

FIG. 16 is a perspective view of a multi-panel consolidation device of the system of FIG. 1, according to one embodiment, with a plurality of shelves of the multi-panel consolidation device depicted in an expanded configuration, and depicting a control console of a hydraulic system of the multi-panel consolidation device;

FIG. 17 is a perspective view similar to FIG. 16, but with the shelves of the multi-panel consolidation device depicted in a collapsed configuration;

FIG. 18 is a side elevation view of the multi-panel consolidation device of FIG. 16, with the shelves of the multi-panel consolidation device depicted in the expanded configuration;

FIG. 19 is an elevation view, partially in cross-section, of one end of the multi-panel consolidation device of FIG. 16, taken along line 19-19 in FIG. 18, with the shelves of the multi-panel consolidation device depicted in the expanded configuration;

FIG. 20 is an elevation view, partially in cross-section, similar to FIG. 19, but with the shelves of the multi-panel consolidation device depicted in the collapsed configuration;

FIG. 21 is a cross-sectional view taken along line 21-21 in FIG. 19, with an upper frame of the multi-panel consolidation device omitted;

FIG. 22 is an enlarged view of an encircled portion of FIG. 21;

FIG. 25 is an enlarged perspective view of an encircled portion of FIG. 17, depicting the portion of the shelves shown in FIG. 23, but with the shelves of the multi-panel consolidation device depicted in the collapsed configuration;

FIG. 26 is an enlarged perspective view similar to FIG. 25, but with the plurality of the links of the link assembly exploded away from the remainder of the link assembly;

FIG. 28 is an end elevation view depicting five building panels installed in the multi-panel consolidation device of FIG. 16, with the shelves of the multi-panel consolidation device depicted in the expanded configuration;

FIG. 29 is an end elevation view similar to FIG. 28, but with the shelves of the multi-panel consolidation device depicted in the collapsed configuration;

FIG. 30 is a side elevation view depicting the five building panels shown in FIGS. 28 and 29, with the shelves of the multi-panel consolidation device depicted in the collapsed configuration;

FIG. 38A is a front elevation view of a building panel that includes the frame of FIG. 35, depicting a fabric of the building panel;

FIG. 38B is a front elevation view similar to FIG. 38A, but with the fabric not shown, and depicting foam within cavities defined by the frame of the building panel;

FIG. 39A is a cross-sectional view taken along line 39A-39A in FIG. 38A;

FIG. 39B is an enlarged view of an encircled portion of FIG. 39A;

FIG. 40 is a perspective view of a frame of a building panel according to another embodiment;

DETAILED DESCRIPTION

Figure 1:
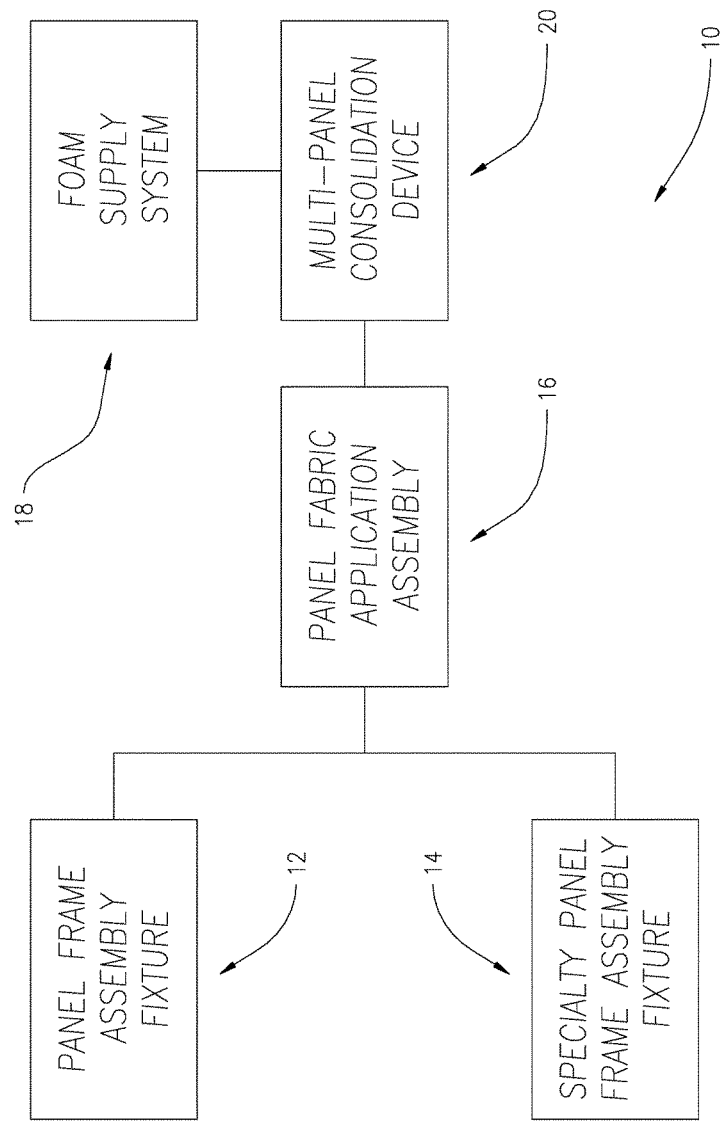
FIG. 1 is a schematic representation of a system for manufacturing building panels, according to one embodiment.
Figure 32:
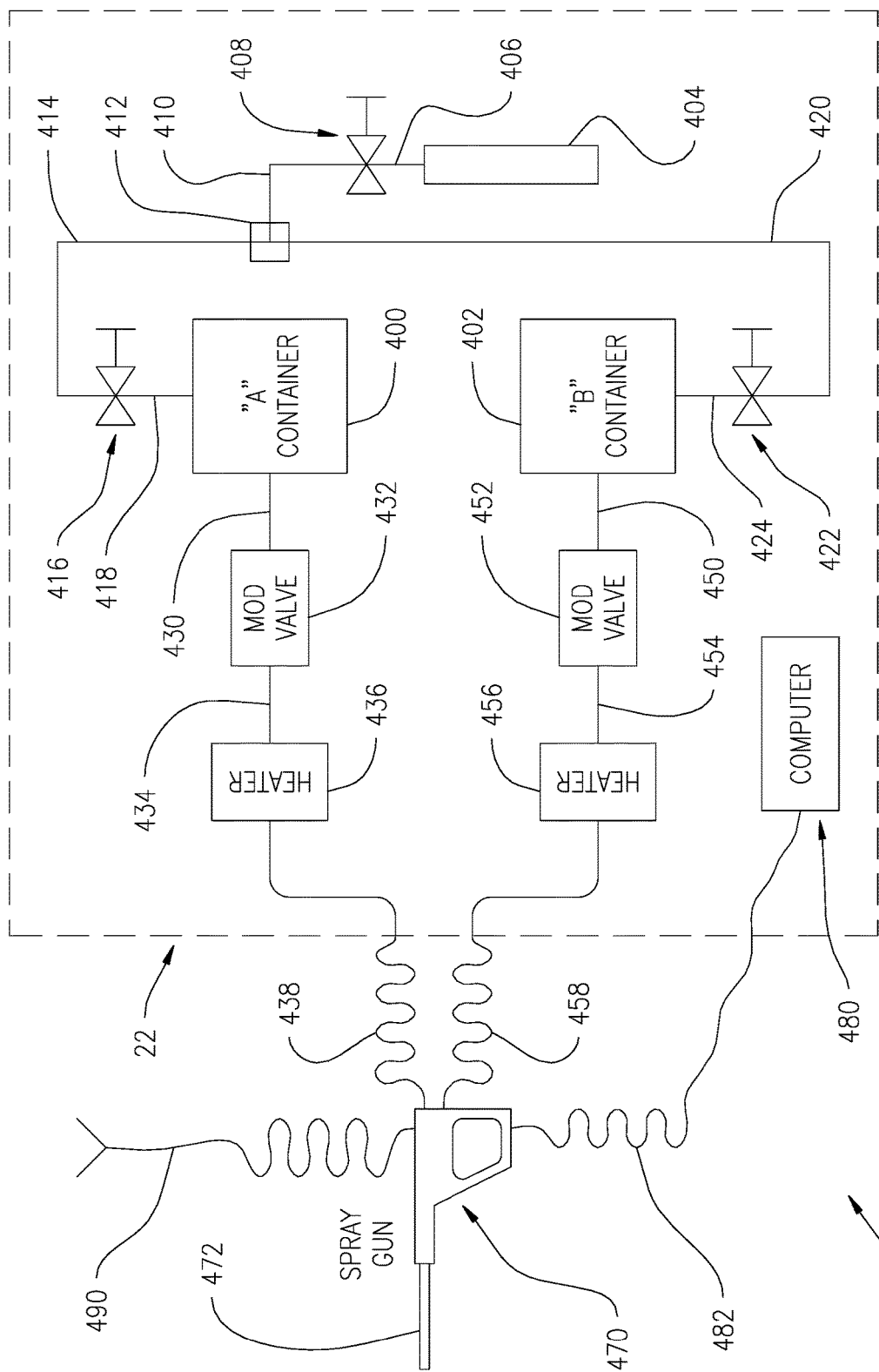
FIG. 32 is a schematic representation of a foam supply system of the system for manufacturing building panels of FIG. 1.

FIG. 1 schematically illustrates a system 10 for manufacturing building panels, according to one embodiment. System 10 can include a panel frame assembly fixture 12, a specialty panel frame assembly fixture 14, a panel fabric application assembly 16, a foam supply system 18 and a multi-panel consolidation device 20. At least a portion of the foam supply system 18 can be disposed in a temperature-controlled room 22 (FIG. 32). System 10 can be used to manufacture building panels for use in the construction of residential or commercial structures. Cavities defined by a frame of each building panel can be filled with foam to provide insulation and to enhance the structural integrity of the building panel. In one embodiment, the foam can be made of polyurethane. A thickness of the foam in the panel can determine insulation R-value. The building panels can have a variety of sizes and/or configurations, which can be determined by the particular application in the residential or commercial structure. These applications include, but are not limited to: egress windows; kitchen windows; bathroom windows; door openings including single door openings, and double door openings, for example French doors or sliding doors; double window panels; floor panels; roof panels, gable panels; and panels including one or more electrical conduits and associated electrical circuit apparatus, e.g., a switch housing and/or an electrical outlet housing. The building panels can include a frame, which can include top and bottom exterior members, which can be referred to as top and bottom exterior tracks, respectively, and can include first side and second side exterior members, which can be referred to as first and second side exterior studs, respectively. The top and bottom exterior tracks of the building panels can be horizontal, and the first and second side exterior studs of the building panels can be vertical, when the building panels are installed in a structure. The top and bottom exterior tracks, and the first and second side exterior studs, can be made of metal, or a metal alloy, for example galvanized steel, such that they are fireproof. The top and bottom exterior tracks and the first and second side exterior studs can be attached to one another, for example by welding, such as spot welding, or MIG welding. Alternatively, the top and bottom exterior tracks and the first and second side exterior studs can be attached to one another with an epoxy. The building panels can include additional members, for example, interior members that can be interconnected to one or more of the exterior members, e.g., to both of the top and bottom exterior tracks, to achieve the desired configuration. The interior members can also be made of metal or a metal alloy. In an alternate embodiment, the exterior and interior tracks and studs can be made of a thermoplastic material, and they can be bonded to one another.

Figure 2:
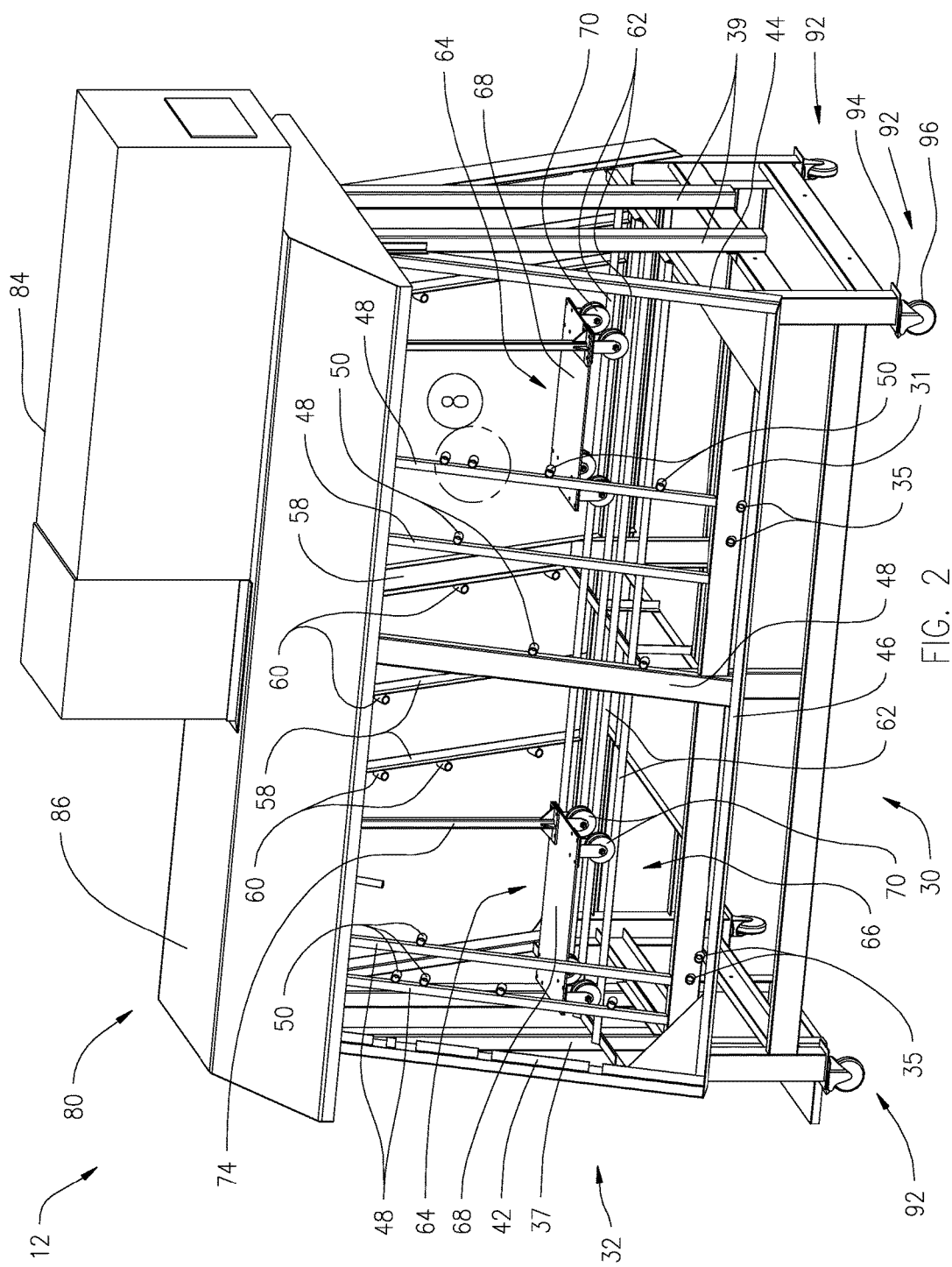
FIG. 2 is a perspective view of a panel frame assembly fixture of the system of FIG. 1.
Figure 3:
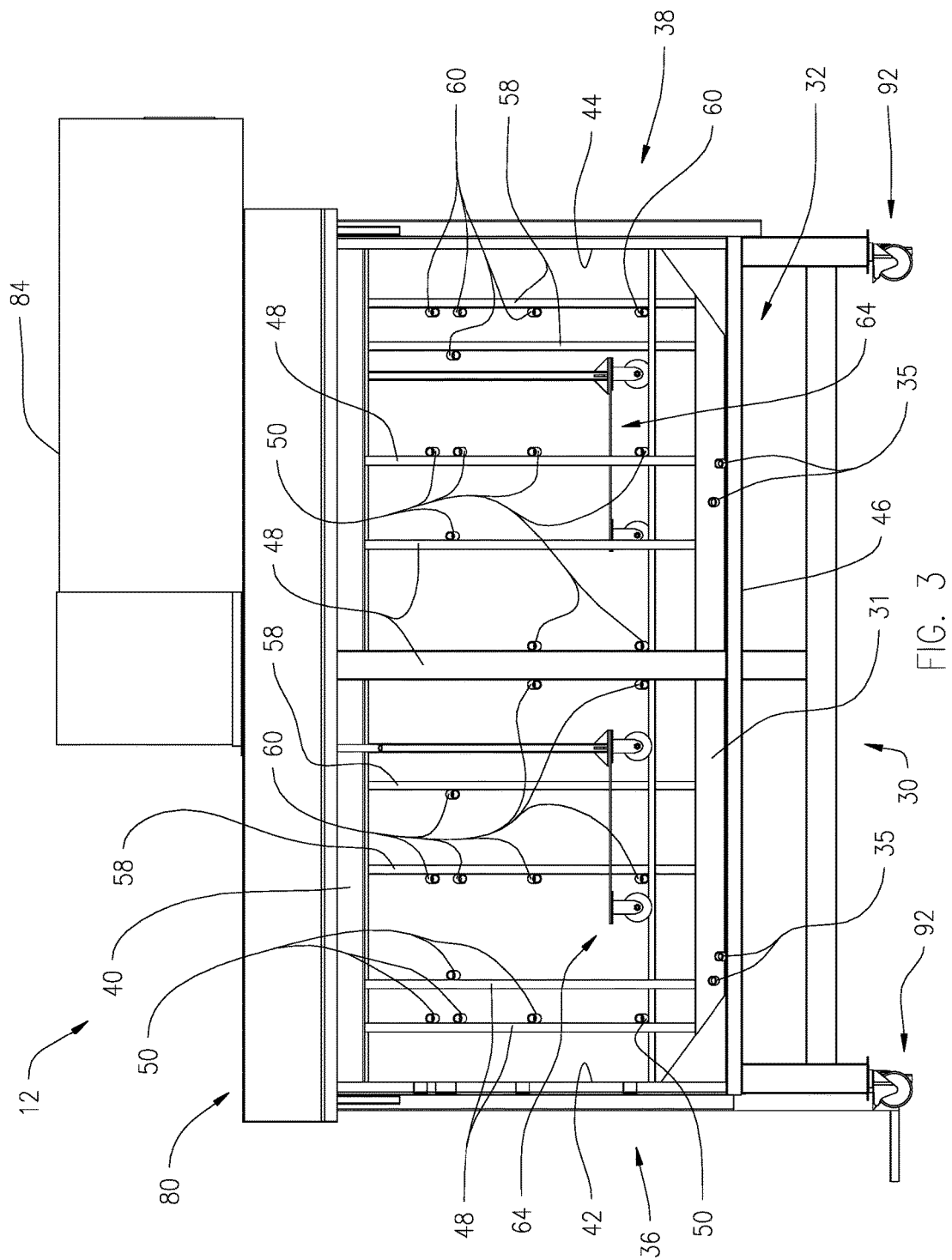
FIG. 3 is an elevation view of a first side of the panel frame assembly fixture of FIG. 2.
Figure 4:
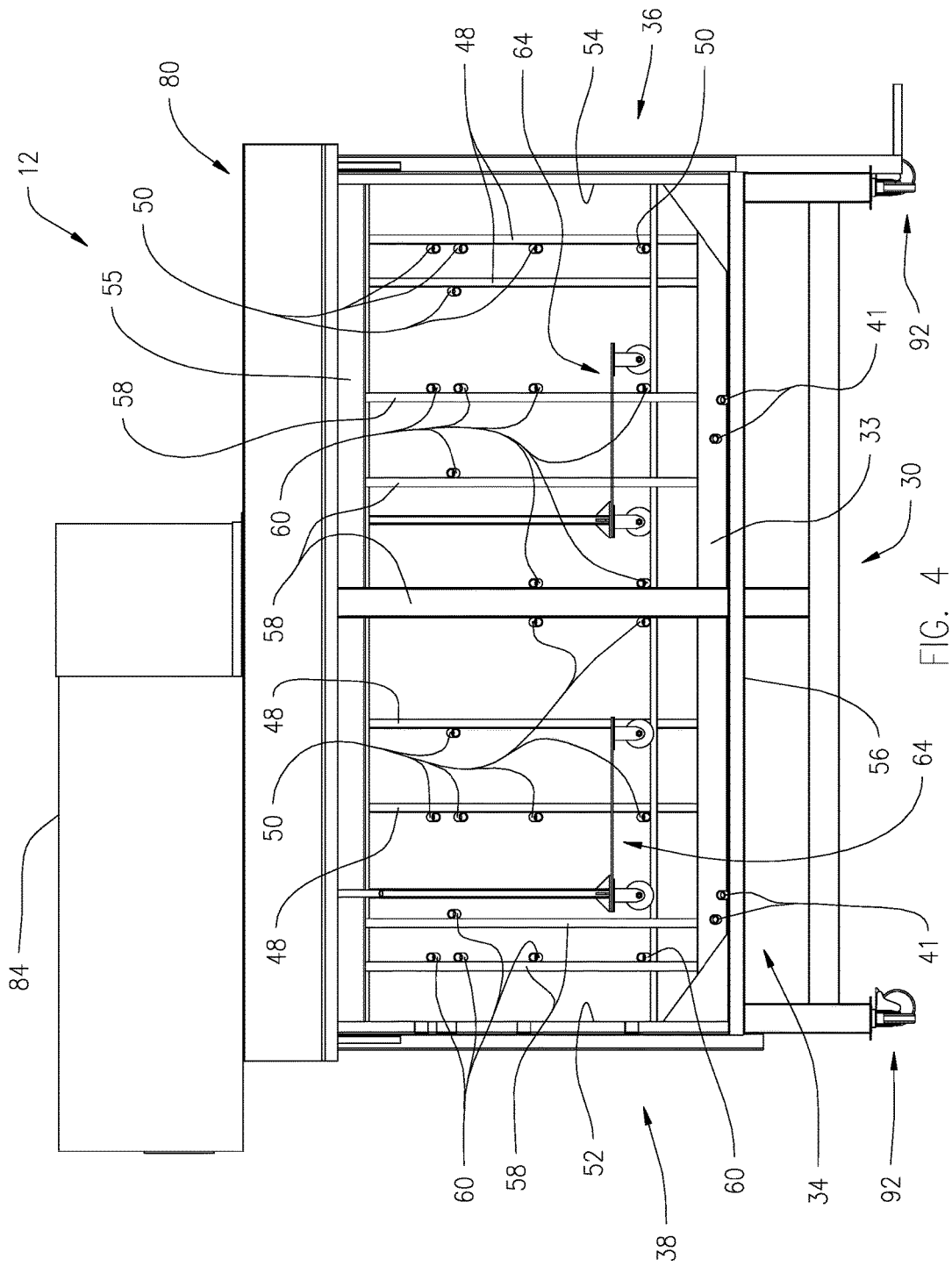
FIG. 4 is an elevation view of a second side of the panel frame assembly fixture of FIG. 2.
Figure 5:
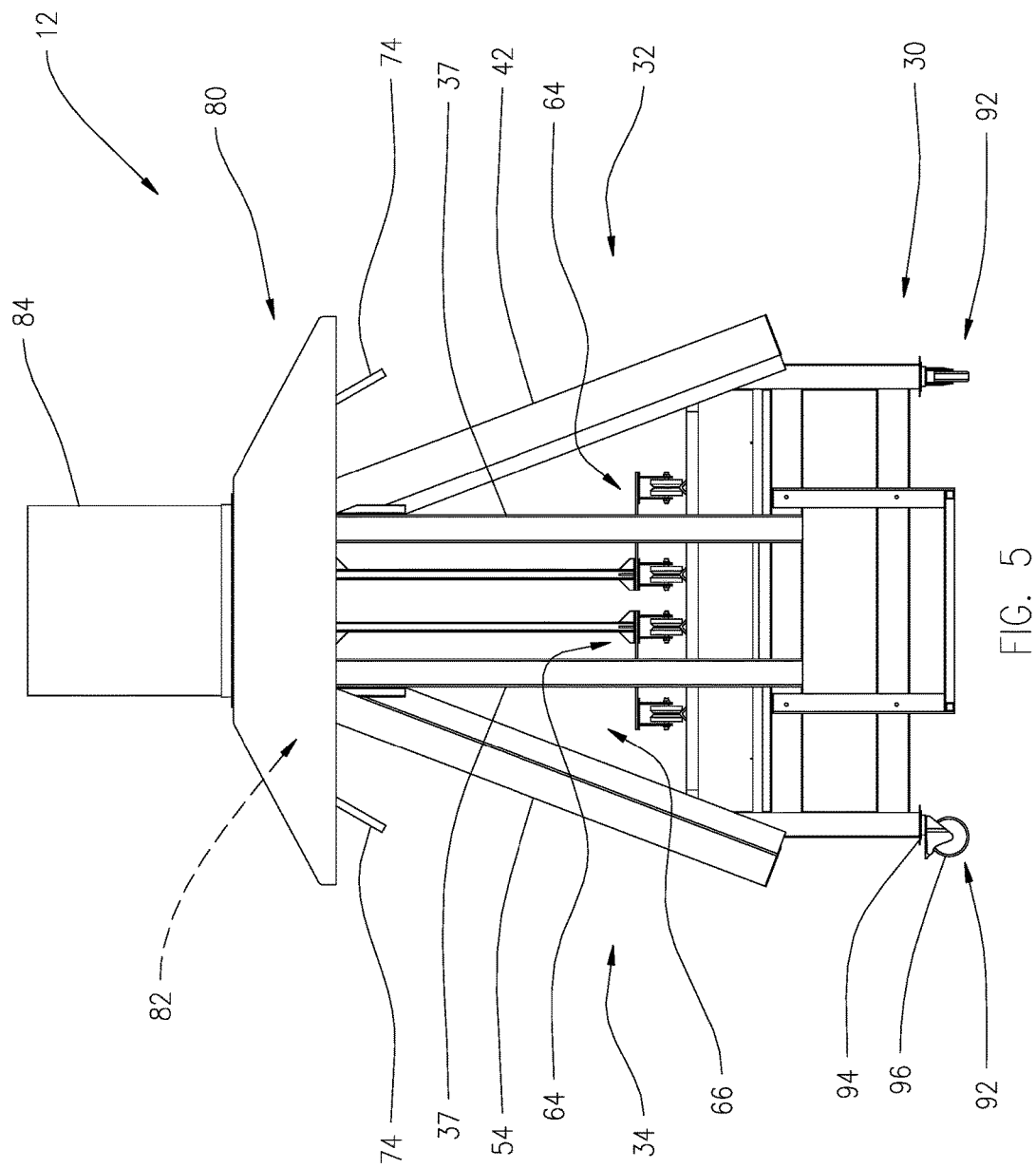
FIG. 5 is an elevation view of one end of the panel frame assembly fixture of FIG. 2.

As shown in FIGS. 2-7, the panel frame assembly fixture 12 can include a base 30, a first side frame 32 (FIGS. 2 and 3) and a second side frame 34 (FIG. 4) laterally spaced from the first side frame 32. Each of the first side frame 32 and the second side frame 34 can be attached to the base 30, and can extend upwardly from the base 30. The panel frame assembly fixture 12 can also include a first end structure 36 and a second end structure 38 that can be longitudinally spaced from the first end structure 36, as shown in FIGS. 3 and 4. Each of the first end structure 36 and the second end structure 38 can be attached to the base 30 and can extend upwardly from the base 30. Each of the first end structure 36 and the second end structure 38 can be attached to each one of the first side frame 32 and the second side frame 34. In one embodiment, the first end structure 36 can include a pair of vertical members 37 (FIG. 5), and one of the vertical members 37 can be attached to the base 30 and the first side frame 32. The other vertical member 37 can be attached to the base 30 and the second side frame 34. The second end structure 38 can include a pair of vertical members 39 (FIG. 2). One of the vertical members 39 can be attached to the base 30 and the first side frame 32, and the other vertical member 39 can be attached to the base 39 and the second side frame 34.

The first side frame 32 and the second side frame 34 can have the same, or similar, configurations. The incorporation of both the first side frame 32 and the second side frame 34 can permit two assemblers to utilize the panel frame assembly fixture 12 at the same time, which can enhance productivity. Each of the first side frame 32 and the second side frame 34 can have a generally open configuration. When a spot welder is used to attach the studs and tracks of a building panel to one another, the generally open configurations of the first side frame 32 and the second side frame 34 can permit an assembler to weld portions of the joints between the studs and tracks of a building panel frame that are easily accessible from a position outside of the panel frame assembly fixture 12, and to reach through the first side frame 32 or the second side frame 34, to weld the remaining portions of the joints between the studs and tracks to one another.

The first side frame 32 and the second side frame 34 can be inclined relative to the base 30, such that each of the first side frame 32 and the second side frame 34 extends upwardly and inwardly away from the base 30. This inclination of the first side frame 32 and the second side frame 34 relative to the base 30 can facilitate assembling the frames of building panels on the first side frame 32 and the second side frame 34, by reducing the fatigue experienced by assemblers positioned outside of the first side frame 32 and the second side frame 34.

As shown in FIG. 3, the first side frame 32 can include an upper horizontal member 40, a first end member 42, a second end member 44 and a lower horizontal member 46. The second end member 44 can be longitudinally spaced from the first end member 42, and each of the first end member 42 and the second end member 44 can be attached to the base 30 and to the lower horizontal member 46. The first side frame 32 can also include a first plurality of longitudinally spaced, and upwardly extending, receptacle support members 48, or risers. The spacing between the receptacle support members 48 can be selected to accommodate the assembly of panels having different heights. Each of the first plurality of receptacle support members 48 can be attached to the upper horizontal member 40 and to one of the base 30 and the lower horizontal member 46 of the first side frame 32. The first side frame 32 can also include a first plurality of receptacles 50. At least one of the first plurality of receptacles 50 can be attached to each one of the first plurality of receptacle support members 48, for example by welding. As shown in FIG. 3, two or more of the first plurality of receptacles 50 can be attached to one or more of the first plurality of receptacle support members 48.

Figure 8:
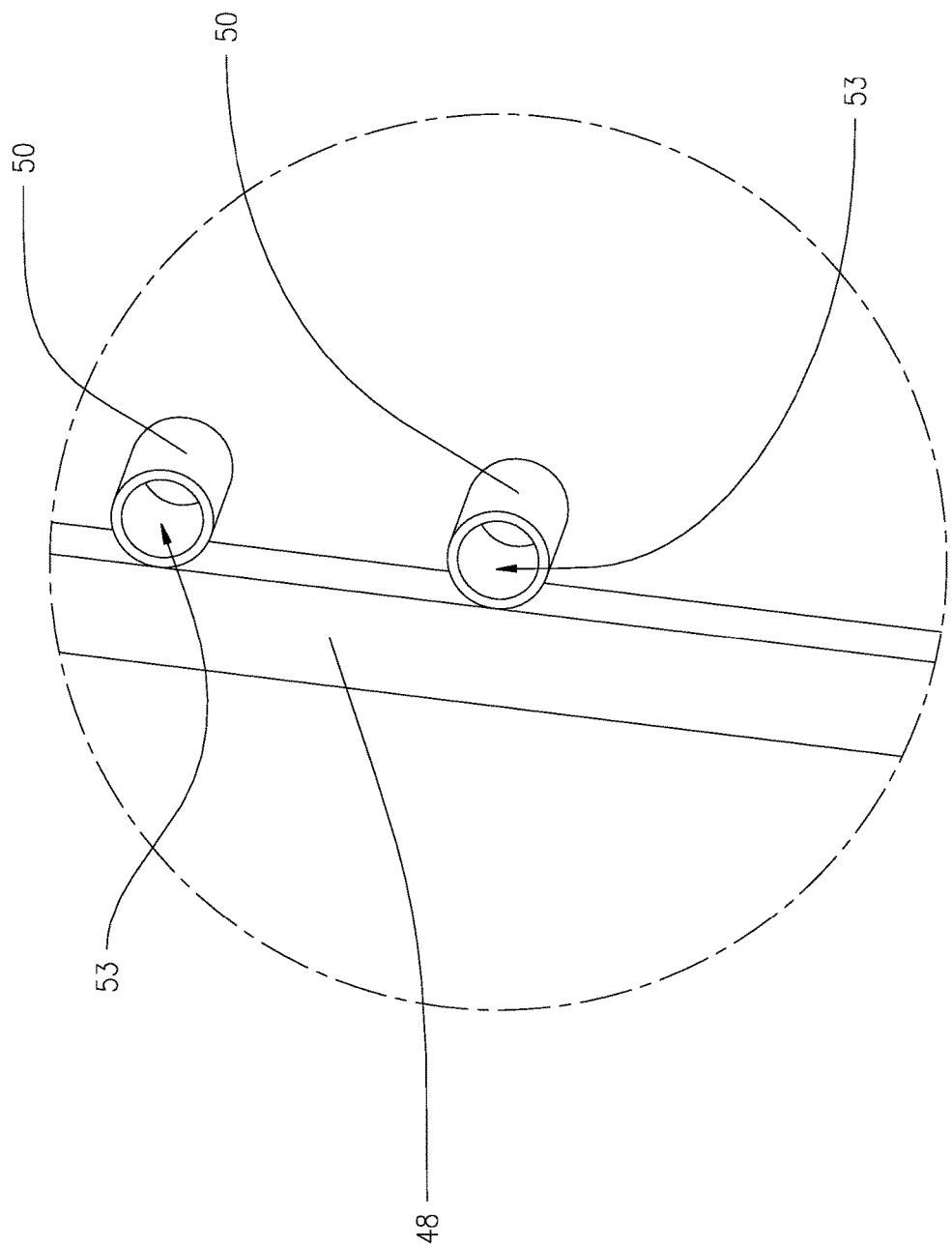
FIG. 8 is an enlarged view of an encircled portion of FIG. 2.

Each of the receptacles 50 can be configured to receive a peg 51 (FIG. 6), which can be a solid cylindrical rod, a section of tubing, or other similar member. In one embodiment, each of the receptacles 50 can be a hollow cylindrical tube, which can receive one of the pegs 51, which can extend outwardly away from the first side frame 32. Each of the receptacles 50 can define a pocket 53 (FIGS. 8 and 9) that can be sized such that an inside diameter of the receptacle 50 is larger than an outside diameter of the mating peg 51. In other embodiments, the receptacles 50 can have a different cross-sectional shape, for example, the shape of square or rectangular hollow tubing, and the pegs 51 can have a complementary shape. Also, in other embodiments, male members, e.g., pegs 51 or other similar members, can be attached to the receptacle support members 48, or risers, and can be sized for insertion into a female member, such as a section of hollow tubing having a complementary shape. The receptacles 50 can be arranged to facilitate assembling the tracks and studs of building panels on the first side frame 32.

The second side frame 34 can be configured the same as, or similar to, the first side frame 32. For example, as shown in FIG. 4, the second side frame 34 can include a first end member 52, a second end member 54, an upper horizontal member 55, and a lower horizontal member 56. The second end member 54 can be longitudinally spaced from the first end member 52, and each of the first end member 52 and the second end member 54 can be attached to the base 30, and to the lower horizontal member 56 of the second side frame 34. The second side frame 34 can also include a second plurality of longitudinally spaced and upwardly extending receptacle support members 58, or risers. Each of the second plurality of receptacle support members 58 can be attached to the upper horizontal member 55, and to one of the base 30 and the lower horizontal member 56 of the second side frame 34. The second side frame 34 can also include a second plurality of receptacles 60. At least one of the second plurality of receptacles 60 can be attached to each one of the second plurality of receptacle support members 58, for example, by welding. As shown in FIG. 4, two or more of the second plurality of receptacles 60 can be attached to one or more of the receptacle support members 58. Each receptacle 60 can define an interior space that can be shaped and sized the same as, or similar to, the pocket 53 defined by the receptacle 50. Each of the receptacles 60 can receive a peg, e.g., peg 51, or other similar member, which can extend outwardly away from the second side frame 34. Also, in other embodiments, male members such as pegs 51, or other similar members, can be attached to the receptacle support members 58, or risers, and can be sized for insertion into a female member, for example a section of hollow tubing having a shape that is complementary with the shape of the pegs 51. As with the receptacles 50, the receptacles 60 can be arranged to facilitate assembling the tracks and studs of building panels on the second side frame 34.

Base 30 can include an upper, first side member 31 and an upper, second side member 33. One or more of the receptacle support members 48 can be attached to the upper, first side member 31, and one or more of the receptacle support members 58 can be attached to the upper, second side member 33. The base 30 can include a third plurality of receptacles 35, which can be attached to the upper, first side member 31, and a fourth plurality of receptacles 41, which can be attached to the upper, second side member 33. The receptacles 35 can cooperate with the receptacles 50 to facilitate assembling tracks and studs of building panels on the first side frame 32. The receptacles 41 can cooperate with the receptacles 60 to facilitate assembling the tracks and studs of building panels on the second side frame 34.

Figure 6:
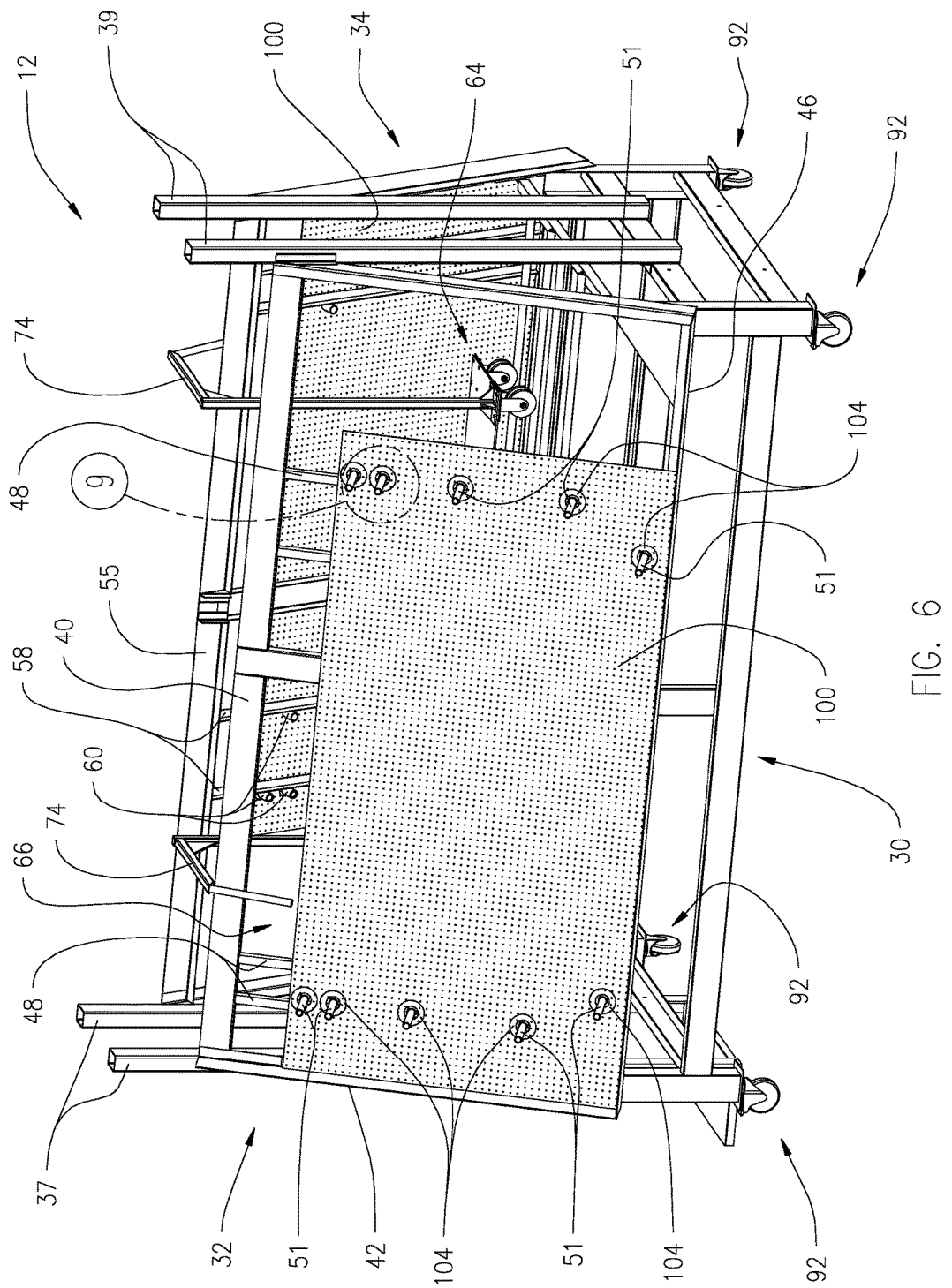
FIG. 6 is a perspective view of the first side of the panel frame assembly fixture of FIG. 2, with pegs protruding from receptacles of the panel frame assembly fixture, and with a template removably connected to the panel frame assembly fixture with the pegs, and with each peg extending through a respective aperture defined by the template, such that the pegs are arranged in a pattern suitable for supporting studs and tracks of a building panel for assembly.

The panel frame assembly fixture 12 can include one or more pairs of tracks 62, and one or more trolleys 64. For example, as shown in FIG. 2, the panel frame assembly fixture 12 can include two pairs of the tracks 62 and two trolleys 64. The base 30, the first side frame 32, the second side frame 34, the first end structure 36 and the second end structure 38 can cooperate to define at least a portion of a pocket 66 (FIGS. 2 and 6). Each of the trolleys 64 can be translatable along a respective one of the pair of tracks 62. One pair of the tracks 62 can be disposed adjacent to the first side frame 32, and the other pair of the tracks 62 can be disposed adjacent to the second side frame 34.

Each of the trolleys 64 can include a support structure 68 and a plurality of casters 70, which can be attached to the support structure 68 and can extend downwardly from the support structure 68. The casters 70 of the trolleys 64 can be configured to roll along the tracks 62. The support structure 68 can be flat, or substantially flat, and can be sized and configured to support a welding machine (not shown) e.g., a spot welder. Each of the trolleys 64 can also include a handle 74 (FIGS. 5 and 6) that can be attached to the support structure 68, and can extend upwardly from the respective support structure 68. One of the handles 74 can extend above, and laterally outward of, the upper horizontal member 40 of the first side frame 32, and the other handle 74 can extend above, and laterally outward of, the upper horizontal member 55 of the second side frame 34. In this manner, an assembler positioned outside either of the first side frame 32 or the second side frame 34 can conveniently move the adjacent one of the trolleys 64 and the welding machine supported by either of the trolleys 64 to desired locations.

The panel frame assembly fixture 12 can include a canopy 80 (FIGS. 2-5), which can be attached to each of the first end structure 36 and the second end structure 38. The canopy 80 can be positioned adjacent to the upper horizontal member 40 of the first side frame 32 and the upper horizontal member 55 of the second side frame 34 and can extend laterally outwardly of the upper horizontal members 40 and 55. The canopy 80 can define an interior chamber 82 (FIG. 5), which can communicate with the pocket 66. The panel frame assembly fixture 12 can also include an air filter assembly 84 (FIGS. 2, 4 and 5), which can be supported by the canopy 80. For example, in one embodiment, the canopy 80 can include an upper support plate 86 (FIG. 2), and the air filter assembly 84 can be disposed on top of the upper support plate 86. The air filter assembly 84 can include one or more filters (not shown) and a blower motor (not shown) in fluid communication with each of the filters. In one embodiment, the air filter assembly 84 can include a pair of the filters (not shown) disposed in a series arrangement with one another, with the blower motor positioned between the two filters. At least an upstream one of the filters can be in fluid communication with the interior chamber 82.

The panel frame assembly fixture 12 can also include a plurality of casters 92, which can be swivel-type casters. Each caster 92 can include a mount structure 94 (FIG. 2), which can include a plate. The mount structure 94 can be attached to the base 30, for example, using fasteners or by welding. Mount structure 94 can extend downwardly from the base 30 such that rotatable wheels 96 of the casters can contact a surface of a structure, such as a floor, which supports the panel frame assembly fixture 12. In one embodiment, the panel frame assembly fixture 12 can include four of the casters 92, with the casters 92 being attached to corners of the base 30. In other embodiments, the panel frame assembly fixture 12 can include different numbers of casters. The use of casters 92 can facilitate moving the panel frame assembly fixture 12 within a manufacturing plant, or other facility.

The lower horizontal member 46 of the first side frame 32 can be perpendicular to each of the first end member 42 and the second end member 44 of the first side frame 32. Similarly, the lower horizontal member 56 of the second side frame 34 can be perpendicular to each of the first end member 52 and the second end member 54 of the second side frame 34. This can ensure that the members of a frame of a building panel that are being attached to one another on either the first side frame 32 or the second side frame 34, are perpendicular to one another. For example, this can be accomplished by positioning a top exterior track of a frame of a building panel, e.g., a top exterior track 1006 of a frame 1000 (FIGS. 35-37), of a building panel 1099 (FIGS. 38-39) against either the first end member 42, or the second member 44 of the first side frame 32, and positioning a first side exterior stud of the frame of the building panel, e.g., a first side exterior stud 1002 of frame 1000, on the lower horizontal member 46 of the first side frame 32, and welding the first side exterior stud 1002 of the frame 1000 to the top exterior track 1006 of the frame 1000. This can ensure that the remaining tracks and studs of the frame 1000 are perpendicular to one another. A similar process can be used with respect to a frame of a building panel being assembled on the second side frame 34.

Figure 9:
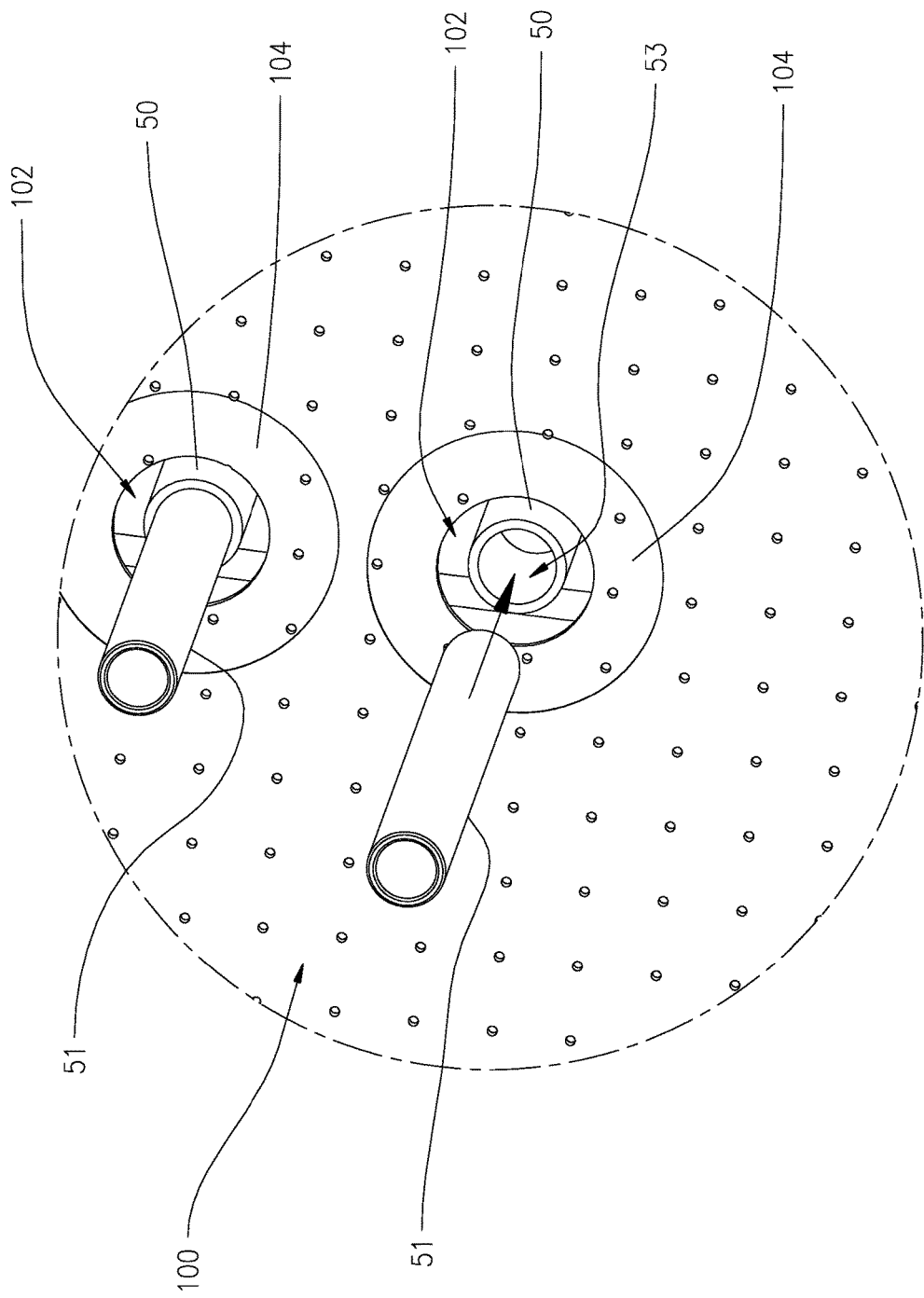
FIG. 9 is an enlarged view of an encircled portion of FIG. 6.

The panel frame assembly fixture 12 can include a plurality of templates 100, which can be removably connected to the first side frame 32 or the second side frame 34, as shown in FIG. 6 for one of the templates 100 that is removably connected to the first side frame 32. Each template 100 can be made of a semi-rigid, or rigid, material. In one embodiment, the templates 100 can be made of any one of a variety of materials, e.g., composite materials, plastic materials, metals, metal alloys, and wood sheeting. Each template 100 can define a plurality of apertures 102 (FIG. 9). Each aperture 102 can be sized and shaped to receive one of the pegs 51, which can be disposed in one of the receptacles 50 of the first side frame 32, one of the receptacles 60 of the second side frame 34, or one of the receptacles 35 or 41 of the base 30.

Figure 7:
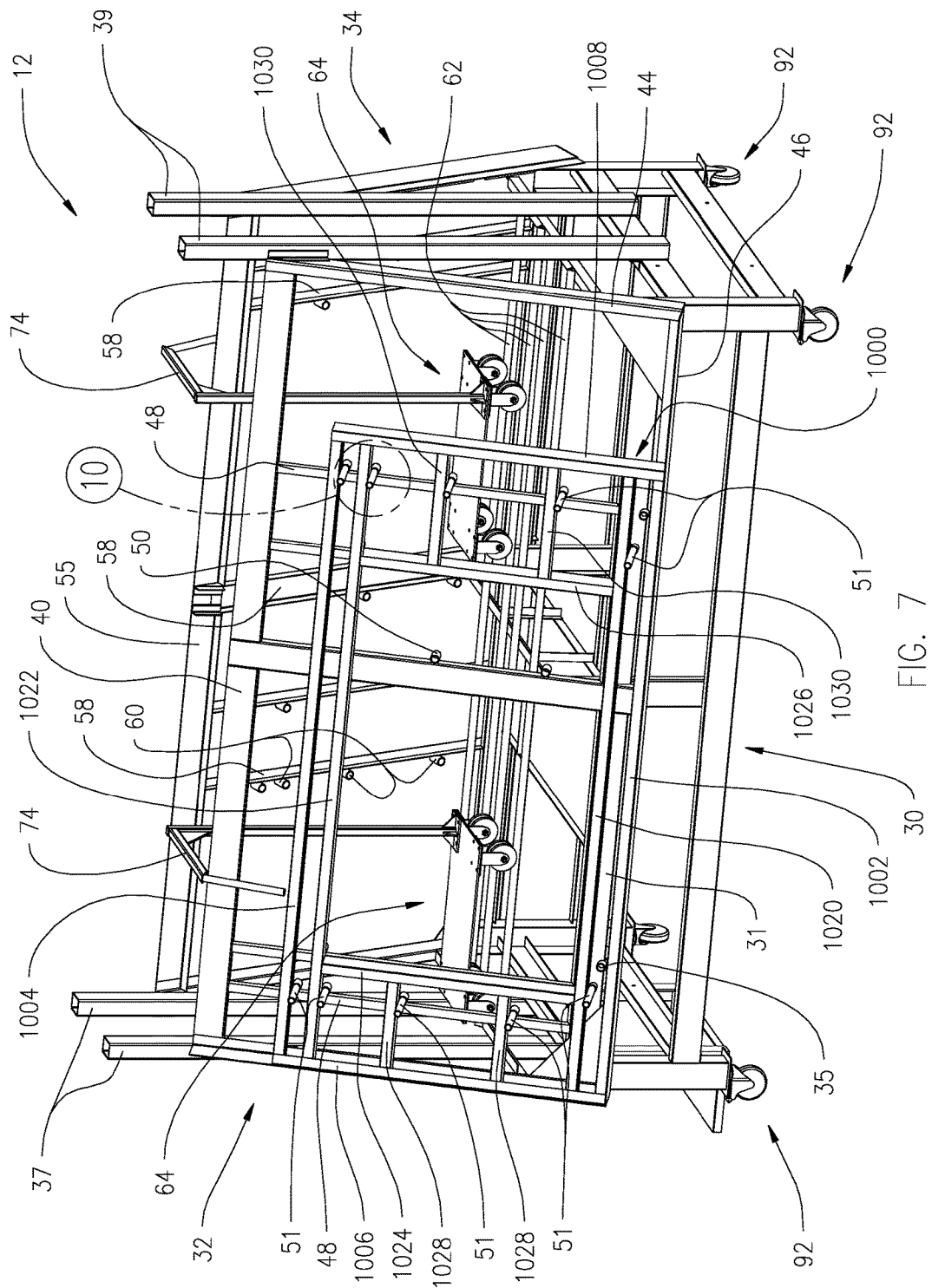
FIG. 7 is a perspective view similar to FIG. 6, but with the template removed from the panel frame assembly fixture, and with a frame of a building panel positioned on the pegs.
Figure 42:
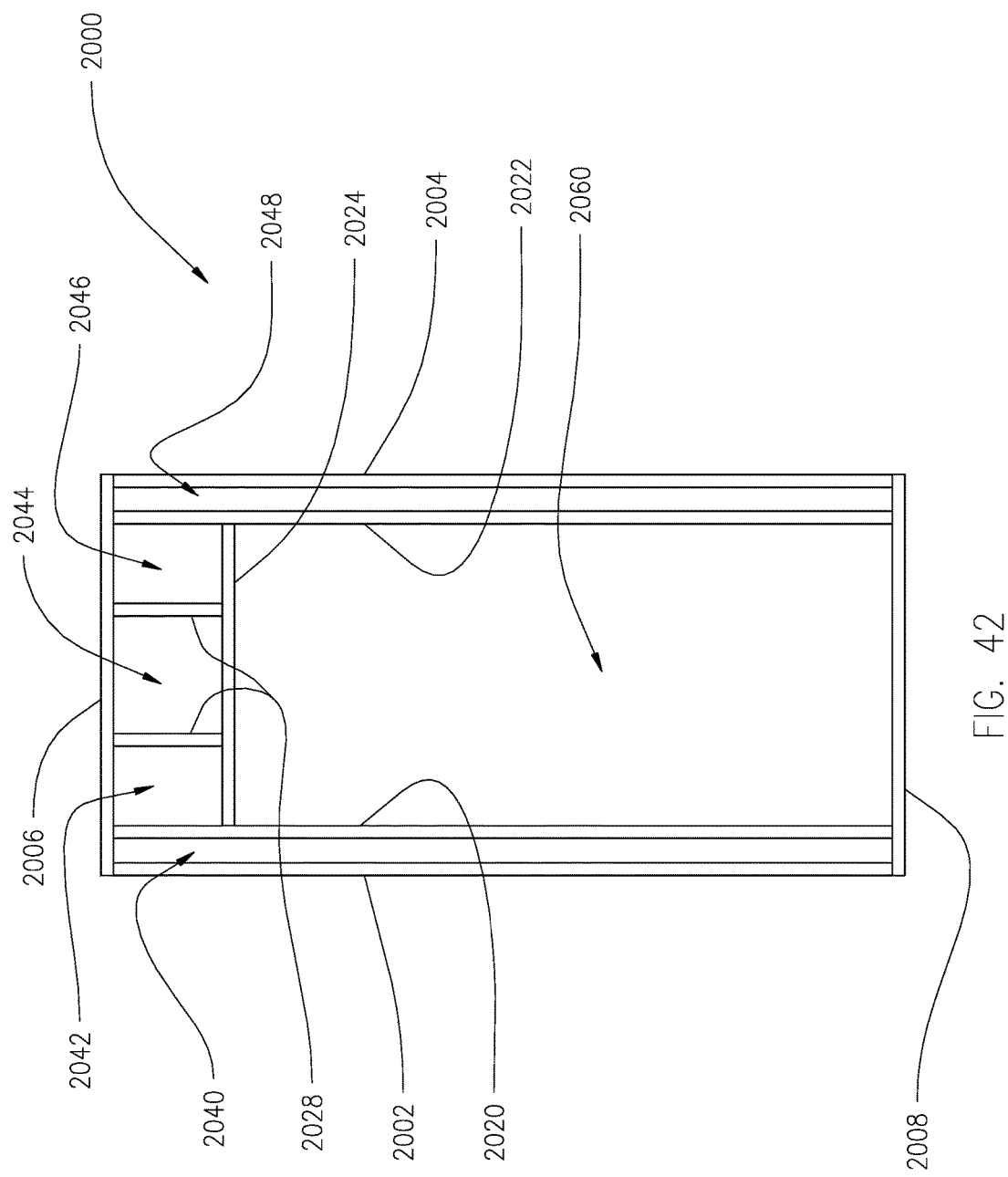
FIG. 42 is a front elevation view of the frame of FIG. 40.
Figure 43:
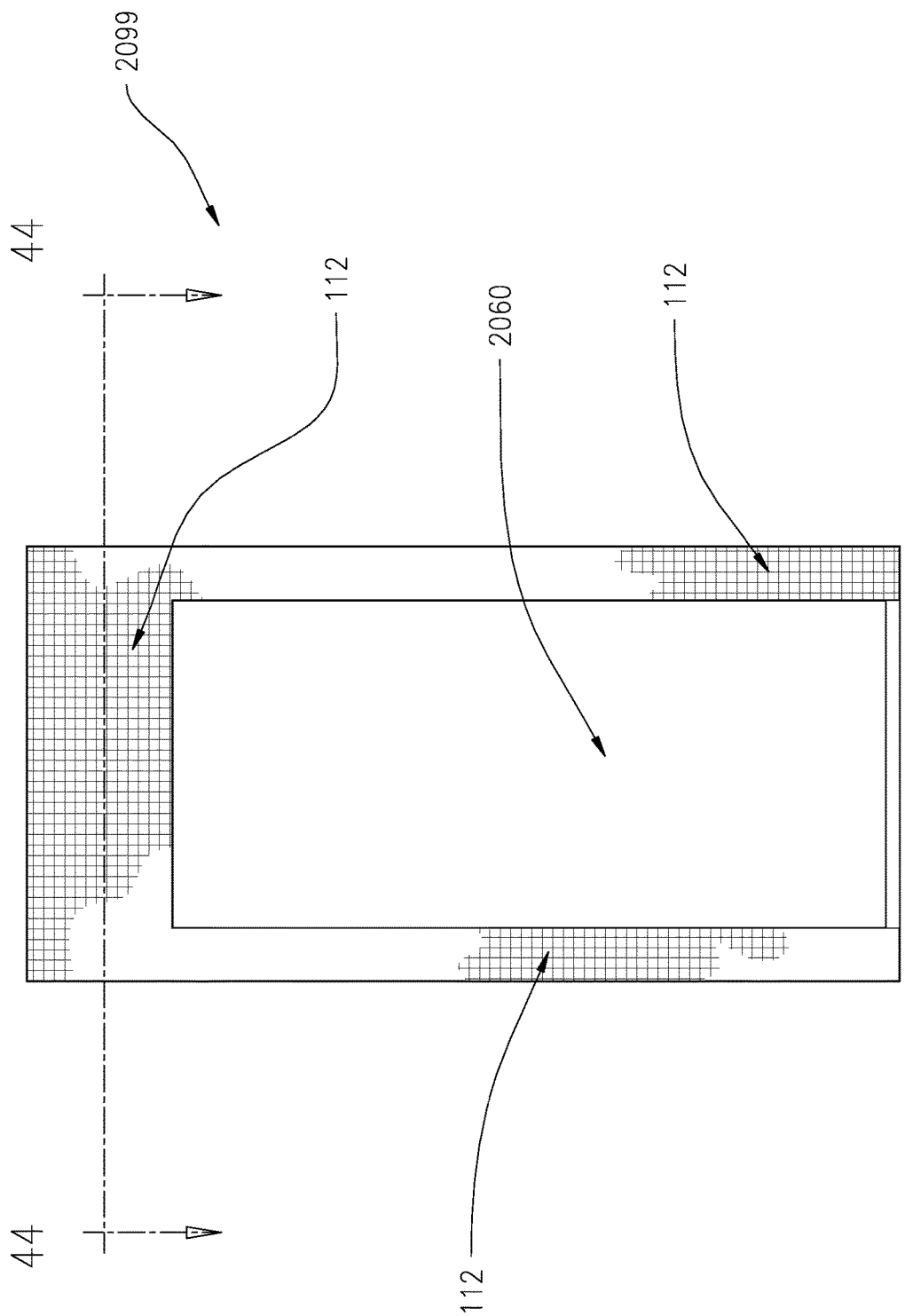
FIG. 43 is a front elevation view of a building panel that includes the frame of FIG. 40.
Figure 44:
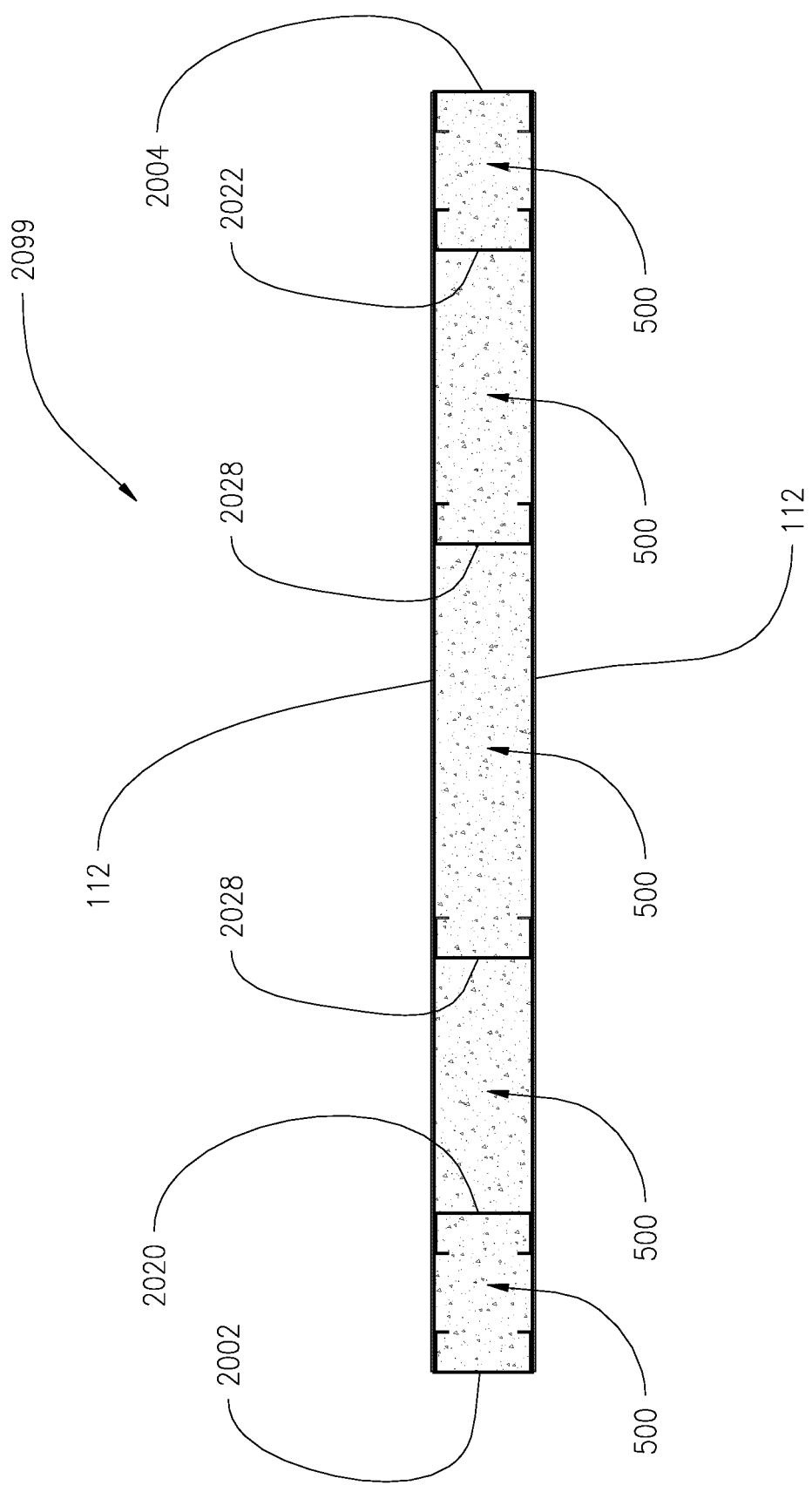
FIG. 44 is a cross-sectional view taken along line 44-44 in FIG. 43.
Figure 45:
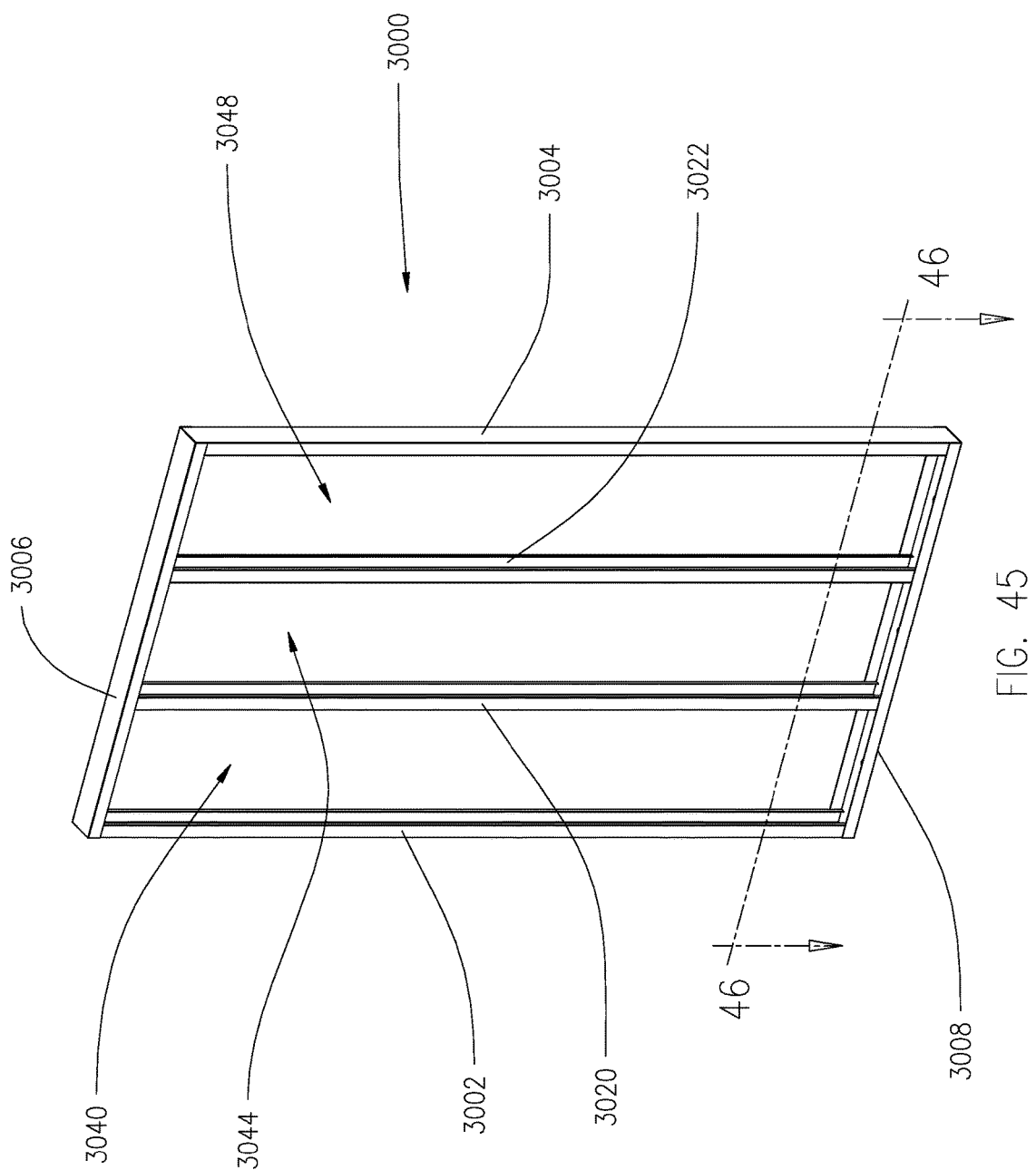
FIG. 45 is a perspective view of a frame of a building panel according to another embodiment.
Figure 46:
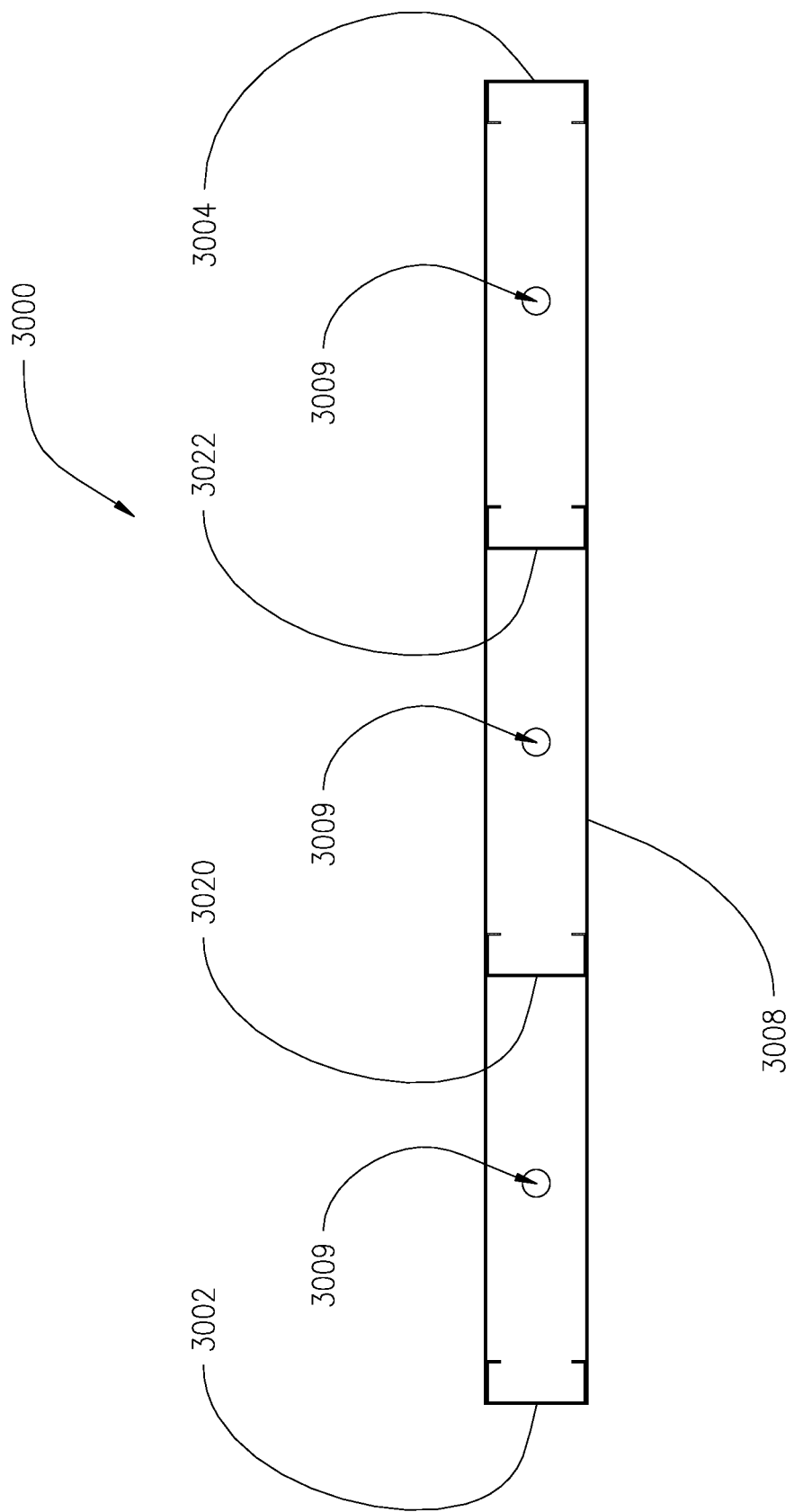
FIG. 46 is a cross-sectional view taken along line 46-46 in FIG. 45.
Figure 47:
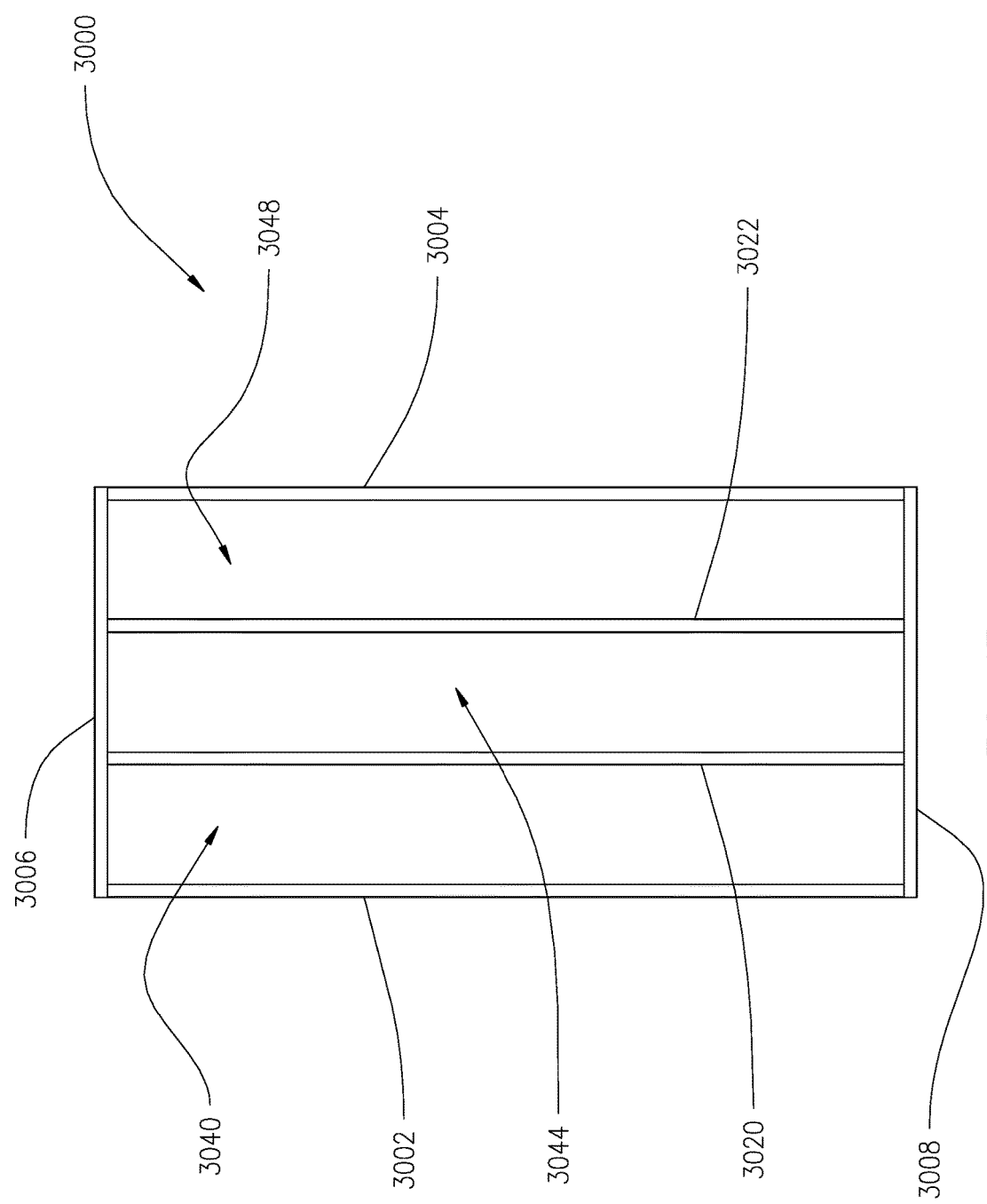
FIG. 47 is a front elevation view of the frame of FIG. 45.
Figure 48:
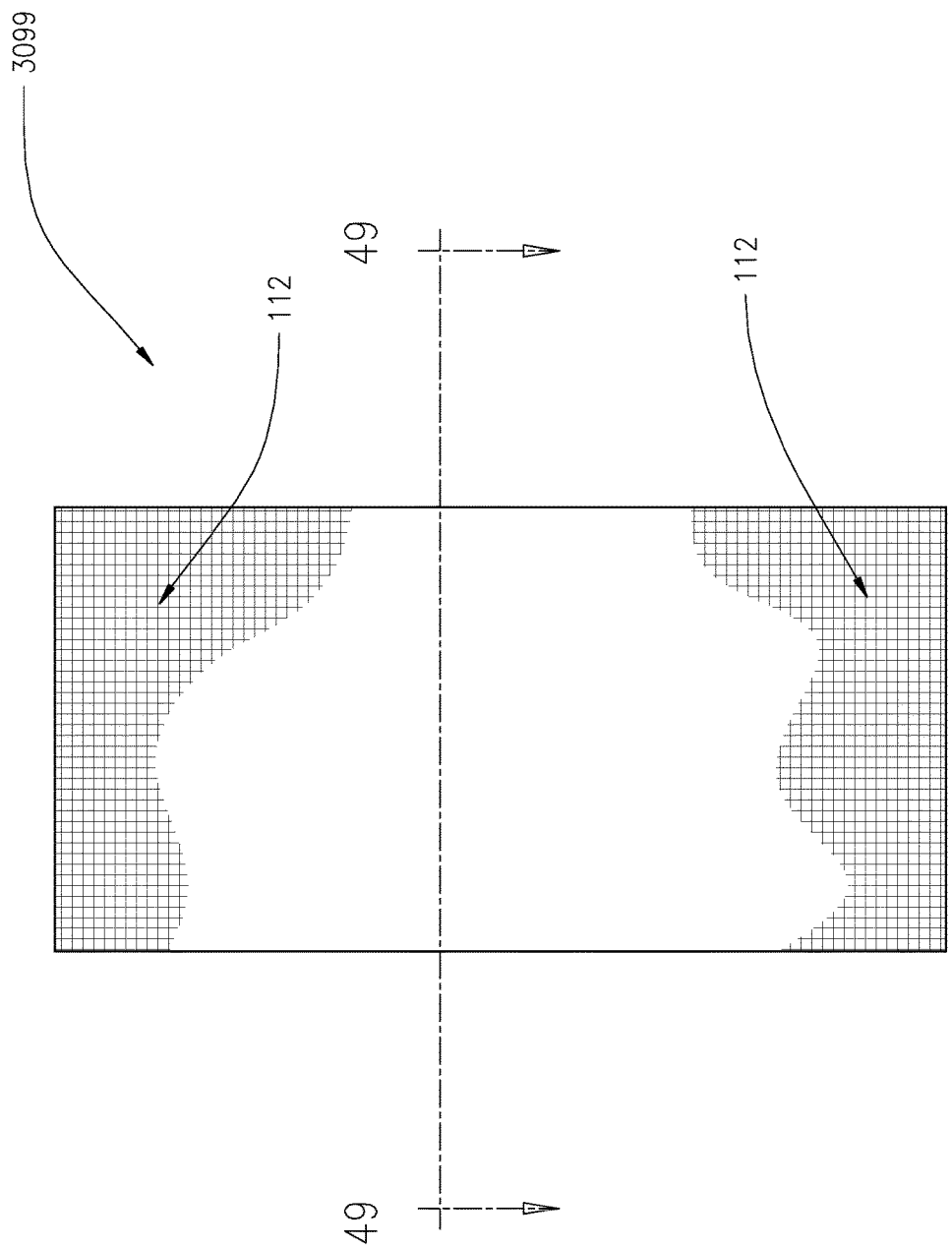
FIG. 48 is a front elevation view of a building panel that includes the frame of FIG. 45.

The templates 100 can be color-coded to signify use for assembling the frame of a particular type of building panel. In one embodiment, an area 104 (FIG. 9) surrounding each aperture 102 can be colored. The areas 104 of any one of the templates 100 can have the same color. The apertures 102 can be arranged to facilitate assembling the frame of a particular building panel, e.g., the apertures 102 can be arranged so that each is aligned with one of the receptacles 50 of the first side frame 32 and the receptacles 35 of base 30, or with one of the receptacles 60 of the second side frame 34 and the receptacles 41 of base 30. The template 100 shown in FIG. 6, which is removably connected to the first side frame 32, includes ten of the apertures 102. As shown in FIG. 7, the apertures 102 can be arranged to facilitate assembling the frame 1000 (FIGS. 35-37) of the window panel 1099 (FIGS. 38-39). The area 104 around each of these apertures 102 can be colored using the same color, which can signify that the template 100 should be used to assemble a particular frame, e.g., the frame 1000, of a window panel, e.g., the window panel 1099. In other embodiments, templates 100 can have a different number and arrangement of apertures 102 to facilitate assembling a frame, e.g., frame 2000 (FIGS. 40-42) of a different building panel, e.g., a door panel 2099 (FIGS. 43-44). The areas 104 around the apertures 102 of the template 100 used to assemble the frame 2000 of the door panel 2099 can have the same color, which can be different than the color of the areas 104 of the template 100 used to assemble the frame 1000.

Referring to FIG. 6, when one of the templates 100 is positioned on the lower horizontal member 46 of the first side frame 32 and against the first end member 42 of the first side frame 32, each of the apertures 102 can be aligned with one of the receptacles 50 of the first side frame 32 or one of the receptacles 35 of the base 30. Similarly, when one of the templates 100 is positioned on the lower horizontal member 56 of the second side frame 34 and against the first end member 52 of the second side frame 34, each of the apertures 102 can be aligned with one of the receptacles 60 of the second side frame 34 or one of the receptacles 41 of the base 30. Alternatively, the templates 100 can be sized, and the apertures 102 can be arranged, so that each of the apertures 102 is aligned with one of the receptacles 50 or 35, or with one of the receptacles 60 or 41, when the template 100 is positioned on the lower horizontal member 46 and against the second end member 44 of the first side frame 32, or is positioned on the lower horizontal member 56 and against the second end member 54 of the second side frame 34, respectively.

Figure 10:
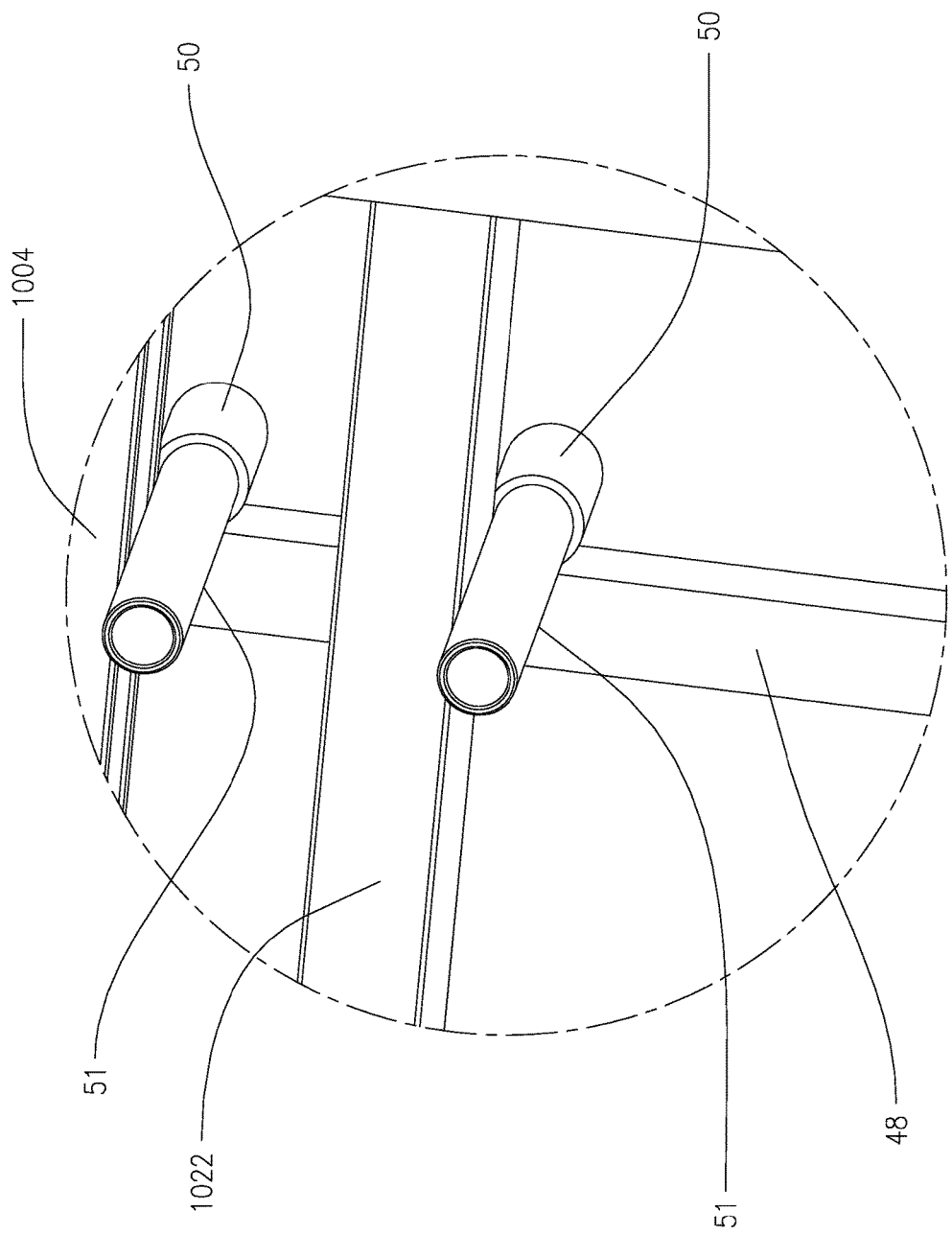
FIG. 10 is an enlarged view of an encircled portion of FIG. 7.

After one of the templates 100 has been positioned on the panel frame assembly fixture 12, for example, after the template 100 has been positioned on the first side frame 32, one of the pegs 51 can be inserted through each of the apertures 102 and into an aligned one of the receptacles 50 or 35, as shown in FIGS. 6, 9 and 10. After the pegs 51 have been inserted through apertures 102 and the aligned ones of the receptacles 50 and 35, the template 100 can be removed and the pegs 51 can remain installed, as shown in FIG. 7. A similar process can be used when a frame is being assembled on the second side frame 34 of the panel frame assembly fixture 12.

Figure 35:
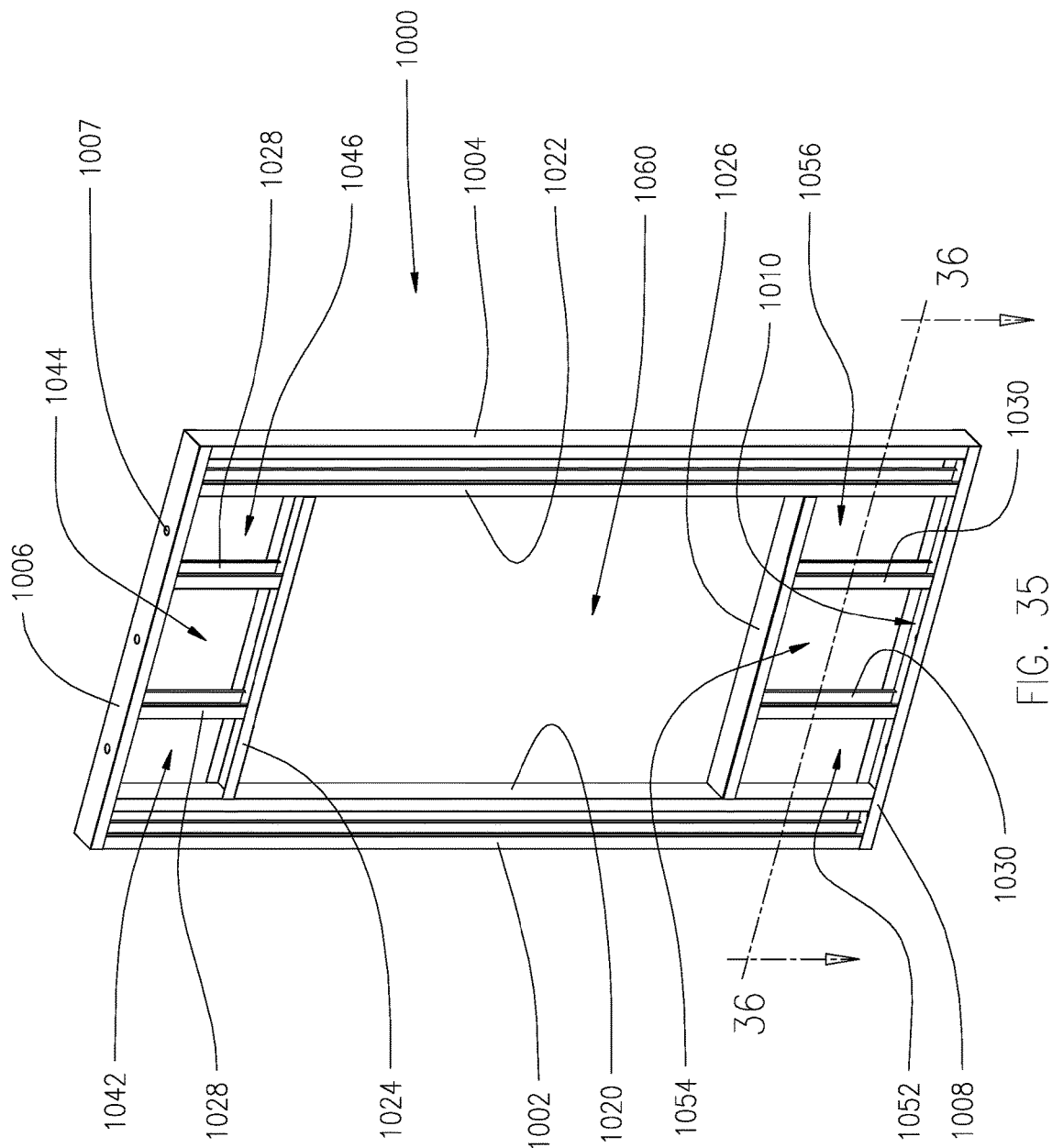
FIG. 35 is a perspective view of a frame of a building panel according to one embodiment.
Figure 36:
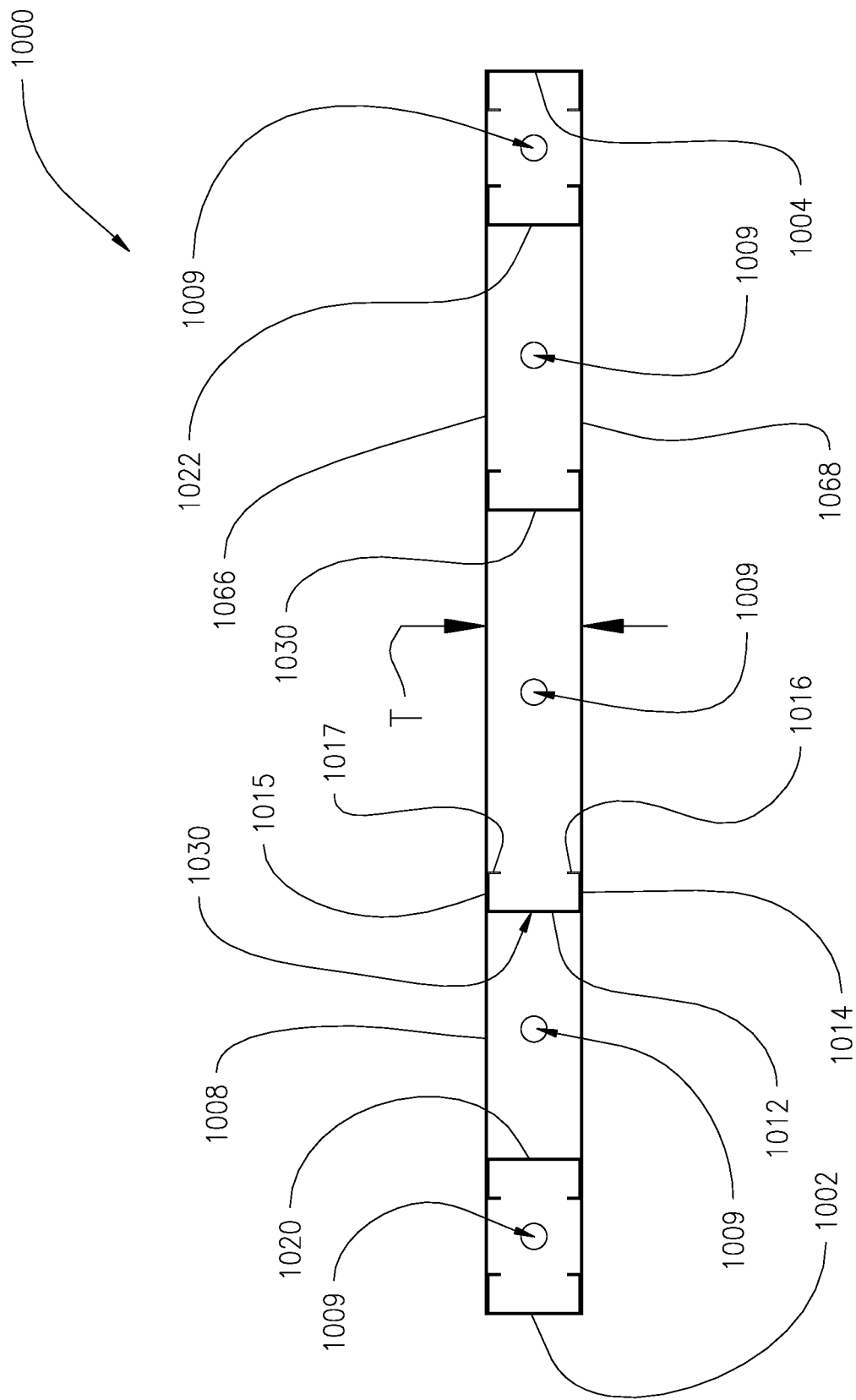
FIG. 36 is a cross-sectional view taken along line 36-36 in FIG. 35.
Figure 37:
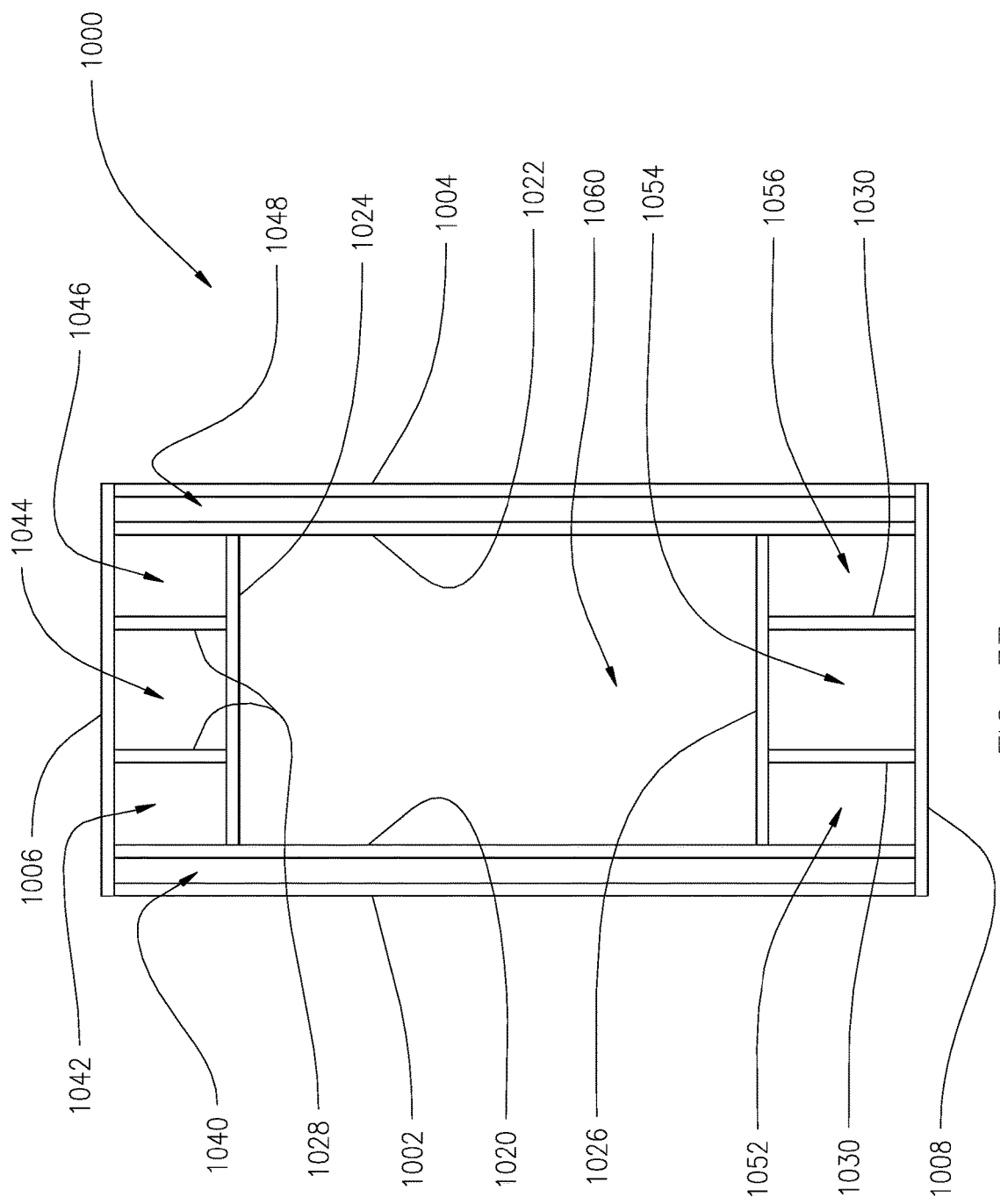
FIG. 37 is a front elevation view of the frame of FIG. 35.

Referring to FIGS. 35-37 the frame 1000 can include the first side exterior stud 1002, a second side exterior stud 1004, the top exterior track 1006 and a bottom exterior track 1008. An upper end of the first side exterior stud 1002 and an upper end of the second side exterior stud 1004 can be attached to the top exterior track 1006. A lower end of the first side exterior stud 1002 and a lower end of the second side exterior stud 1004 can be attached to the bottom exterior track 1008. The frame 1000 can also include a first side interior stud 1020, which can be disposed adjacent the first side exterior stud 1002, and a second side interior stud 1022, which can be disposed adjacent the second side exterior stud 1004. An upper end of the first side interior stud 1020 and an upper end of the second side interior stud 1022 can be attached to the top exterior track 1006. A lower end of the first side interior stud 1020 and a lower end of the second side interior stud 1022 can be attached to the bottom exterior track 1008. The frame 1000 can also include a top interior track 1024 and a bottom interior track 1026. Each of the tracks 1024 and 1026 can extend horizontally between, and can be attached to each one of, the first side interior stud 1020 and the second side interior stud 1022. Frame 1000 and also include a plurality of upper interior connecting members 1028 and a plurality of lower interior connecting members 1030. Each of the connecting members 1028 can be attached to each one of the top exterior track 1006 and the top interior track 1024. Each of the connecting members 1030 can be attached to each one of the bottom exterior track 1008 and the bottom interior track 1026.

Each of the tracks of the frame 1000 can be generally U-shaped as shown in FIG. 35 and can define a cavity, which can receive a plurality of studs of the frame 1000. The studs and tracks of the frames of other building panels disclosed herein, can also engage one another in this manner. For example, the bottom exterior track 1008 of frame 1000 can include a base and two opposing sidewalls, which can extend away from the base. The base and the two opposing sidewalls of the bottom exterior track 1008 can define a channel 1010, which can be shaped and sized to receive an end of one or more of the studs of the frame 1000. For example, as shown in FIG. 35, the lower end of each of the following studs can be disposed within the channel 1010: the first side exterior stud 1002, the first side interior stud 1020, each of the two connecting members 1030, the second side interior stud 1022 and the second side exterior stud 1004. Each of the studs of the frame 1000 can have a cross-sectional shape that is similar to the cross-sectional shape of the tracks of frame 1000, but can also include a pair of lips that can enhance the structural integrity of the studs. For example, as shown in FIG. 36, each of the connecting members 1030 can include a base 1012 and opposed side walls 1014 and 1015 that can extend away from the base 1012. Each connecting member 1030 can also include a lip 1016 that can extend inwardly from the side wall 1014, and a lip 1017 that can extend inwardly from the side wall 1015. Each of the studs of frame 1000 can have a thickness "S", as shown in FIG. 39B with respect to the thickness of one of the connecting members 1028 of frame 1000. In one embodiment, thickness S can be 3½ inches and in another embodiment, the thickness S can be 5½ inches. However, in yet other embodiments, the magnitude of thickness S can be different than 3½ inches or 5½ inches. Each of the tracks of the frame 1000 can have a thickness "T", as shown in FIG. 36 with respect to the thickness of the bottom exterior track 1008. The magnitude of the thickness T can be equal to the thickness S plus two times the thickness of the material of construction of the tracks. For example, if the tracks are made from 16 gauge galvanized steel, the thickness T can be equal to the thickness S plus two times $1/16^{th}$ inches (0.0625 inches), or the thickness S plus $1/8^{th}$ inch (0.125 inches).

When the frame 1000 of building panel 1099 is positioned on the panel frame assembly fixture 12, for example on the first side frame 32 as shown in FIG. 7, the studs and connecting members of the frame 1000 can extend horizontally and the tracks of the frame 1000 can extend vertically. However, when the building panel 1099 is installed in a structure, each of the studs and the connecting members of the frame 1000 can extend vertically and each of the tracks of the frame 1000 can extend horizontally. As shown in FIG. 7, the first side exterior stud 1002 of frame 1000 can be supported by the lower horizontal member 46 of the first side frame 32, and the following studs of the frame 1000 can be supported by one or more of the pegs 51: the first side interior stud 1020, the second side interior stud 1022, the second side exterior stud 1004, each of the connecting members 1028 and each of the connecting members 1030. The tracks and studs of the frame 1000, and the connecting members and tracks of the frame 1000, can be attached to one another by welding, e.g., spot welding or MIG welding, or alternatively, can be attached to one another with epoxy.

Figure 11:
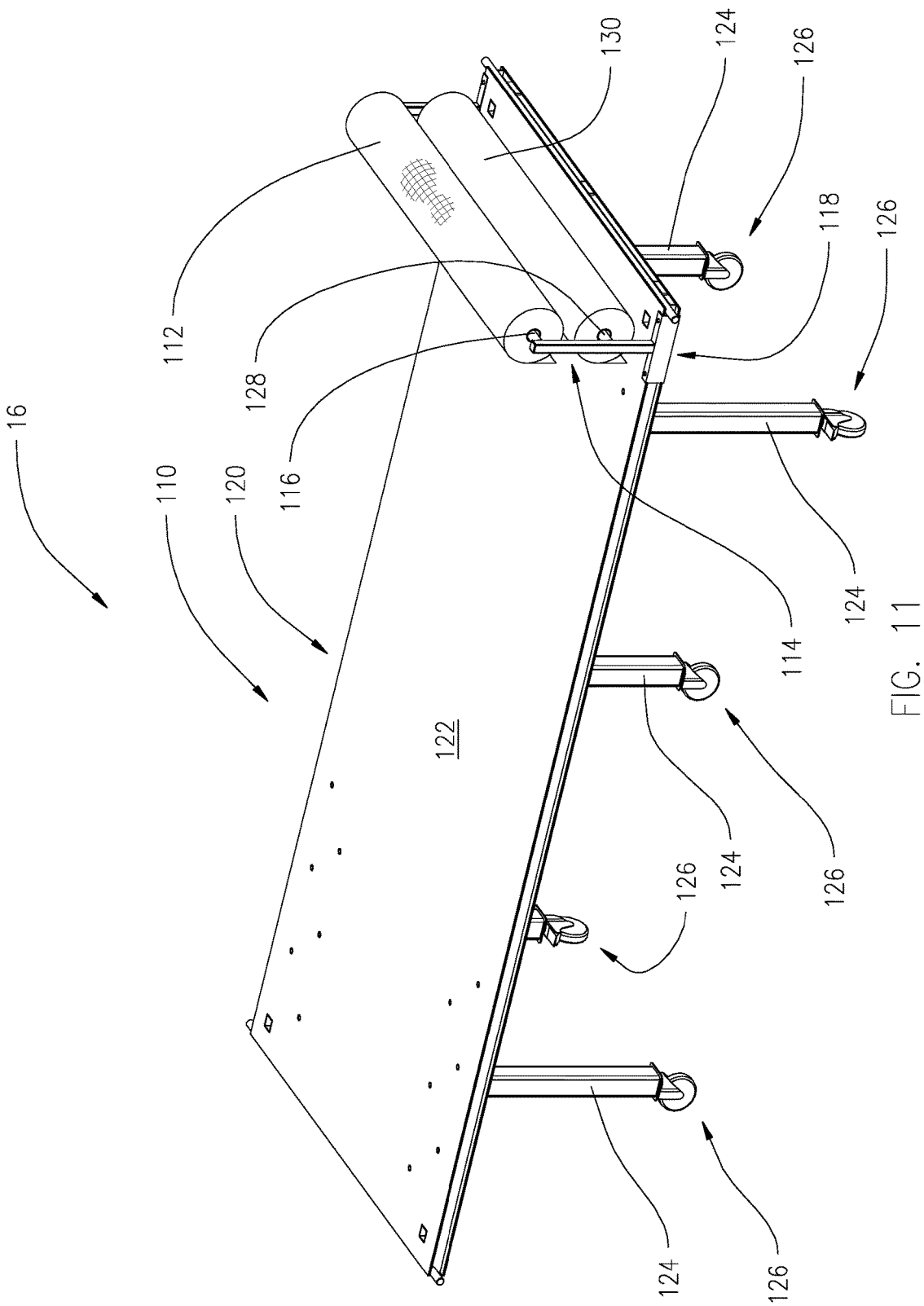
FIG. 11 is a perspective view of a panel fabric application assembly of the system of FIG. 1, according to one embodiment.

As shown in FIGS. 11, 12 and 14, the panel fabric application assembly 16 can include a support structure 110. A frame of a building panel, e.g., frame 1000 of window panel 1099 assembled using the panel frame assembly fixture 12, can be placed on the support structure 110 of the panel fabric application assembly 16 for application of a fabric 112 to one or both sides of the frame. The fabric 112 can provide increased tensile strength for building panels, e.g., building panel 1099. The fabric 112 can be made of a polymeric material, and can be either a woven or a nonwoven material. When the fabric 112 is a woven material, the fabric 112 can define a plurality of relatively small apertures or pores, such that the fabric 112 can be porous or micro-porous. In other embodiments, building panels may not include any fabric applied to the frame of the building panel. This can be advantageous in certain applications, e.g., houses having stucco exteriors, where it can be desirable to apply the stucco directly to the frame and foam of the building panels included in exterior walls of the houses.

The panel fabric application assembly 16 can also include a spindle assembly 114, which can facilitate applying the fabric 112 to a frame of a building panel, e.g., frame 1000 of the building panel 1099. The spindle assembly 114 can be connected to the support structure 110. The spindle assembly 114 can include a first spindle 116, which can be rotatably coupled with a spindle support structure 118. The spindle support structure 118 can be attached to the support structure 110 of the panel fabric application assembly 16. The spindle assembly 114 can also include a second spindle 128, which can also be rotatably coupled with the spindle support structure 118.

In one embodiment, as shown in FIGS. 11, 12 and 14, the support structure 110 of the panel fabric application assembly 16 can be a table. In this embodiment, the support structure 110 can include a top 120. The top 120 can include a top surface 122, which can be flat. In the embodiment shown in FIGS. 11, 12 and 14, the support structure 110 can also include a plurality of legs 124 that can be attached at an upper end to the top 120. The panel fabric application assembly 16 can also include a plurality of casters 126, which can be swivel-type casters. Each of the casters 126 can be rotatably coupled with one of the legs 124. The casters 126 can facilitate moving the panel fabric application assembly 16 to a desired location within a manufacturing facility.

After a frame of a panel has been assembled on the panel frame assembly fixture 12, the frame can be placed on the top surface 122 of the top 120 of the support structure 110 of the panel sheet application assembly 16. For example, the frame can be positioned so that the rear surfaces of the studs and tracks of the frame rest on the top surface 122, to apply the fabric 112 to the front surfaces of the studs and tracks of the frame. The frame can then be turned over so that the front surfaces of the studs and tracks of the frame contact the top surface 122, to apply the fabric 112 to the rear surfaces of the studs and tracks of the frame. FIGS. 12 and 14 illustrate the frame 1000 of window panel 1099 disposed on the top surface 122 of the top 120 of the support structure 110. The fabric 112 can be wound around the rotatable first spindle 116, and can be pulled off as required for application to the frame 1000 of panel 1099. FIGS. 12 and 13 illustrate the fabric, designated 112a, applied to a first surface, which can be a front surface, of the studs and tracks of the frame 1000 of the window panel 1099. FIGS. 14 and 15 illustrate the fabric 112 applied to both the front and rear surfaces of the studs and tracks of the frame 1000. One or more pieces of the fabric 112, designated 112a in FIGS. 13 and 15, can be applied to the front surfaces of the studs and tracks of the frame 1000, and one or more pieces of the fabric 112, designated 112b in FIG. 15, can be applied to the rear surfaces of the studs and tracks of the frame 1000. For example, the fabric 112 can be applied to the rear surface 1066 (FIG. 36) and the front surface 1068 (FIG. 36) of the bottom exterior track 1008 of the panel 1000. The fabric 112 can be bonded to both the front and rear surfaces of the studs and tracks of frame 1000, e.g., using glue, or other adhesives.

The fabric 112 can cover each of the cavities defined by the studs and tracks of the frame 1000, e.g., cavities 1044 and 1046 (FIG. 13). The cavities defined by the frame 1000, e.g., cavities 1044 and 1046 can be subsequently filled with foam. The fabric 112 can be applied to frame 1000 so that it extends across the entire front and rear surfaces of the frame 1000, extending to a periphery of the frame 1000. Also, the fabric 112 can be applied so that an opening 1060 defined by the frame 1000, which can be sized and configured to receive a window pane (not shown) is not covered, or is unobstructed, by the fabric 112. Injection apertures defined by a frame of a building panel, e.g., the injection apertures 1007 and 1009 defined by frame 1000 of building panel 1099, can be formed, e.g., by drilling, while the frame 1000 is positioned on the support structure 110.

The panel fabric application assembly 16 can also include a spindle 128. Cellophane 130 can be wound around the spindle 128 and can be pulled off (FIG. 14) as required to wrap cellophane 130 around a frame of a building panel, e.g., frame 1000 of window panel 1099, as indicated generally by arrow 132 in FIG. 15. Cellophane 130 can be wrapped around a frame of a building panel, e.g., frame 1000, after applying the fabric 112 to the frame 1000, and prior to injecting an expandable polymer into cavities defined by the frame 1000, while it is disposed on the multi-panel consolidation device 20. The cellophane 130 can prevent, or at least substantially prevent, foam from being bonded to the multi-panel consolidation device 20, during the process of injecting the expandable polymer into the cavities defined by the frame 1000, and allowing the foam to cure and bond to the frame 1000. The cellophane 130 can be removed after the foam has cured and the window panel 1099 has been removed from the multi-panel consolidation device 20.

FIGS. 16-31 illustrate the multi-panel consolidation device 20 of system 10 according to one embodiment. After a frame, e.g., frame 1000, has been assembled on the panel frame assembly fixture 12, and fabric 112 has been applied to the frame, e.g., frame 1000, using the panel fabric application assembly 16, for the building panels that include the fabric 112, the frame can be placed on the multi-panel consolidation device 20 for injection of an expandable polymer that forms a foam, e.g., a foam 500, into the cavities defined by the frame, e.g., the cavities defined by frame 1000. The multi-panel consolidation device 20 can include a base 150, which can include an upper surface 151, and a plurality of posts 152 that can be attached to the base 150, and can extend upwardly from the base 150. The multi-panel consolidation device 20 can also include an upper frame 154, which can be attached to the each of the posts 152.

As shown in FIGS. 17-18, the upper frame 154 can include a first side member 158, a second side member 160, which can be laterally spaced from the first side member 158, a first end member 162 and a second end member 164, which can be longitudinally spaced from the first end member 162. Each of the first side member 158 and the second side member 160 can be attached to each of the first end member 162 and the second end member 164. The upper frame 154 can also include a plurality of interior members, e.g., lateral support members 166, which can be connected to one or more of the first side member 158, the second side member 160, the first end member 162, and the second end member 164. The first side member 158, the second side member 160, the first end member 162 and the second end member 164, can cooperate to form four corner portions, each indicated generally at 170, of the upper frame 154. The multi-panel consolidation device 20 can include a plurality of casters 172, which can be swivel-type casters. One of the casters 172 can be attached to a caster mount member 171 that can be attached to, and can extend downwardly from, the base 150, as shown in FIG. 18. Each of the remaining casters 172 can be attached to one of the posts 152, and can facilitate moving the multi-panel consolidation device 20 within a manufacturing facility as desired. In other embodiments, the multi-panel consolidation device 20 can include more or less casters.

The multi-panel consolidation device 20 can include an upper structure 180 (FIGS. 16-17, 19-20), which can be movably coupled with the posts 152, and can be movable vertically downwardly and upwardly relative to the base 150, the posts 152, and the upper frame 154. The multi-panel consolidation device 20 can include a plurality of collars 182 (FIGS. 16-18). Each of the collars 182 can be attached to the upper structure 180, and can at least partially surround one of the posts 152. The collars 182 can be slideable along the posts 152, such that the collars 182 can movably couple the upper structure 180 with the posts 152. The upper structure 180 can include a base 184 (FIGS. 18-19), which can include a lower surface 186 (FIGS. 18-20), which can be a lower surface of the upper structure 180. As shown in FIG. 17, the upper structure 180 can also include a first side member 188, a second side member 190 laterally spaced from the first side member 188, a first end member 192 and a second end member 194 longitudinally spaced from the first end member 192. Each of the first side member 188 and the second side number 190 can be attached to each of the base 184, the first end member 192 and the second end member 194.

The multi-panel consolidation device 20 can include a plurality of shelves 200 (FIGS. 16-21), and a plurality of link assemblies 210 (FIGS. 16-18, 23, 25). The shelves 200 can be vertically spaced, and can be disposed vertically between the base 150 and the upper structure 180. The shelves 200 can be connected to the upper structure 180, and can be interconnected with one another, with the link assemblies 210. The shelves 200 can be movable upwardly and downwardly relative to the posts 152 and the base 150 between an expanded configuration shown in FIGS. 16, 18, 19 and 21, and a collapsed configuration shown in FIGS. 17 and 20. At least some of the shelves 200 can be movable relative to one another. Each of the shelves 200 can include a lower surface 202 (FIGS. 16, 18-20) and an upper surface 204 (FIGS. 16 and 18). The shelves 200 can include a lower plate 212, an upper plate 214 (FIG. 22), and a plurality of laterally extending ribs 216 disposed vertically between the lower plate 212 and the upper plate 214, for example, in the embodiment of the shelves 200 illustrated in FIGS. 16-30. In this embodiment the lower surface 202 of shelf 200 can be a lower surface of the lower plate 212, and the upper surface 204 of shelf 200 can be an upper surface of the upper plate 214. The ribs 216 can be attached to one or both of the lower plate 212 and the upper plate 214. In other embodiments, shelves 200 can have a different configuration. For example, a single plate can be used instead of the lower plate 212, upper plate 214 and ribs 216. In one embodiment, the ribs 216 of each of the shelves 200, can be at least substantially aligned with the ribs 216 of each vertically adjacent one of the shelves 200.

Figures 23, 24:
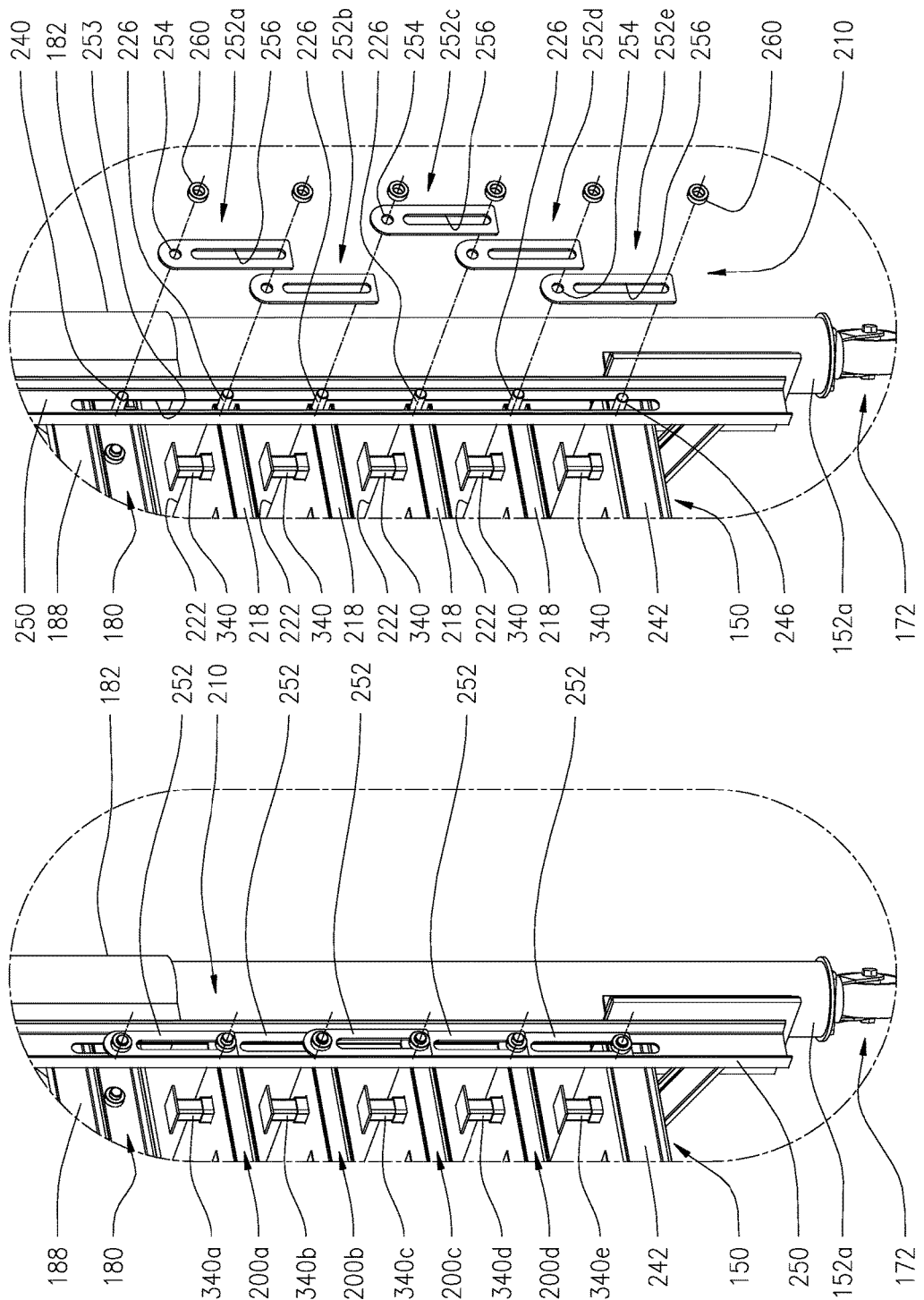
FIG. 23 is an enlarged perspective view of an encircled portion of FIG. 16, depicting a portion of a link assembly, and a portion of the shelves, of the multi-panel consolidation device, with the shelves in an expanded configuration.
FIG. 24 is an enlarged perspective view similar to FIG. 23, but with a plurality of the links of the link assembly exploded away from the remainder of the link assembly.

Shelves 200 can include a first side member 218 (FIGS. 16 and 24) and a second side member 220 (FIG. 16), which can be laterally spaced from the first side member 218. Shelves 200 can also include a forward end structure 222 (FIGS. 24 and 26) and a rearward end structure 224 (FIG. 16), which can be longitudinally spaced from the forward end structure 222. Each of the first side member 218, the second side member 220, the forward end structure 222 and the rearward end structure 224 can be attached to one of, or any combination of, the lower plate 212, the upper plate 214 and the ribs 216. The forward end structure 222 can include an elongate member 226 (FIGS. 24 and 26), which can protrude outwardly beyond each of the first side member 218 and the second side member 220. The rearward end structure 224 can include an elongate member 228 (FIG. 16), which can protrude outwardly beyond each of the first side member 218 and the second side member 220. At least each end of each one of the elongate member 226 and the elongate member 228 can have a cylindrical shape, and in one embodiment can be a solid cylinder. Referring to FIGS. 24 and 26, the upper structure 180 can include a plurality of studs 240, with two of the studs protruding laterally outwardly from the first side member 188 and two of the studs 240 protruding outwardly from the second side member 190 of the upper structure 180. The base 150 can include a first side member 242 (FIG. 16), a second side member 244 (FIG. 16), which can be laterally spaced from the first side member 242, and a plurality of studs 246. Two of the studs 246 can be attached to, and can extend laterally outwardly from, the first side member 242, and two of the studs 246 can be attached to, and can extend laterally outwardly from, the second side member 244, as shown in FIGS. 24 and 26 for one of the studs 246 and the first side member 242.

In the embodiment shown in FIGS. 16-31, the multi-panel consolidation device 20 can include four of the link assemblies 210. Referring to FIGS. 23-26, each of the link assemblies 210 can include a guide member 250 and a plurality of links 252. For each of the link assemblies 210, the guide member 250 can be attached, at an upper end, to the upper frame 154 of the multi-panel consolidation device 20. Each of the guide members 250 can be attached, at a lower end, to one of the posts 152 and/or to the base 150. Each of the guide members 250 can define a slot 253, as shown in FIGS. 24 and 26 for one of the guide members 250, which can be attached to a right side, forward one of the posts, designated 152*a* in FIGS. 23-25, and can be attached to the upper frame 154 adjacent a right side, forward one of the corner portions 170 (FIGS. 16 and 17) of the upper frame 154.

Each of the links 252 can define an upper aperture 254 and a slot 256 (FIGS. 24 and 26), which can be disposed below the upper aperture 254 and can extend longitudinally. For each of the link assemblies 210, one of the studs 240 of the upper structure 154 can extend through the slot 253 defined by the guide member 250 and the upper aperture 254 of the uppermost one of the links, identified as link 252*a* in FIGS. 24 and 26 for one of the link assemblies 210. Each stud 240 can be secured by one of a plurality of female fasteners 260. For each of the link assemblies 210, one of the studs 246 of the base 150 can extend through the slot 253 defined by the guide member 250 and the slot 256 defined by a lowermost one of the links 252, identified as link 252*e* in FIGS. 24 and 26 for one of the link assemblies 210. For each of two forward ones of the link assemblies 210, i.e., the link assemblies 210 that are disposed adjacent to the forward ones of the posts 152, identified as posts 152*a* and 152*b* in FIG. 17, the elongate member 226 of each shelf 200 can extend through the slot 253 defined by the guide member 250, through an upper aperture 254 of a first one of the links 252 (e.g., link 252*c* in FIGS. 24 and 26), and through the slot 256 defined by a vertically adjacent, second one of the links 252 (e.g., link 252*b* in FIGS. 24 and 26), which extends above the first one of the links (e.g., link 252*c*). Similarly, for each of two rearward ones of the link assemblies 210, i.e., the link assemblies 210 that are disposed adjacent to the rearward ones of the posts 152, identified as posts 152*c* and 152*d* in FIG. 17, the elongate member 228 of each shelf 200 can extend through the slot 253 defined by the guide member 250, through an upper aperture 254 of a first one of the links 252, and through the slot 256 defined by a vertically adjacent, second one of the links 252, which extends above the first one of the links 252. The overlapping relationship between the upper aperture 254 defined by a lower one of a vertically adjacent pair of the shelves 200, and the slot 256 defined by an upper one of a vertically adjacent pair of the shelves 200, facilitates moving the shelves 200 vertically between the expanded and collapsed configurations.

Figure 31:
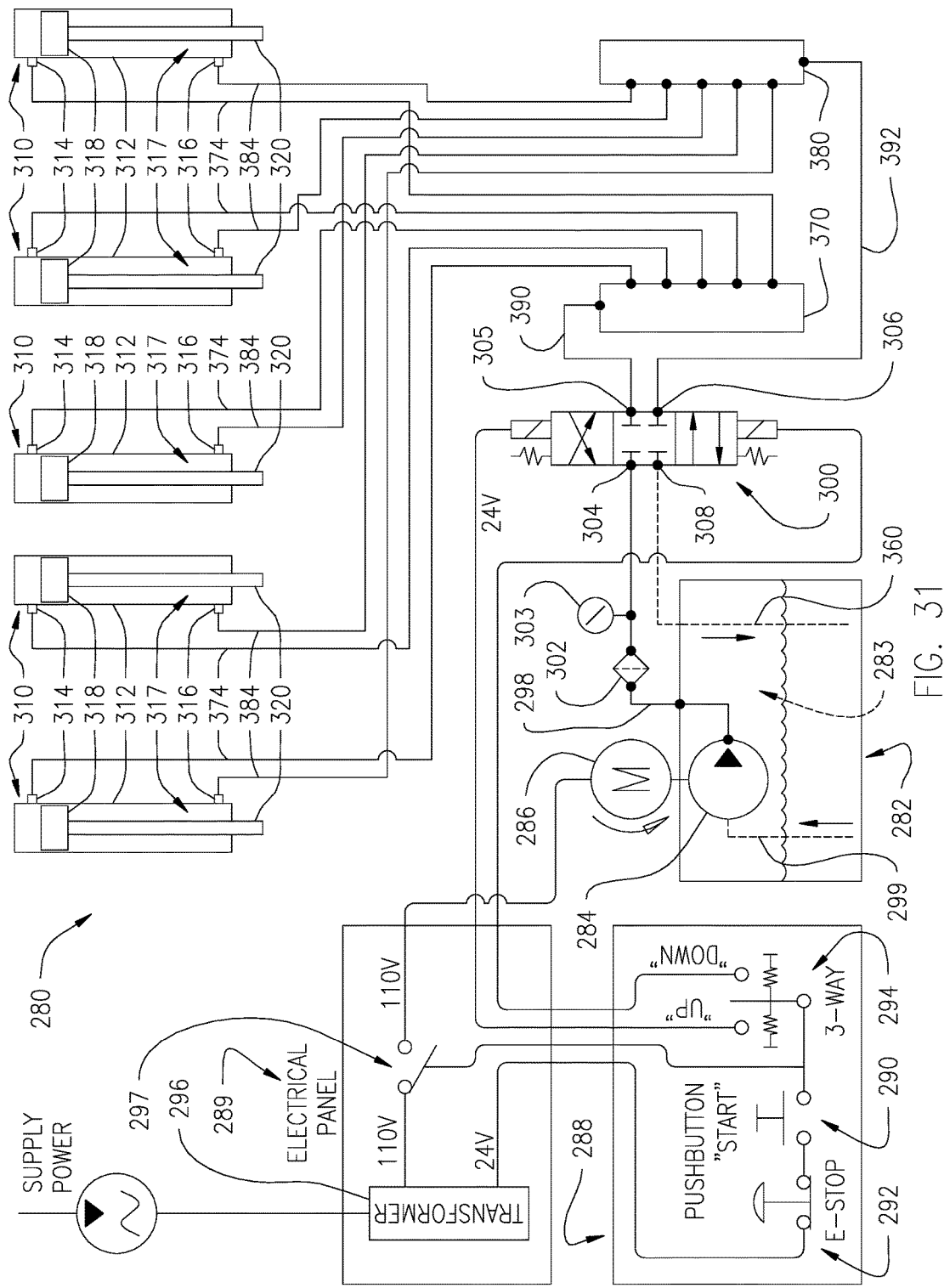
FIG. 31 is a schematic representation of a hydraulic system of the multi-panel consolidation device of FIG. 16.

The multi-panel consolidation device 20 can include a hydraulic system 280, which is illustrated schematically in FIG. 31. Portions of the hydraulic system 280 are also shown in FIGS. 16-21, and 25-30. The hydraulic system 280 can provide the motive force to move the upper structure 180 and the shelves 200 downwardly and upwardly, with the shelves 200 being movable between the expanded configuration shown in FIG. 16 and the collapsed configuration shown in FIG. 17. The hydraulic system 280 can include a source of hydraulic fluid 282, e.g., a tank or other container that defines an interior chamber 283 suitable for containing hydraulic fluid, a pump 284, and an electric motor 286, which can be electrically coupled with the pump 284 and can be operable for turning the pump 284 on and off. The hydraulic system 280 can also include an operator console 288 (FIGS. 16-18, 31), which can be positioned so that an operator (not shown) can view the multi-panel consolidation device 20 while standing at the operator console 288. The operator can turn the electric motor 286, and therefore the pump 284, on and off, by depressing or releasing a start button 290. The electric motor 286 and the pump 284 can also be turned off by depressing an emergency stop button 292, which can be located on the operator console 288. The operator console 288 can also include a switch 294 that can include up and down positions, which can cause the upper structure 180 and the shelves 200 to move upwardly and downwardly, respectively. The switch 294 can be configured such that an operator must maintain the switch 294 in either the up or down positions to maintain movement of the upper structure 180 and the shelves 200. The switch 294 can also include a neutral, off position. The operator console 288 can also include a plurality of indicator lights 295, and each of the lights 295 can correspond to one of the buttons 290, 292 and the switch 294.

The hydraulic system 280 can include an electrical panel 289, which can be supported by the upper frame 154 of the multi-panel consolidation device 20. Electrical power can be supplied to a transformer 296, which can be attached to the electrical panel 289. The transformer 296 can provide 24 VDC to the emergency stop button 292, as shown in FIG. 31. When the start button 290 is depressed, 24 VDC can be supplied to a normally open switch 297, causing the switch 297 to close, such that the electrical power can be supplied to the motor 286 from the transformer 296, which can start the motor 286. In one embodiment, the motor can utilize 110 VAC, as shown in FIG. 31. In another embodiment, the motor can utilize 220 VAC.

The pump 284 can include an inlet port and a discharge port. When the pump 284 is on, hydraulic fluid can be drawn from the source of hydraulic fluid 282, through a conduit 299 and into the pump inlet port. As shown in FIG. 31, a lower end of the conduit 299 can be immersed in the hydraulic fluid within the interior chamber 283. Pressurized hydraulic fluid can discharge from the discharge port of the pump 284 into a pump discharge conduit 298, which can extend to a distribution valve 300. A filter 302 and a pressure gauge 303 can be in fluid communication with the conduit 298. The hydraulic system 280 can also include a pressure relief valve (not shown), which can be in fluid communication with the pump discharge conduit 298, and can prevent over pressurization of the portion of the hydraulic system downstream of the pump 284. The distribution valve 300 can include fluid ports 304, 305, 306 and 308. The pump discharge conduit 298 can be in fluid communication with the fluid port 304 of the distribution valve 300. The hydraulic system 280 can include a return conduit 360, which can be in fluid communication with the fluid port 308 of the distribution valve 300 and the interior chamber 283 defined by the source of hydraulic fluid 282.

The hydraulic system 280 can also include a plurality of hydraulic cylinders 310 (FIGS. 16-18), which can be in selective fluid communication with the source of hydraulic fluid 282, e.g., when the motor 286 and the pump 284 have been turned on and are operating. Each of the hydraulic cylinders 310 can include a housing 312, which can include a first fluid port 314 and a second fluid port 316, and can define an interior chamber 317 (FIG. 31). The interior chamber 317 defined by each of the hydraulic cylinders 310 can be in selective fluid communication with the interior chamber 283 defined by the source of hydraulic fluid 282.

Each of the fluid ports 314 and 316 can be in fluid communication with the interior chamber 317. Each of the hydraulic cylinders 310 can also include a piston 318, which can be disposed within the interior chamber 317 defined by the housing 312. Each of the hydraulic cylinders 310 can also include a piston rod 320 (FIGS. 17 and 19-21), which can be attached to the piston 318, and can be movable upwardly and downwardly with the piston 318. A portion of the piston rod 320 can be disposed within the interior chamber 317 and a portion of the piston rod 320 can extend below the housing 312. Hydraulic system 280 can include a first manifold 370, a plurality of conduits 374 that can be in fluid communication with the first manifold 370, a second manifold 380 and a plurality of conduits 384 that can be in fluid communication with the second manifold 380. Each of the conduits 374 can also be in fluid communication with the fluid port 314 of one of the hydraulic cylinders 310, and each of the conduits 384 can also be in fluid communication with the fluid port 316 of one of the hydraulic cylinders 310.

The multi-panel consolidation device 20 can include a plurality of hollow tubes 156 (FIGS. 16 and 17), which can be attached to the upper frame 154 of the multi-panel consolidation device 20, e.g., welded. At least a portion of the housing 312 of each of the hydraulic cylinders 310 can be disposed within an interior space defined by one of the hollow tubes 156. In one embodiment, each of the housings 312 can be coupled, at an upper end, with one of the hollow tubes 156. In one embodiment, each of the housings 312 can be pivotally coupled, at an upper end, with one of the hollow tubes 156, which can permit the housings 312 to pivot relative to a corresponding one of the hollow tubes 156. Each of the housings 312 can extend below the corresponding one of the hollow tubes 156. A distal end 322 (FIG. 21) of each of the piston rods 320 can be coupled with the upper structure 180. In one embodiment, the distal end 322 of each of the piston rods 320 can be pivotally coupled with a mount structure 324 of the upper structure 180. The mount structure 324 can include a pin, and an associated bracket, or brackets, which can permit the piston rod 320 to pivot relative to the upper structure 180.

The pivotal coupling of the upper end of each of the housings 312 with the corresponding one of the hollow tubes 156, combined with the pivotal coupling of the distal end 322 of each of the piston rods 320 with the corresponding one of the mount structures 324 of the upper structure 180, can facilitate maintaining an alignment between the pistons 318 and the piston rods 320 with the housings 312. This can prevent binding of the pistons 318 within the housings 312, which could at least inhibit the ability of the upper structure 180 and the shelves 200 to move upwardly and downwardly. Also, in the embodiment of FIG. 31, the hydraulic system 280 can include five of the hydraulic cylinders 310. The piston rod 320 of one of the hydraulic cylinders 310 can be coupled with the upper frame 154 at the longitudinal and lateral center of the upper frame 154, or in close proximity to the longitudinal and lateral center of the upper frame 154. This piston rod 320 can be aligned with the central one of the ribs 216 of each of the shelves 200. The piston rod 320 of each of the remaining four hydraulic cylinders 310 can be coupled with the upper frame at, or in close proximity to, one of the corner portions 170 of the upper frame 154. This positioning of the hydraulic cylinders 310 can facilitate smooth and consistent operation of the multi-panel consolidation device 20, i.e., that can prevent, or at least inhibit, binding of one or more of the collars 182 with the posts 152, as the collars 182 slide along the posts 152 as the upper structure 180 and the shelves 200 move upwardly and downwardly.

When an operator wants to force the shelves 200 of the multi-panel consolidation device 20 downwardly from an expanded configuration to a collapsed configuration, the operator can turn the switch 294 to the down position, and maintain the switch 294 in this position until the shelves 200 are in the collapsed configuration. When the switch 294 is in the down position, the fluid ports 304 and 305 of the distribution valve 300 can be in fluid communication. As a result the pump discharge conduit 298 can be in fluid communication with a conduit 390, which can be in fluid communication with the fluid port 305 and the first manifold 370. Relatively high pressure hydraulic fluid can flow through the pump discharge conduit 298, distribution valve 300 and conduit 390 to the first manifold 370. The relatively high pressure hydraulic fluid can then flow through each of the conduits 374 to the fluid ports 314 of the hydraulic cylinders 310, and into the interior chambers 317 defined by the housings 312 of the hydraulic cylinders 310, on an upstream side of the pistons 318. As a result, the pistons 318 and piston rods 320 can be forced downwardly, such that the piston rods 320 are in an extended position.

Due to the attachment of the piston rods 320 to the upper structure 180 and the connection of the shelves 200 to the upper structure 180, via the link assemblies 210, the shelves 200 can be forced downwardly with the upper structure 180, toward the collapsed configuration of the shelves 200. As the piston 318 of each hydraulic cylinder 310 is forced downwardly, the relatively low pressure hydraulic fluid within the interior chamber 317, on the downstream side of the piston 318, can be forced out of the fluid port 316 of the hydraulic cylinder 310 and through one of the conduits 384 to the second manifold 380. The relatively low pressure hydraulic fluid can discharge from the second manifold 380 through a conduit 392 to the fluid port 306 of the distribution valve 300. When the switch 294 is in the down position, the fluid ports 306 and 308 of the distribution valve 300 can be in fluid communication. As a result, the relatively low pressure hydraulic fluid can flow through the distribution valve 300 and into the interior chamber 283 defined by the source of hydraulic fluid 282, via the return conduit 360.

Similarly, when the pump 284 is on and the switch 294 is in the up position, relatively high pressure hydraulic fluid in the pump discharge conduit 298 can be supplied to a downstream side of each of the pistons 318. This can force each of the pistons 318 and the associated piston rods 320 upwardly, which in turn, can force the upper structure 180, and the shelves 200, to move upwardly toward an expanded configuration of the shelves 200. When the switch 294 is in the up position, the fluid ports 304 and 306 of the distribution valve 300 can be in fluid communication, and the fluid ports 308 and 305 can be in fluid communication. As a result, the relatively high pressure hydraulic fluid in the pump discharge conduit 298 can flow through the distribution valve 300 and conduit 392 to the second manifold 380. The relatively high pressure hydraulic fluid can then flow through the conduits 384 to the fluid ports 316 of the hydraulic cylinders 310, and into the interior chamber 317 of each of the hydraulic cylinders 310, on the downstream side of the respective piston 318. This can force the pistons 318 and the piston rods 320 upwardly, such that the piston rods 320 are in a retracted position. The upward movement of the pistons 318 can force the relatively low pressure hydraulic fluid on the upstream side of the pistons 318 to discharge through the fluid ports 314 to the first manifold 370 via the conduits 374. The relatively low pressure hydraulic fluid can then flow through conduit 390, distribution valve 300 and conduit 360 into the chamber 283 defined by the source of hydraulic fluid 282.

Figure 27:
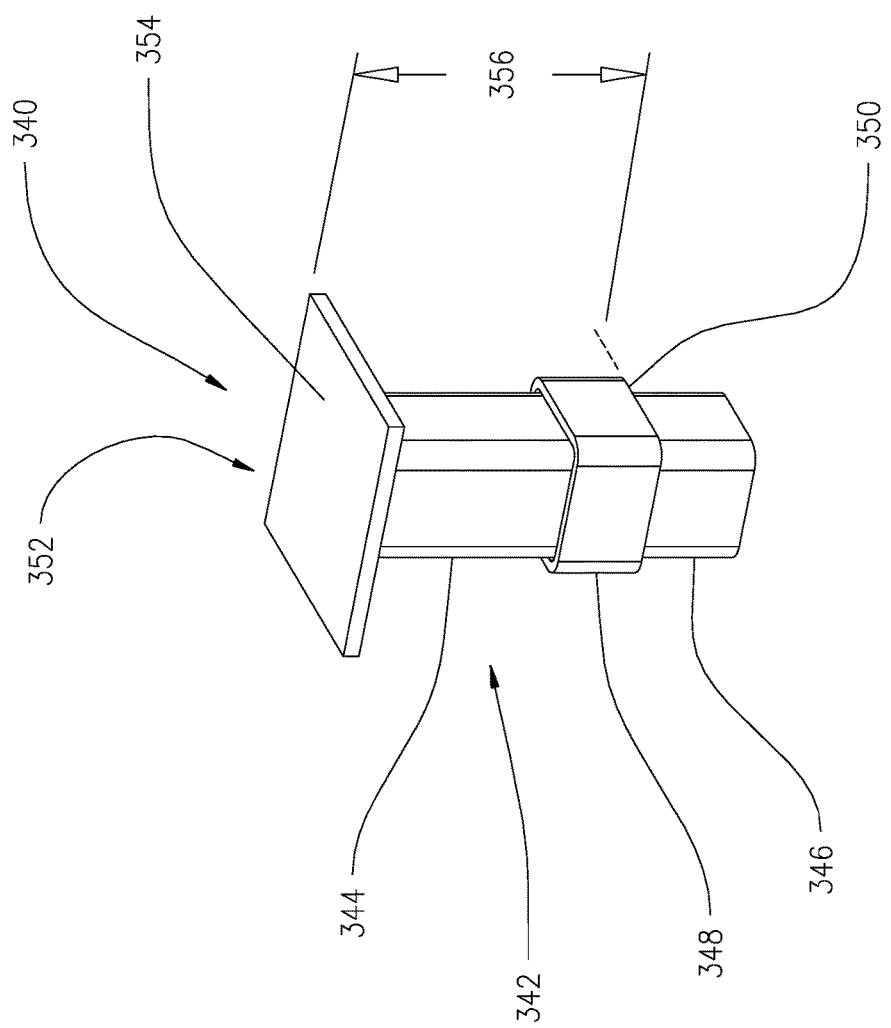
FIG. 27 is an enlarged perspective view of a spacer of the multi-panel consolidation device of FIG. 16.

The multi-panel consolidation device 20 can include a plurality of spacers 340. As shown in FIG. 27, spacers 340 can include a stem 342, which can include an upper portion 344 and a lower portion 346. Spacers 340 can also include a collar 348, which can include a lower surface 350, and can at least partially surround the stem 342. The spacers 340 can also include a contact plate 352, which can include a contact surface 354. The contact plate 352 can be attached to the upper portion 344 of the stem 342. Each of the spacers 340 can be releasably connected to the base 150 or one of the shelves 200 of the multi-panel consolidation device 20. In one embodiment, the lower portion 346 of the stem 342 of each spacer 340 can be disposed within an aperture (not shown) defined by the base 150 or an aperture (not shown) defined by a respective one of the shelves 200. Each spacer 340 can extend into a space 230 between the base 150 and a lowermost one of the shelves 200, a space 232 between the uppermost one of the shelves 200 and the upper structure 180, or a space 234 between two vertically adjacent ones of the shelves 200. The collar 348 can be sized and configured such that it is larger than the aperture into which the lower portion 346 of the stem 342 is inserted. Accordingly, the lower surface 350 of the collar 348 of each spacer 340 can contact the upper surface 151 of the base 150, or the upper surface 204 of one of the shelves 200, to which the spacer 340 is releasably connected.

Referring to FIGS. 23 and 25, a first plurality of the spacers 340, identified as 340a, can be releasably connected to, and can extend upwardly from, an uppermost one of the shelves 200, identified as 200a. A second plurality of the spacers 340, identified as 340b, can be releasably connected to, and can extend upwardly from, the shelf 200 identified as 200b. A third plurality of the spacers 340, identified as 340c, can be releasably connected to, and can extend upwardly from, the shelf 200 identified as shelf 200c. A fourth plurality of the spacers 340, identified as 340d, can be releasably connected to, and can extend upwardly from, the shelf 200 identified as shelf 200d. A fifth plurality of the spacers 340, identified as 340e, can be releasably connected to, and can extend upwardly from, the base 150. When the shelves 200 are in an expanded configuration, as shown in FIG. 16, each of the first plurality of the spacers 340a can be vertically spaced below the upper structure 180, and each of the spacers 340b, 340c, 340d and 340e of each of the second, third, fourth, and fifth pluralities, respectively, of the spacers 340 can be vertically spaced below the respective shelf 200 which is disposed immediately above the spacer 340, as shown in FIGS. 16, 18, 19, 21, 23 and 24.

The spacer 340 can include a height 356 (FIG. 27), which can extend between the lower surface 350 of the collar 348 and the upper surface 354 of the contact plate 352. When the shelves 200 are in the collapsed configuration (FIGS. 17, 20, 25 and 26): the upper surface 354 of the contact plate 352 of each of the spacers 340a can contact the lower surface 186 of base 184 of the upper structure 180; the upper surface 354 of the contact plate 352 of each of the spacers 340b can contact the lower surface 202 of the shelf 200a; the upper surface 354 of the contact plate 352 of each of the spacers 340c can contact the lower surface 202 of the shelf 200b; the upper surface 354 of the contact plate 352 of each of the spacers 340d can contact the lower surface 202 of the shelf 202c; and the upper surface 354 of the contact plate 352 of each of the spacers 340e can contact the lower surface 202 of the shelf 202d. The height 356 of spacer 340 can be the same as, or substantially the same as the thickness S of the studs of a frame of a building panel, e.g., the thickness S of one of the upper interior connecting members 1028 of the frame 1000 of the building panel 1099, as shown in FIG. 39B. In one embodiment, the height 356 can be 3½ inches. In another embodiment, the height 356 can be 5½ inches. In an aspect of the invention, the height of the spacers 340 defines the minimum distance between the respective surfaces of successive shelves, limits any crushing of the studs or tracks of a frame beyond such minimum distance. Once the lower surface of a descending upper shelf has contacted the upper surfaces of the spacers, the shelf can descend no further, and the spacers 340 withstand the any increased force applied to the shelf. This can prevent the studs of the frames of the building panels disposed on the base 150 and the shelves 200 from being crushed when the shelves 200 are in the collapsed configuration. The lower surface 186 of the base 184 of the upper structure 180, or the lower surface 202 of one of the shelves 200 can contact and apply a first compressive force to the contact surfaces 354 of the spacers 340, and can apply a second compressive force, less than the first compressive force, to the top surface of the studs of each of the frames positioned on the base 150 and the shelves 200. The spacers 340 are non-compressible to the force of the descending shelf. In one embodiment, the tracks of each frame positioned on the base 150 or one of the shelves 200 can be crushed, or deformed somewhat under the second compressive force, since the thickness T of the tracks of the frames can be greater than the thickness S of the studs of the frames. The structural integrity of the frames can be maintained despite the deformation of the tracks. In another embodiment, the thickness T of the tracks can be the same as the thickness S of the studs.

The multi-panel consolidation device 20 can include a plurality of panel positioning members 205 (FIGS. 16 and 17), which can facilitate positioning a frame of a building panel (e.g., frame 1000 of building panel 1099) on the base 150, or any one of the shelves 200. In one embodiment, four of the panel positioning members 205 can be attached to the base 150 and four of the panel positioning members 205 can be attached to each of the shelves 200. In one embodiment, one pair of the panel positioning members 205, designated 205a in FIG. 16 for one of the panel positioning members 205, can be fixedly attached (e.g., welded) to each of the shelves 200 adjacent to one end of the shelf 200. Another pair of the panel positioning members 205, designated 205b in FIG. 16 for one pair of the panel positioning members 205, can be releasably attached to each of the shelves 200, adjacent an opposite end of the shelf. Two pairs of panel positioning members 205 can be attached to the base 150 in a similar manner. In other embodiments, each of the panel positioning members 205 can be releasably attached, or fixedly attached, to the base 150 or one of the shelves 200. A first one and a second one of each pair of the panel positioning members 205 can be positioned equidistant from the forward end structure 222 and the rearward end structure 224 of the shelf 200, or from the forward and rearward surfaces of the base 150, to which the panel positioning members 205 are attached. The base 150 and each shelf 200 can define a plurality of apertures 206, which can accept pins (not shown), or similar members, of the panel positioning members 205.

Each of the panel positioning members 205 can include a first leg 207 (FIG. 17) and a second leg 208 (FIG. 17), which can define a 90 degree angle. This configuration of the panel positioning members 205 can facilitate positioning each corner of a frame of a building panel (e.g., frame 1000 of building panel 1099) against one of the panel positioning members 205, which can control the position of the frame on the base 150 or one of the shelves 200. The apertures 206 can be arranged to facilitate positioning frames of building panels having a variety of lengths, for example, eight, nine and ten feet. For example, the frame 1000 of building panel can have a width 1078 and a length 1080, and in certain embodiments, the length 1080 can be eight feet, nine feet or ten feet. In one embodiment, the width 1078 can be four feet, but can have different widths in other embodiments.

When the shelves 200 are in the expanded configuration, either one, or a plurality of frames of building panels can be positioned on the multi-panel consolidation device 20, for injection of an expandable polymer into the cavities defined by the frames, to form an expanded foam in each of the cavities. The expanded foam, when fully cured and stabilized, forms a light-density closed-cell structure that is semi-rigid. A typical density of the foam can range from about 2.0 lbs/ft$^3$ to about 3.0 lbs/ft$^3$. For example, one of the frames 1000 of building panels 1099 can be placed on the base 150, and/or one of the frames 1000 can be placed on one or more of the shelves 200, of the multi-panel consolidation device 20, for injection of the expandable polymer into each of the cavities defined by each of the frames 1000. In one embodiment, the frame 1000 can define cavities 1040, 1042, 1044, 1046, 1048, 1052, 1054 and 1056. The cavity 1040 can be defined by the top exterior track 1006, the bottom exterior track 1008, the first side exterior stud 1002, and the first side interior stud 1020. The cavity 1042 can be defined by the top exterior track 1006, the top interior track 1024, the first side interior stud 1020, and one of the connecting members 1028. The cavity 1044 can be defined by the top exterior track 1006, the top interior track 1024, and two of the connecting members 1028. The cavity 1046 can be defined by the top exterior track 1006, the top interior track 1024, the second side interior stud 1022 and one of the connecting members 1028. The cavity 1048 can be defined by the top exterior track 1006, the bottom exterior track 1008, the second side exterior stud 1004, and the second side interior stud 1022. The cavity 1052 can be defined by the bottom exterior track 1008, the bottom interior track 1026, the first side interior stud 1020 and one of the connecting members 1030. Cavity 1054 can be defined by the bottom exterior track 1008, the bottom interior track 1026, and two of the connecting members 1030. The cavity 1056 can be defined by the bottom exterior track 1008, the bottom interior track 1026, one of the connecting members 1030 and the second side interior stud 1022.

The top exterior track 1006 of the frame 1000 can define a plurality of injection apertures 1007, as shown in FIG. 35. Each of the cavities 1042, 1044 and 1046 can be in fluid communication with one of the injection apertures 1007. The bottom exterior track 1008 of frame 1000 can define a plurality of injection apertures 1009, as shown in FIG. 36. Each of the cavities 1040, 1052, 1054 and 1048, can be in fluid communication with one of the injection apertures 1009. The top exterior track 1006, the second side exterior stud 1004, the bottom exterior track 1008 and the first side exterior stud 1002 can form a periphery of the frame 1000. The frame 1000 can define an opening 1060, which can receive a window pane (not shown).

Other frames, e.g., additional frames 1000, and/or any combination of frames having different configurations, e.g., frames 2000, 3000, 4000, 5000, 6000 and 7000, can be positioned on the multi-panel consolidation device 20 at the same time so that the base 150 and/or one or more of the shelves 200 of the multi-panel consolidation device 20 support one of the frames. In the illustrated embodiment, the multi-panel consolidation device 20 includes four of the shelves 200, and five frames of building panels can be supported by the multi-panel consolidation device 20, as shown in FIGS. 28-30. In other embodiments, the multi-panel consolidation device 20 can include different numbers of shelves, and can therefore support different numbers of building panels. Each frame of a building panel, (e.g., frame 1000 of building panel 1099) can be positioned on the multi-panel consolidation device 20 so that the injection apertures, (e.g., injection apertures 1009 defined by frame 1000) are accessible to an operator. For example, as shown in FIGS. 28 and 29, the injection apertures 1009 defined by the bottom exterior track 1008 frame 1000 can be accessible through one end of the multi-panel consolidation device 20, between two of the posts 152.

After a frame, or multiple frames, e.g., five of the frames 1000, have been positioned on the multi-panel consolidation device 20, as shown in FIGS. 28-30, the hydraulic system 280 can be used to force the upper structure 180 and the shelves 200 downwardly. The configuration of the link assemblies 210 can permit the shelves 200 to move vertically downwardly from the expanded configuration to the collapsed configuration. This can result in the application of a downwardly acting force, or a compressive force, to each of the frames (e.g., frame 1000 of building panel 1099), when the shelves 200 are in the collapsed configuration, which can limit expansion of an expandable polymer inject into the cavities defined by the frame. In one embodiment, the second compressive force exerted by the shelves 200 on the front surface of the frame resists expansion by the expandable polymer, and the expanded foam does not extend outside of the cavity beyond a plane of the front surface and a plane of the rear surface of the frame.

When the piston rods 320 of the hydraulic cylinders 310 are extended, the upper structure 180 and each of the shelves 200 can move downwardly together until the lower surface 202 of the lowermost one of the shelves 200, i.e., shelf 200d, contacts the contact surfaces 354 of the spacers 340e and the frame of the building panel positioned on the base 150. When this occurs, the downward movement of shelf 200d link 252e can stop. The upper structure 180 and the shelves 200a, 200b and 200c can then move downwardly together, as a result of further extension of the piston rods 320, until the lower surface 202 of shelf 200c contacts the contact surfaces 354 of the spacers 340d and the frame of the building panel positioned on the shelf 200d. This process can continue until the shelves 200 are in the collapsed configuration and a compressive force is applied to each of the frames of the building panels, with upper structure 180 and the respective shelves 200 in direct contact with each of the top surfaces and bottom surfaces of the frames. The frame positioned on the shelf 200a can be "sandwiched between" and constrained by the upper structure 180 and the shelf 200a. The frame positioned on the shelf 200b can be constrained by the shelf 200a and the shelf 200b. The frame positioned on the shelf 200c can be constrained by the shelf 200b and the shelf 200c. The frame positioned on the shelf 200d can be constrained by the shelf 200c and the shelf 200d. The frame positioned on the base 150 can be constrained by the shelf 200d and the base 150.

The configuration of the link assemblies 210 can also allow the shelves 200 to move upwardly from the collapsed configuration to the expanded configuration. When an operator wishes to move the shelves 200 from the collapsed configuration to the expanded configuration, the operator can position the switch 294 on the operator console 288 to the up position. This can cause the piston rods 320 of each of the hydraulic cylinders 310 to retract, or move upwardly. Due to the connection of the piston rods 320 with the upper structure 180, the retraction of the piston rods 320 can cause the upper structure 180 to move upwardly. Due to the connection of the upper structure 180 with the upper link 252a of each of the link assemblies 210, the upper link 252a of each link assembly 210 can also move upwardly. When the bottom of the slot 256 defined by the link 252a contacts the elongate member 226 (for forward ones of the link assemblies 210), or contacts the elongate member 228 (for rearward ones of the link assemblies 210) of shelf 200a, the shelf 200a can move upwardly. When the bottom of the slot 256 defined by the link 252b contacts the elongate member 226 (for forward ones of the link assemblies) or the elongate member 228 (for rearward ones of the link assemblies 210) of shelf 200b, shelf 200b can move upwardly. This process can continue until the shelves 200 are in the expanded, or raised, configuration.

The foam supply system 18 is illustrated schematically in FIG. 32. The foam supply system 18 can supply a monomer and a catalyst, in the form of fluids, which can mix and react to form an expandable polymer, for use in filling the cavities defined by the frames of building panels, e.g., the cavities defined by the frame 1000 of building panel 1099. An expanded foam, e.g., foam 500 can be formed from the expandable polymer. In one embodiment, the expandable polymer can be polyurethane. The foam supply system 18 can include a first container 400, which can contain a monomer, and a second container 402, which can contain a catalyst. Each of the monomer and the catalyst can be in a liquid or solution state. A portion of the foam supply system 18 can be disposed in the temperature-controlled room 22, as illustrated schematically in FIG. 32, in order to maintain the monomer within the first container 400 and the catalyst within the second container 402, at the desired temperature.

A pressurized inert gas, e.g., pressurized nitrogen, can be supplied to each of the containers 400 and 402 to force the monomer and the catalyst out of the containers 400 and 402, respectively, when desired. In one embodiment, the system 18 can include a container 404, which can contain the pressurized inert gas. System 18 can include a shutoff valve 408, which can be opened and closed by an operator. When the shutoff valve 408 is open, the pressurized inert gas can flow out of the container 404, through a conduit 406 and a conduit 410 to a connector 412, and then through each of the conduits 414 and 420. The foam supply system 18 can also include shutoff valves 416 and 422. When the shutoff valve 416 is open, pressurized inert gas can flow through the conduit 414, through the shutoff valve 416 and through a conduit 418 into an interior chamber defined by the container 400, which can pressurize the monomer within the interior chamber. Similarly, when the shutoff valve 422 is open, the pressurized inert gas can flow through the conduit 420, shutoff valve 422 and a conduit 424 into an interior chamber defined by the container 402, which can pressurize the catalyst within the interior chamber.

The foam supply system 18 can include a conduit 430, a modulating valve 432, a conduit 434, and a heater 436. The conduit 430 can establish fluid communication between the interior chamber defined by the container 400, and the modulating valve 432. The conduit 434 can establish fluid communication between the modulating valve 432 and the heater 436. The monomer that discharges from the container 400 can flow through the conduit 430, the modulating valve 432, the conduit 434 and heater 436 into a conduit 438. The modulating valve 432 can control the flow rate of the monomer that discharges from the container 400, and the heater 436 can heat the monomer to a desired temperature.

The foam supply system 18 can also include a conduit 450, a modulating valve 452, a conduit 454 and a heater 456. The conduit 450 can establish fluid communication between the interior chamber defined by the container 402 and the modulating valve 452. The conduit 454 can establish fluid communication between the modulating valve 452 and the heater 456. The catalyst that discharges from the container 402 can flow through the conduit 450, the modulating valve 452, the conduit 454, and the heater 456 into a conduit 458. The modulating valve 452 can control the flow rate of the catalyst that discharges from the container 402, and the heater 456 can heat the catalyst to a desired temperature.

The foam supply system 18 can include a spray gun 470, which can include a spray bar 472. The conduit 438 can establish fluid communication between the heater 436 and the spray gun 470. Accordingly, the monomer discharging from the heater 436 can flow through the conduit 438 to the spray gun 470. The conduit 458 can establish fluid communication between the heater 456 and the spray gun 470. Accordingly, the catalyst discharging from the heater 456 can flow through the conduit 458 to the spray gun 470, where it can mix with the monomer, resulting in an expandable polymer, e.g., an expandable polyurethane, within the spray gun 470. The expandable polymer can be in a liquid state as it discharges from the spray gun 470 into the cavities defined by a frame of a building panel. The foam supply system 18 can also include a flexible electrical member 482, e.g., a cable, which can be used to transmit data from a computer 480 to the spray gun 470. The foam supply system 18 can include a source of pressurized air (not shown) and a shutoff valve (not shown), which can permit pressurized air to be selectively supplied through a conduit 490 to the spray gun 470.

Figure 33:
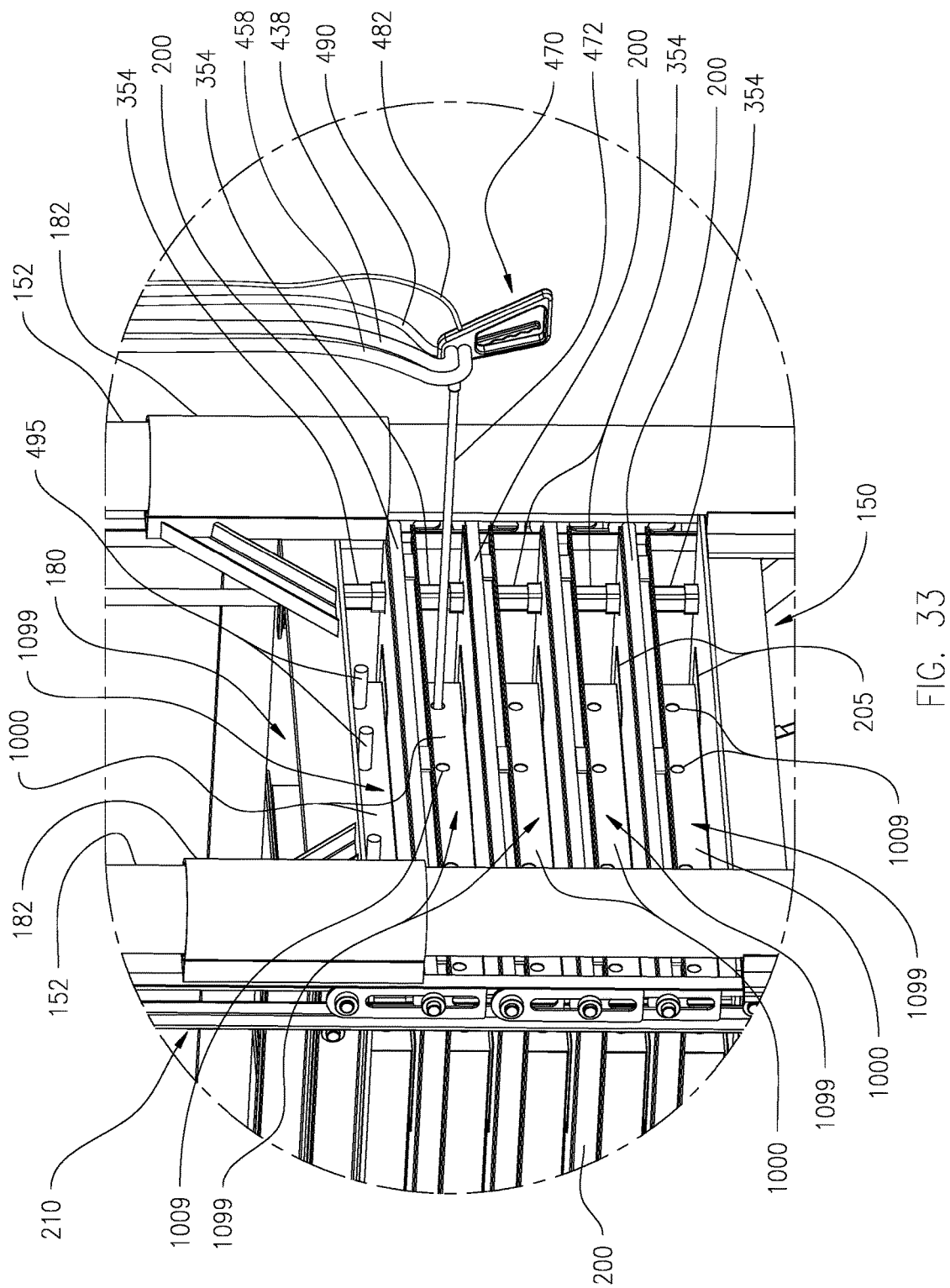
FIG. 33 is a perspective view of a portion of the multi-panel consolidation device and the building panels depicted in FIG. 30, with the shelves of the multi-panel consolidation device in the collapsed configuration, and depicting a spray bar of the foam system depicted in FIG. 32, inserted through an injection aperture defined by one of the building panels into a cavity (not shown) defined by the building panel.

An operator can selectively inject the expandable polymer with the spray gun 470 into each of the cavities of building panels disposed on the multi-panel consolidation device 20. For example, as shown in FIG. 33, an operator can insert the spray bar 472 of spray gun 470 through one of the apertures 1009 defined by the frame 1000 of building panel 1099, into the cavity 1048 defined by the frame 1000. Each of the conduits 438, 458 and 490, as well as the electrical member 482 can be flexible, which can permit an operator to inject the expandable polymer into injection apertures, e.g., 1009 and 1007, positioned adjacent to opposite ends of the multi-panel consolidation device 20, without removing the frame 1000 from the multi-panel consolidation device 20. An operator can periodically and selectively clean the spray bar 472 with pressurized air supplied from the conduit 490.

The cavities defined by the frames 1000, 2000, 3000, 4000, 5000, 6000 and 7000, can be open-faced cavities as shown in FIGS. 35 and 37 for the cavities defined by frame 1000. However, the cavities can be closed, or at least substantially closed during the process of injecting an expandable polymer into the cavities. For example, the fabric 112 can enclose the cavities defined by the frame, when the fabric 112 is a non-woven material. When the fabric 112 is a woven material, the cavities can be substantially enclosed due to the porosity of the fabric 112, i.e., the fabric 112 can be porous or micro-porous. In those embodiments where the building panels do not include fabric 112, the cavities defined by frames of the building panels can be enclosed by a pair of plastic sheets. One of the plastic sheets can enclose a front surface of the frame, and the other plastic sheet can enclose a rear surface of the frame. Cellophane can be wrapped around the frame and the plastic sheets. The plastic sheets and the cellophane can be removed after the expanded foam within the cavities has cured. A fluid can be applied to the surfaces of the plastic sheets to facilitate removing them. A fluid can be selected that does not adhere to the foam (e.g., foam 500) within the cavities defined by the frame, and which does not adversely affect either the foam or the plastic sheets.

As the expandable polymer is injected into a cavity defined by a frame of a building panel, e.g., cavity 1048, to deliver a mass of expandable polymer that expands within the cavity into an expanded foam, e.g., the foam 500. The operator can inject the expandable polymer into a cavity defined by building panel, e.g., the cavity 1048, for a predetermined period of time and at a predetermined injection rate to obtain the desired mass of expandable polymer for the cavity. The computer 480 can be programmed to transmit the desired period of time to the spray gun 470, for each of the cavities defined by the frame of one of the building panels. The desired period of time can be calculated for each of the cavities based on the volumes of the cavities, the desired density of the expanded foam 500, and the injection rate of the expandable polymer. For example, referring to FIG. 37, the volume of the cavity 1054 can be larger than the volume of the cavity 1056, and accordingly, the expandable polymer can be injected into the cavity 1054 for a longer period of time, as compared to the length of time the expandable polymer is injected into the cavity 1056. Calculating the period of time to inject the expandable polymer into each of the cavities can prevent, or at least substantially prevent, "over filling" or "under filling" the cavities with the expandable polymer, and provide better control of the density of the expanded foam.

The expandable polymer injected into the cavities defined by a frame of a building panel (e.g., cavities 1040, 1042, 1044, 1046 and 1048 defined by the frame 1000 of building panel 1099), can expand as a foam during the time that it is curing into an expanded foam, e.g., foam 500, and while expanding can exert a substantial force on the respective ones of the upper structure 180, shelves 200 and base 150. However, downward acting, compressive forces applied to the upper structure 180 by the hydraulic cylinders 310, can counteract and overwhelm the force caused by expansion of the foam 500 and can prevent the foam 500 from expanding beyond the front and rear surfaces of the tracks and studs of the frame 1000, which can therefore enhance the quality of the building panel 1099. In one embodiment, each of the hydraulic cylinders 310 can develop 4712 lbs. of extend thrust, i.e. when the piston rods 320 are being extended, at 1500 psi. The retract thrust of each of the hydraulic cylinders, i.e. the thrust developed when the piston rods 320 are being retracted, can be 2869 lbs. of thrust.

The foam 500 can include a foam structure, which can include a plurality of foam sub-structures, which are designated 500a, 500b, 500c, 500d, 500e, 500f, 500g and 500h, as shown in FIG. 38B, which can be disposed within cavities 1040, 1042, 1044, 1046, 1048, 1052, 1054 and 1056, respectively. As illustrated in FIGS. 38B, 39A and 39B, with respect to the foam sub-structure 500c, each of the foam substructures can include a front face, e.g., 1086, a back face, e.g., 1088, and a peripheral edge, e.g., 1085 (FIG. 38B). Each foam sub-structure, e.g., 500c, can be confined on its peripheral edge, e.g., 1085, by the frame 1000. As shown in FIG. 39B, each of the foam sub-structures, e.g., 500c, can have a foam thickness F, from the back face 1088 to the front face 1086. Each of the studs of the frame 1000, e.g., the upper interior connecting members 1028, can have a front surface 1091, a rear surface 1093 and a stud thickness S from the rear surface 1093 to the front surface 1091. Applying a compressive force to the frames of building panels, e.g., frame 1000 of building panel 1099, during the process of injecting an expandable polymer into the cavities defined by the frame, can constrain the expansion of the expandable polymer. Application of the compressive force coupled with injecting the expandable polymer for a predetermined period of time, determined at least in part by the volume of each of the cavities, can effect a relatively small variation in the foam thickness F within any of the cavities individually and among all of the cavities defined by the frame, e.g., frame 1000. For those building panels including fabric 112 that at least partially encloses the cavities, the fabric 112 can also facilitate limiting the expansion of the expandable polymer during the curing process. The expandable polymer can permeate the fabric 112, which can have a relatively small thickness, to facilitate forming an integrated construction of the building panel, e.g. 1099.

The foam thickness F can be defined as the stud thickness S with a tolerance having an absolute value of less than 2 mm (0.079 inches), including less than 1 mm (0.039 inches) and including less than 0.5 mm (0.02 inches). In one embodiment, the foam thickness F can have a value, or magnitude ranging from about S plus 0.0625 inches (1.6 mm) to about S minus 0.0625 inches (1.6 mm).

During the expanding and curing process, the aperture can be closed, for example, using a plug, e.g., a wooden dowel, to prevent the expandable polymer from "oozing" out of the injection apertures, e.g., 1007 and 1009. After the expandable polymer has cured, forming an expanded foam, e.g., foam 500, the wooden dowels can be removed. After the foam 500 has been formed, the upper structure 180 and the shelves 200 can be raised, such that the shelves 200 are in the expanded configuration, and the building panels 1099 can be removed from the multi-panel consolidation device 20.

Figure 34:
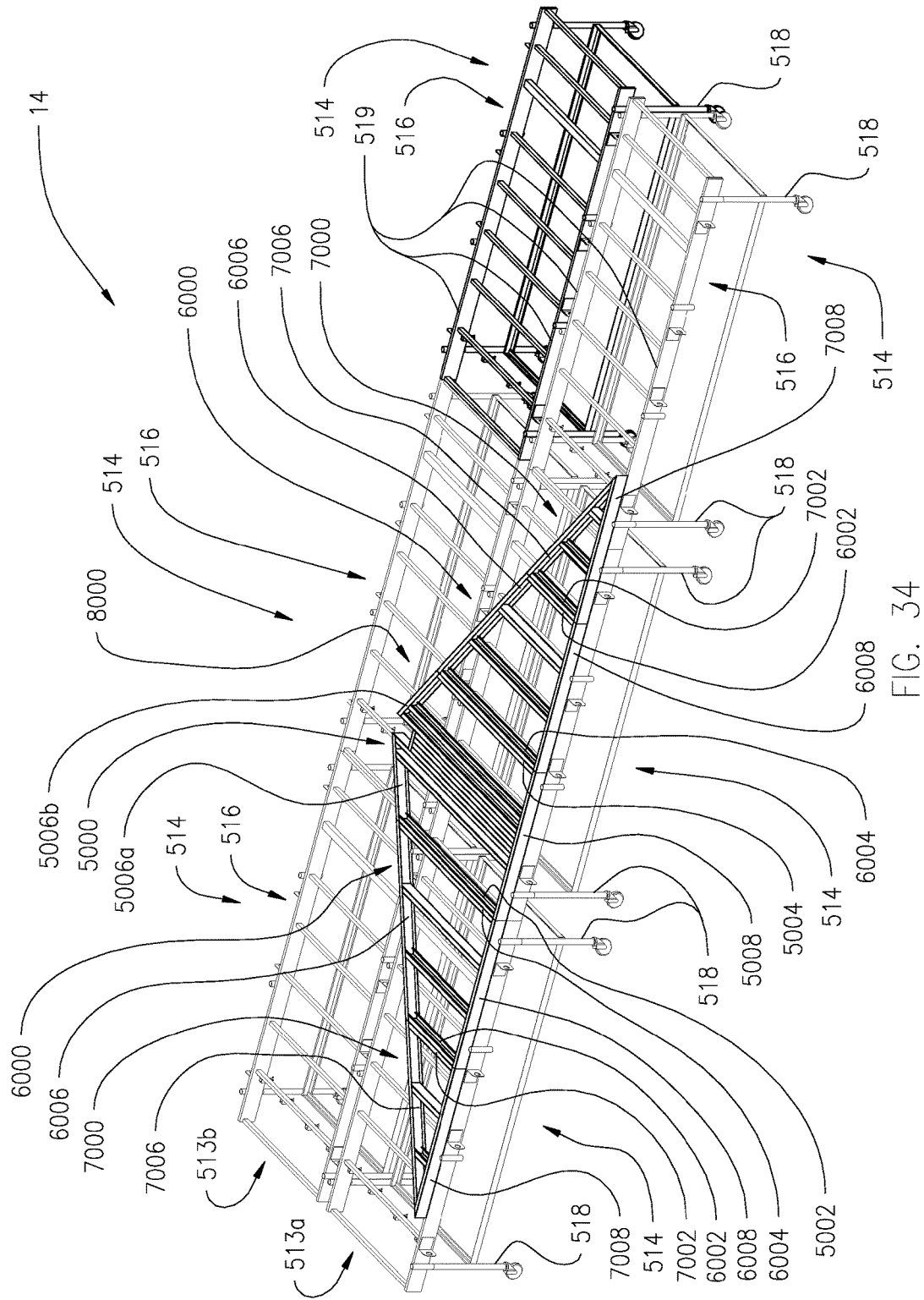
FIG. 34 is a perspective view of a specialty panel frame assembly fixture according to one embodiment, with a an arrangement of gable frames disposed on the specialty panel frame assembly fixture.
Figure 41:
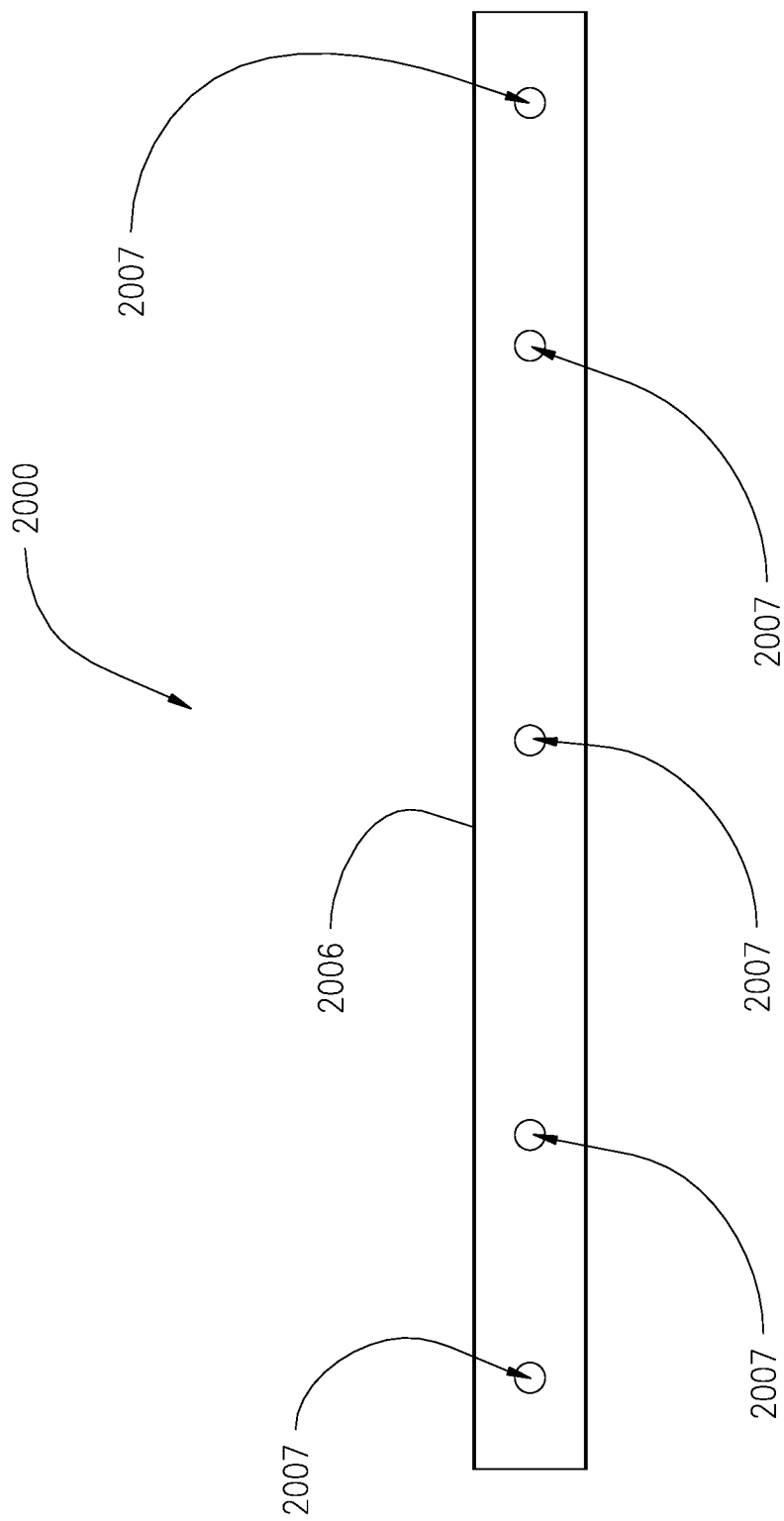
FIG. 41 is a top plan view of the frame of FIG. 40.

The system 10 and associated method can be used to manufacture building panels according to other embodiments. For example, system 10 can be used to manufacture door panels, e.g., door panel 2099 (FIGS. 40-44); solid panels, e.g., solid panel 3099 (FIGS. 45-49); electrical panels, e.g., electrical panel 4099 (FIGS. 50-54); gable panels, e.g., gable panel 5099 (FIGS. 55-59), gable panel 6099 (FIGS. 60-64), and gable panel 7099 (FIG. 34). The door panel 2099 can include a frame 2000, shown in (FIGS. 40-42). Frame 2000 can include a first side exterior stud 2002, a second side exterior stud 2004, a top exterior track 2006 and a bottom exterior track 2008. An upper end of the first side exterior stud 2002 and an upper end of the second side exterior stud 2004 can be attached to the top exterior track 2006. A lower end of the first side exterior stud 2002 and a lower end of the second side exterior stud 2004 can be attached to the bottom exterior track 2008. Frame 2000 can also include a first side interior stud 2020 and a second side interior stud 2022, and each can be attached to each of the top exterior track 2006 and the bottom exterior track 2008. The frame 2000 can also include a top interior track 2024, and a plurality of connecting members 2028. Each of the connecting members 2028 can be attached to the top exterior track 2006 and the top interior track 2024.

The frame 2000 can define a plurality of cavities which can be filled with foam, e.g., foam 500, when the frame 2000 is positioned on the multi-panel consolidation device 20 and the shelves 200 are in the collapsed configuration. In one embodiment, the frame 2000 can define cavities 2040, 2042, 2044, 2046 and 2048. The cavity 2040 can be defined by the first side exterior stud 2002, the first side interior stud 2020, the bottom exterior track 2008 and the top exterior track 2006. The cavity 2042 can be defined by the top exterior track 2006, the top interior track 2024, the first side interior stud 2020 and one of the connecting members 2028. Cavity 2044 can be defined by the top exterior track 2006, the top interior track 2024, and two of the connecting members 2028. Cavity 2046 can be defined by the top exterior track 2006, the top interior track 2024, one of the connecting members 2028 and the second side interior stud 2022. Cavity 2048 can be defined by the top exterior track 2006, the bottom exterior track 2008, the second side interior stud 2022 and the second side exterior stud 2004. The top exterior track 2006 can define a plurality of injection apertures 2007 (FIGS. 40 and 41). Each of the cavities 2040, 2042, 2044, 2046 and 2048 can be in fluid communication with a respective one of the injection apertures 2007. FIG. 44 illustrates the foam 500 within cavities 2040, 2042, 2044, 2046 and 2048.

The frame 2000 can define a door opening 2060. In one embodiment, the door opening 2060 can be defined by the first side interior stud 2020, the second side interior stud 2022, the top interior track 2024 and the bottom exterior track 2008. The top exterior track 2006, the second side exterior stud 2004, the bottom exterior track 2008 and the first side exterior stud 2002 can form a periphery of the frame 2000.

Referring to FIGS. 45-49, the solid panel 3099 can include a frame 3000. The frame 3000 can include a first side exterior stud 3002, a second side exterior stud 3004, a top exterior track 3006 and a bottom exterior track 3008. An upper end of the first side exterior stud 3002 and an upper end of the second side exterior stud 3004 can be attached to the top exterior track 3006. A lower end of the first side exterior stud 3002 and a lower end of the second side exterior stud 3004 can be attached to the bottom exterior track 3008. The solid panel 3000 can also include a plurality of interior studs. For example, in the embodiment shown, the solid panel 3000 can include a first interior stud 3020 and a second interior stud 3022. An upper end of the first interior stud 3020 and an upper end of the second interior stud 3022 can be attached to the top exterior track 3006. A lower end of the first interior stud 3020 and a lower end of the second interior stud 3022 can be attached to the bottom exterior track 3008.

Frame 3000 can define a plurality of cavities, which can be filled with foam, e.g., foam 500. In the embodiment shown in FIGS. 45-49, the frame 3000 can define cavities 3040, 3044 and 3048. Cavity 3040 can be defined by the top exterior track 3006, the bottom exterior track 3008, the first side exterior stud 3002 and the first interior stud 3020. Cavity 3044 can be defined by the top exterior track 3006, the bottom exterior track 3008, the first interior stud 3020 and the second interior stud 3022. Cavity 3048 can be defined by the top exterior track 3006, the bottom exterior track 3008, the second interior stud 3022 and the second side exterior stud 3004.

Figure 49:
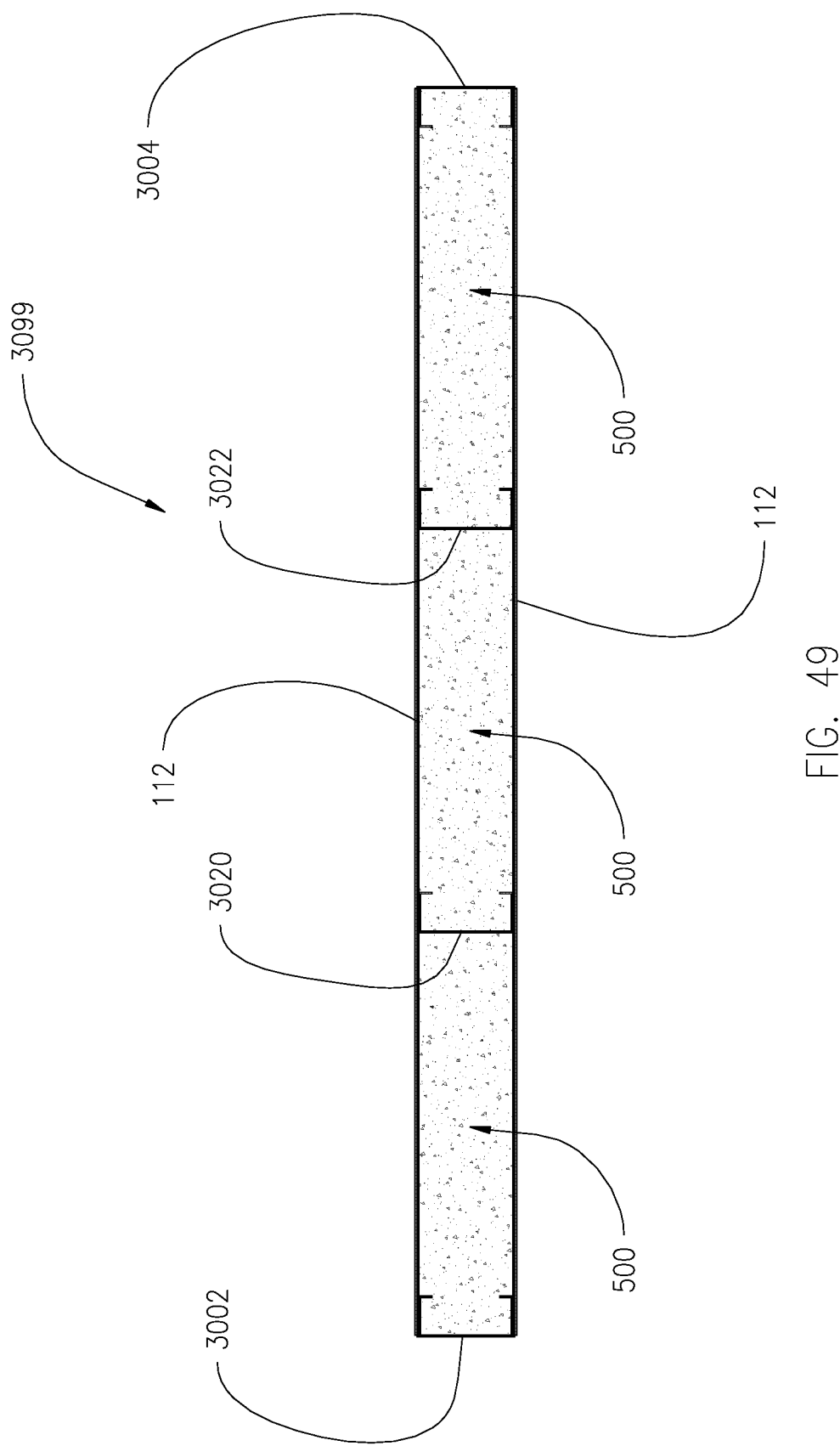
FIG. 49 is a cross-sectional view taken along line 49-49 in FIG. 48.

The bottom exterior track 3008 can define a plurality of injection apertures 3009. Each of the cavities 3040, 3044 and 3048 can be in fluid communication with one of the injection apertures 3009. The top exterior track 3006, the second side exterior stud 3004, the bottom exterior track 3008 and the first side exterior stud 3002 can form a periphery of the frame 3000. An expandable polymer can be injected through each of the injection apertures 3009 into corresponding ones of the cavities 3040, 3044 and 3048, which can form an expanded foam, e.g., foam 500, as shown in FIG. 49.

Referring to FIGS. 50-54, the electrical panel 4099 can include a frame 4000. The frame 4000 can include a first side exterior stud 4002, a second side exterior stud 4004, a top exterior track 4006 and a bottom exterior track 4008. An upper end of the first side exterior stud 4002 and an upper end of the second side exterior stud 4004 can be attached to the top exterior track 4006. A lower end of the first side exterior stud 4002 and a lower end of the second side exterior stud 4004 can be attached to the bottom exterior track 4008. The frame 4000 can also include a plurality of interior studs. For example, in the embodiment shown, the frame 4000 can include a first interior stud 4020 and a second interior stud 4022. An upper end of the first interior stud 4020 and an upper end of the second interior stud 4022 can be attached to the top exterior track 4006. A lower end of the first interior stud 4020 and a lower end of the second interior stud 4022 can be attached to the bottom exterior track 4008. The frame 4000 can define a plurality of cavities. For example, in the embodiment shown, the frame 4000 can define cavities 4040, 4044 and 4048. Cavity 4040 can be defined by the top exterior track 4006, the bottom exterior track 4008, the first side exterior stud 4002 and the first interior stud 4020. Cavity 4044 can be defined by the top exterior track 4006, the bottom exterior track 4008, the first interior stud 4020 and the second interior stud 4022. Cavity 4048 can be defined by the top exterior track 4006, the bottom exterior track 4008, the second interior stud 4022 and the second side exterior stud 4004. The bottom exterior track 4008 can define a plurality of injection apertures 4009.

Figure 50:
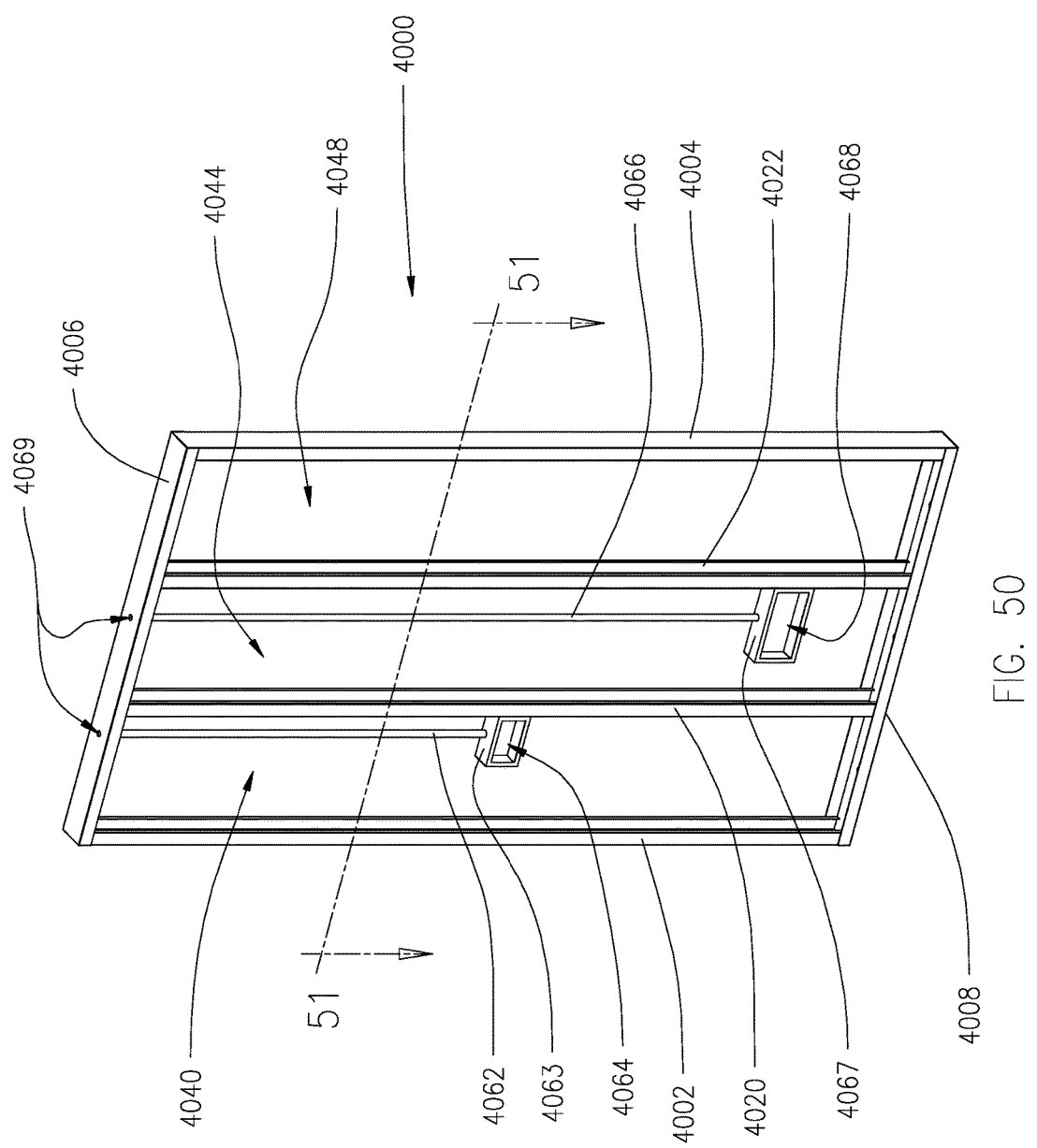
FIG. 50 is a perspective view of a frame of a building panel according to another embodiment.
Figure 51:
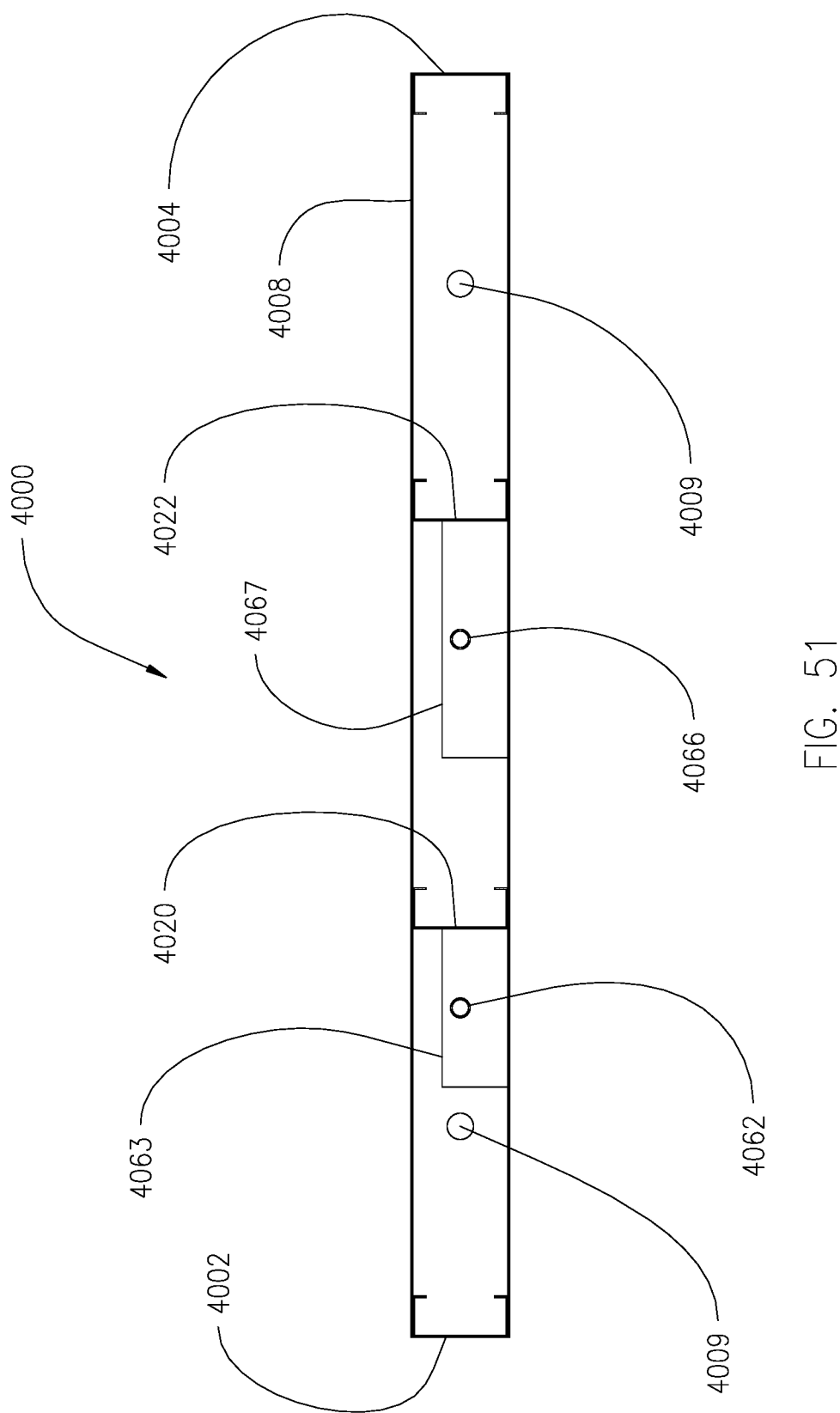
FIG. 51 is a cross-sectional view taken along line 51-51 in FIG. 50.
Figure 52:
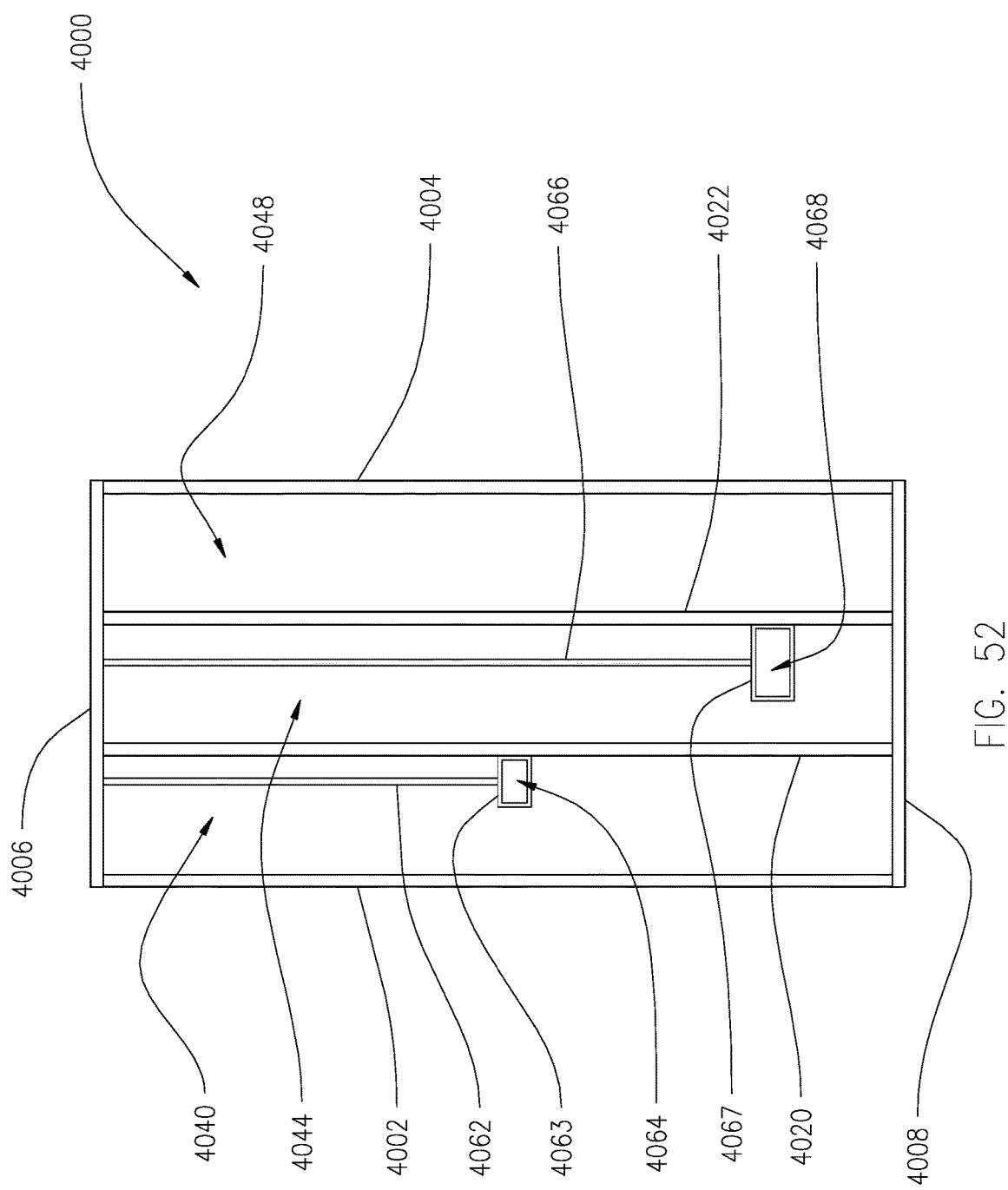
FIG. 52 is a front elevation view of the frame of FIG. 50.
Figure 53:
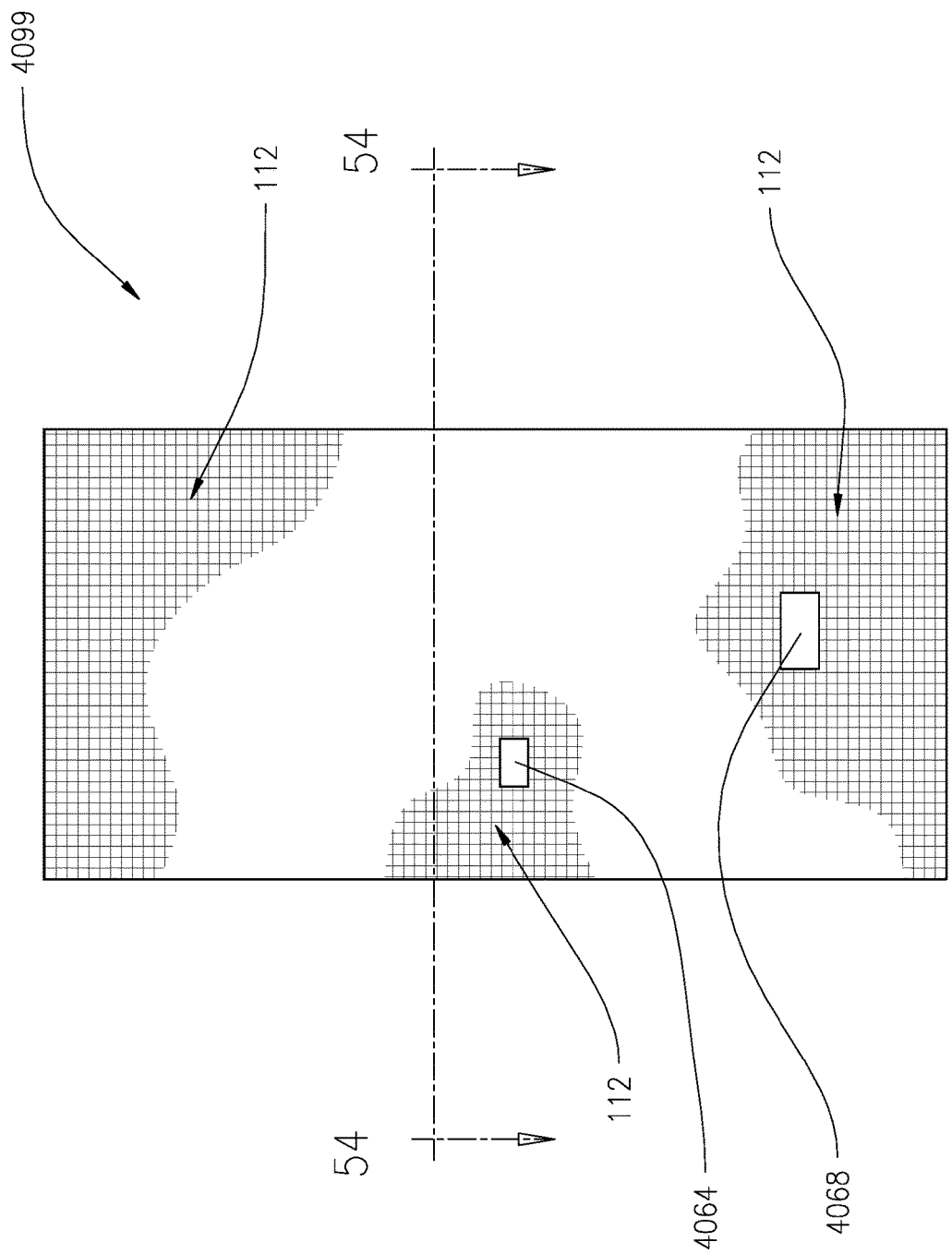
FIG. 53 is a front elevation view of a building panel that includes the frame of FIG. 50.
Figure 54:
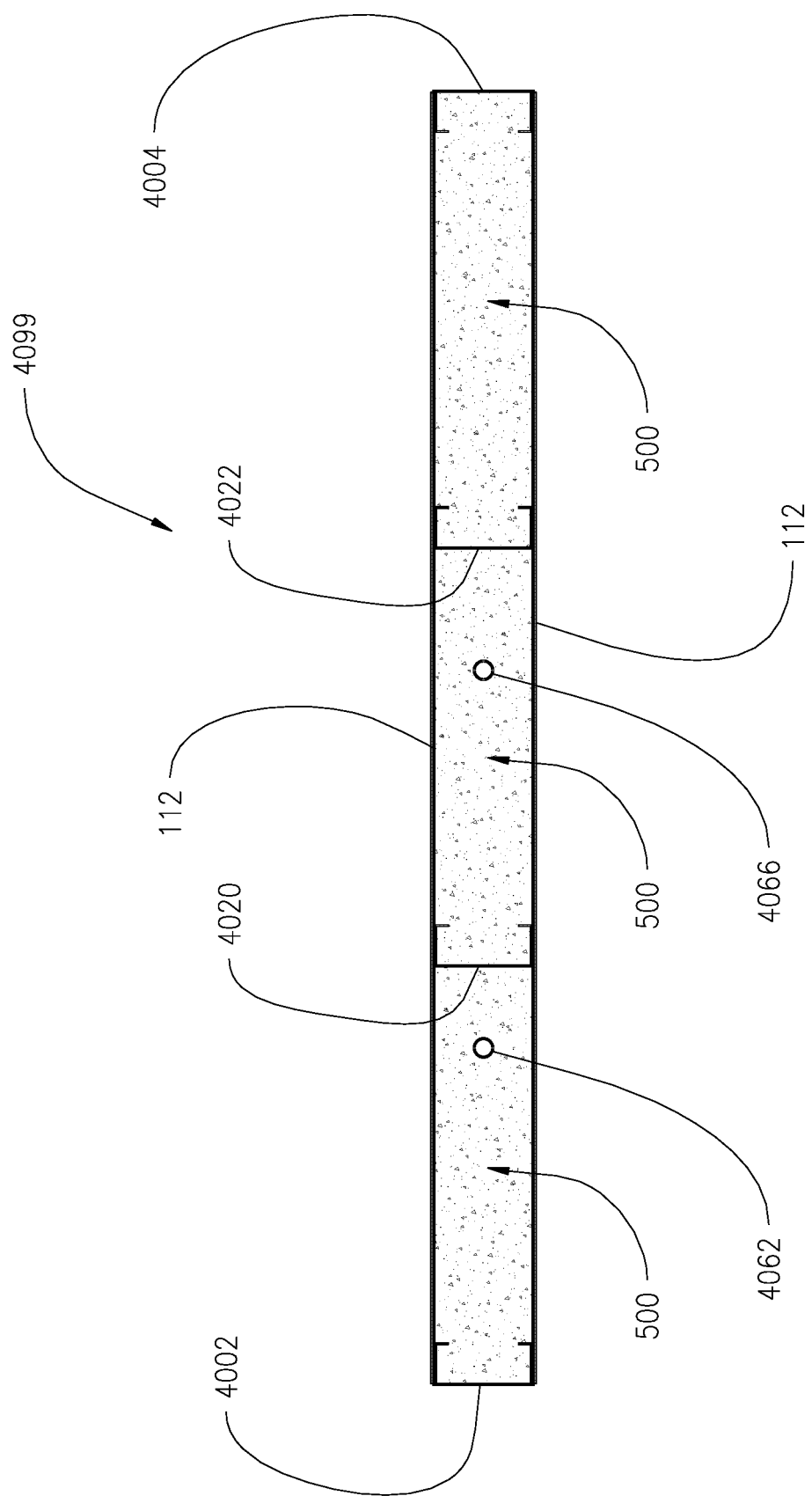
FIG. 54 is a cross-sectional view taken along line 54-54 in FIG. 53.
Figure 55:
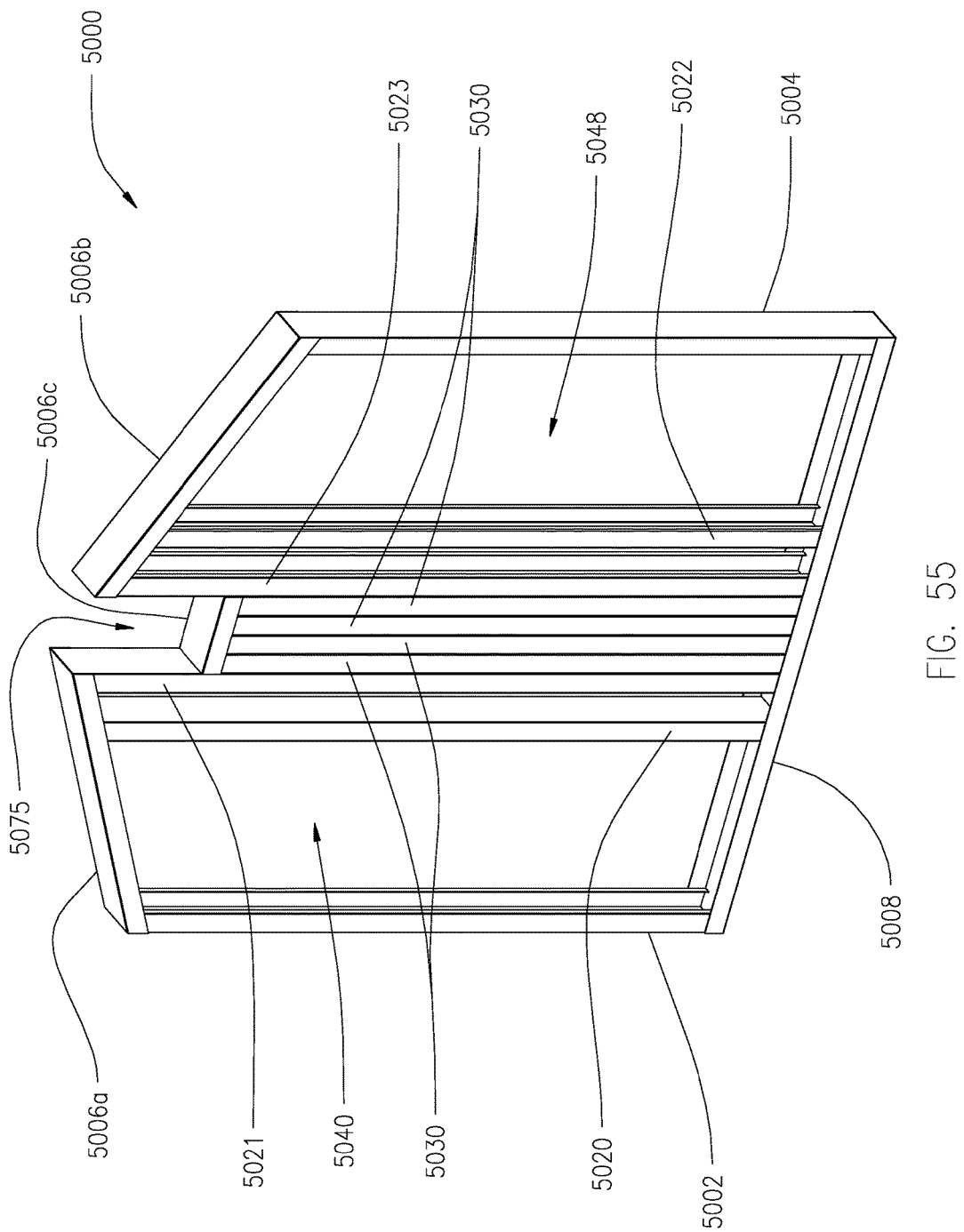
FIG. 55 is a perspective view of a frame, of a building panel according to another embodiment.
Figure 56:
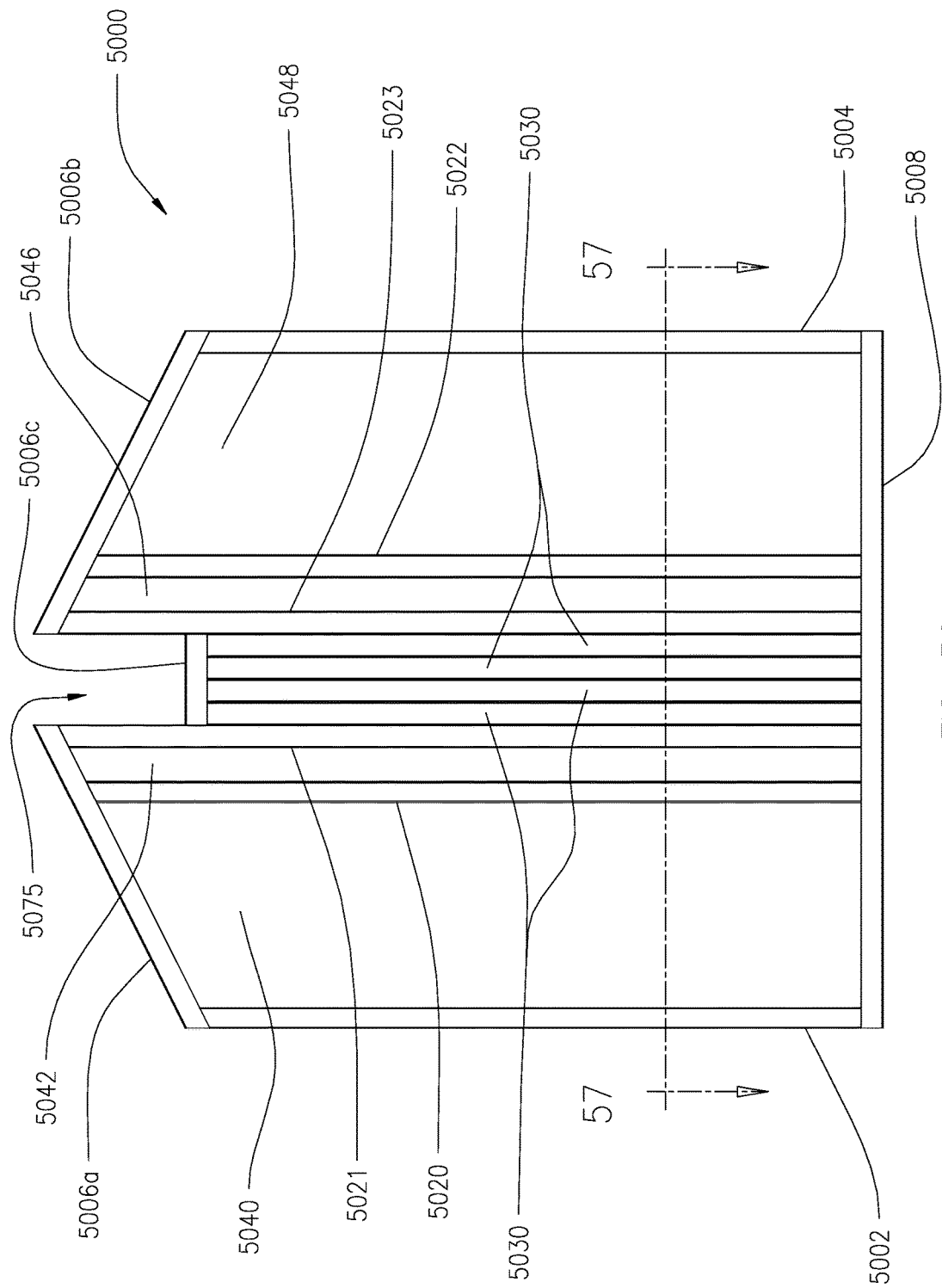
FIG. 56 is a front elevation view of the frame of FIG. 55.
Figure 57:
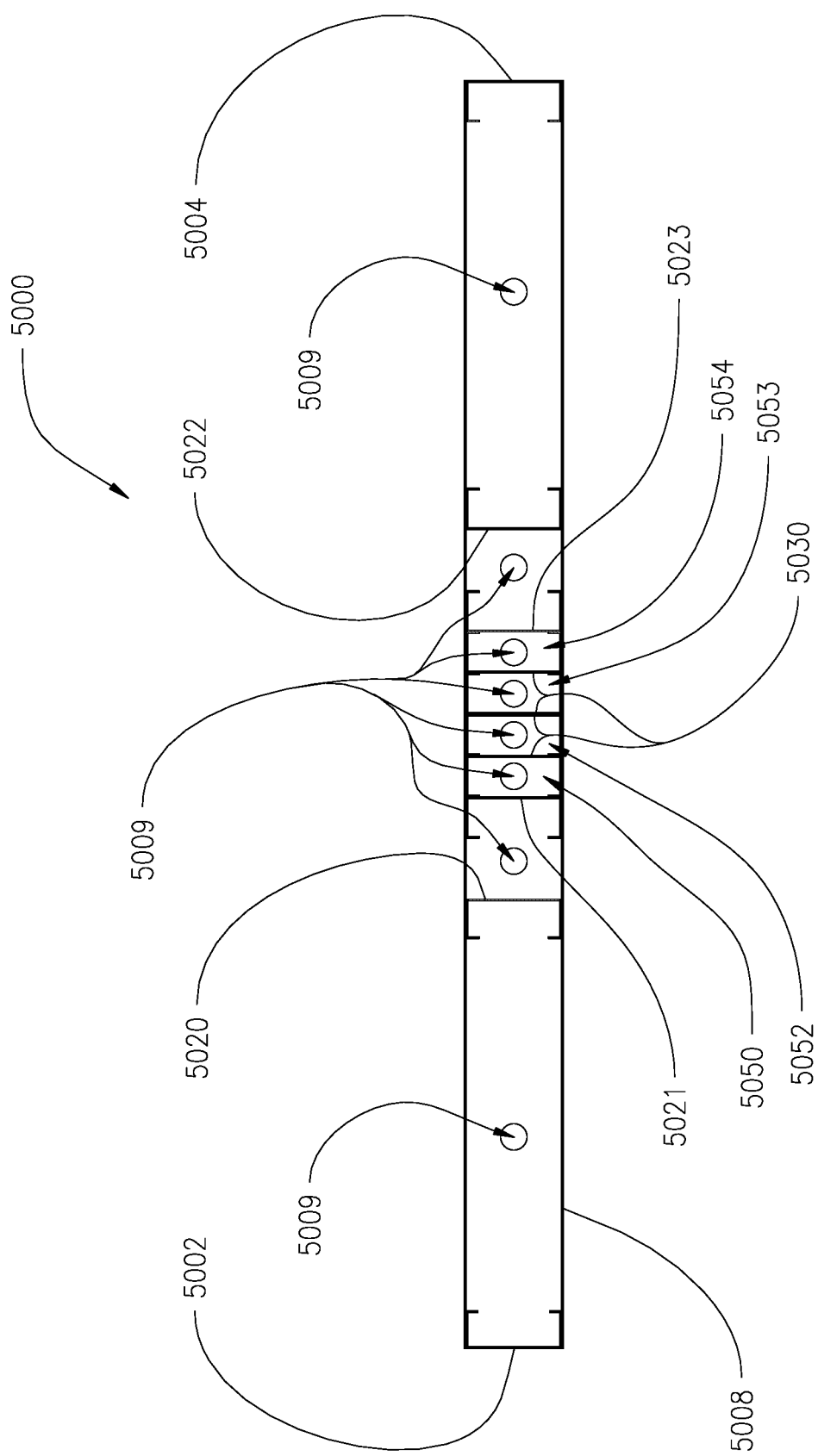
FIG. 57 is a cross-sectional view taken along line 57-57 in FIG. 56.
Figure 58:
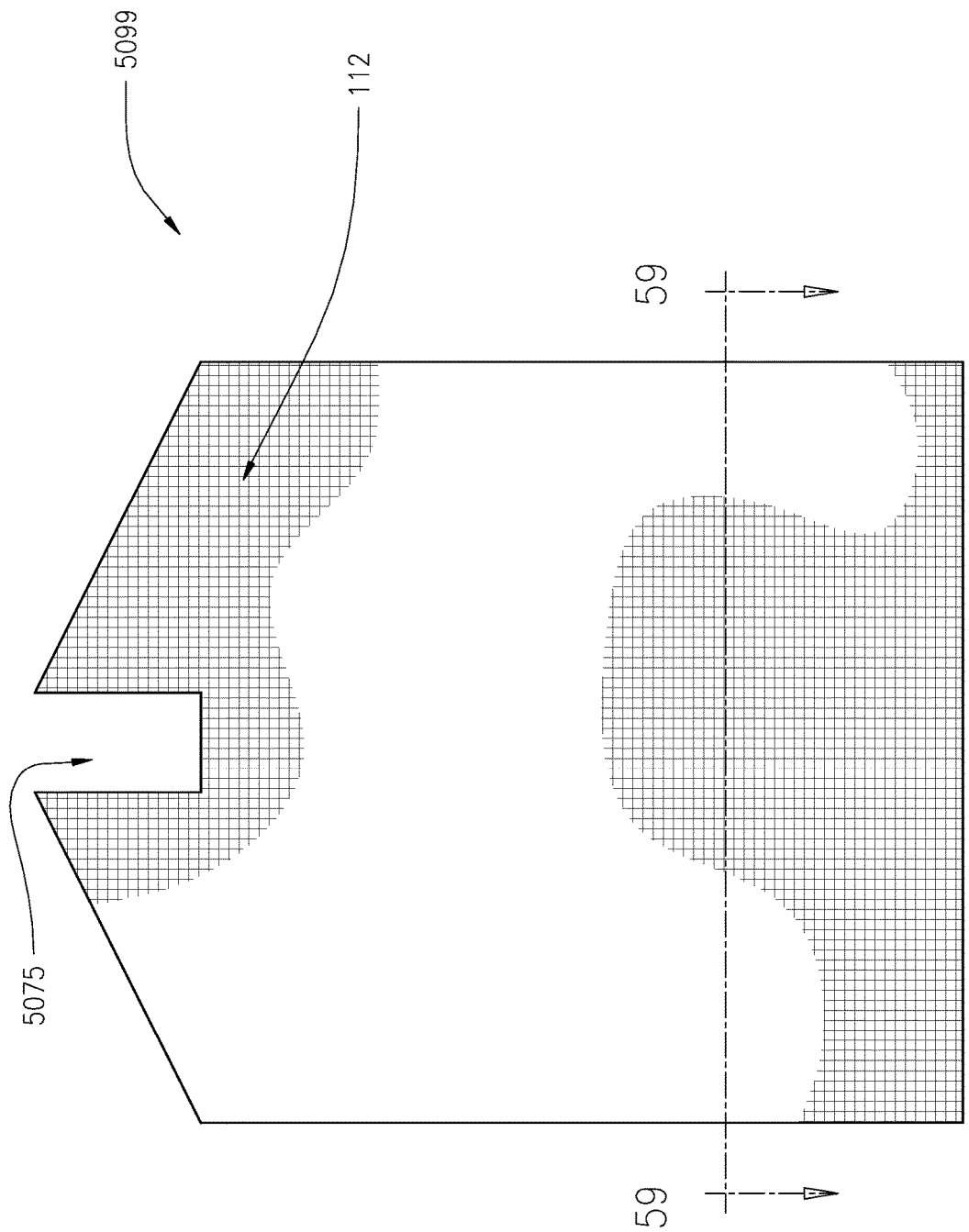
FIG. 58 is a front elevation view of a building panel that includes the frame of FIG. 55.

The electrical panel 4099 can also include one or more electrical conduits and associated electrical circuit apparatus. As shown in FIGS. 50-52, the frame 4000 can include a conduit 4062, which can be disposed within the cavity 4040, and an electrical circuit apparatus 4063, which can be attached to a lower end of the conduit 4062. Conduit 4062 can be disposed within the foam, e.g., foam 500 within the cavity 4040 and the electrical circuit apparatus 4063 can be disposed, at least in part, within the foam 500 within cavity 4040. In one embodiment, the electrical circuit apparatus 4063 can be a switch housing. The frame 4000 can also include a conduit 4066, which can be disposed within the cavity 4044, and an electrical circuit apparatus 4067, which can be attached to a lower end to the conduit 4066. Conduit 4066 can be disposed within the foam 500 within the cavity 4044. In one embodiment, the electrical apparatus 4067 can be an electrical outlet housing, which can be disposed at least partially within the foam 500 formed in the cavity 4044. The top exterior track 4006 can define a pair of apertures 4069. One of the apertures 4069 can communicate with the conduit 4062, and one of the apertures 4069 can communicate with the conduit 4066. When the frame 4000 is installed in a structure, electrical wires can be routed through each of the apertures 4069, and through the conduits 4062 and 4066, and electrical components can be installed within the electrical circuit apparatus 4063 and the electrical circuit apparatus 4067. The electrical circuit apparatus 4063 can define a cavity 4064, and the electrical circuit apparatus 4067 can define a cavity 4068, and each can receive an electrical component. FIG. 54 illustrates the foam 500 within cavities 4040, 4044 and 4048.

Referring to FIGS. 55-59, gable panel 5099 can include a gable frame 5000. The gable frame 5000 (FIGS. 55-57) can include a first side exterior stud 5002, a first inclined top exterior track 5006a, a second inclined top exterior track 5006*b*, a horizontal top exterior track 5006*c*, a second side exterior stud 5004 and a bottom exterior track 5008. An upper end of the first side exterior stud 5002 can be attached to the first inclined top exterior track 5006*a* and an upper end of the second side exterior stud 5004 can be attached to the second inclined top exterior track 5006*b*. A lower end of the first side exterior stud 5002 and a lower end of the second side exterior stud 5004 can be attached to the bottom exterior track 5008. Gable frame 5000 can also include a first side interior stud 5020, a second side interior stud 5022, a first intermediate interior stud 5021, a second intermediate interior stud 5023, and a plurality of central interior studs 5030. An upper end of the first side interior stud 5020 and an upper end of the first intermediate interior stud 5021 can be attached to the first inclined top exterior track 5006*a*. A lower end of the first side interior stud 5020 and a lower end of the first intermediate interior stud 5021 can be attached to the bottom exterior track 5008. An upper end of the second side interior stud 5022 and an upper end of the second intermediate interior stud 5021 can be attached to the second inclined top exterior track 5006*b*. A lower end of the second side interior stud 5022 and a lower end of the second intermediate interior stud 5023 can be attached to the bottom exterior track 5008. Each of the central interior studs 5030 can be attached, at an upper end, to the horizontal top exterior track 5006*c* and can be attached, at a lower end to the bottom exterior track 5008. The bottom exterior track 5008 can define a plurality of injection apertures 5009.

The frame 5000 can define a plurality of cavities, which can be filled with the foam 500. The frame 5000 can define cavities 5040, 5042, 5046, 5048, 5050, 5052, 5053 and 5054. Cavity 5040 can be defined by the first side exterior stud 5002, the first inclined top exterior track 5006*a*, the first side interior stud 5020 and the bottom exterior track 5008. Cavity 5042 can be defined by the first side interior stud 5020, the first inclined top exterior track 5006*a*, the first intermediate stud 5021 and the bottom exterior track 5008. The cavity 5046 can be defined by the second intermediate stud 5023, the second inclined top exterior track 5006*b*, the second side interior stud 5022 and the bottom exterior track 5008. The cavity 5048 can be defined by the second side interior stud 5022, the second inclined top exterior track 5006*b*, the second side exterior stud 5004 and the bottom exterior track 5008. The cavity 5050 can be defined by the first intermediate stud 5021, one of the central interior studs 5030, the horizontal top exterior track 5006*c* and the bottom exterior track 5008. Each of the cavities 5052 and 5053 can be defined by the horizontal top exterior track 5006*c*, the bottom exterior track 5008, and two of the central interior studs 5030. The cavity 5054 can be defined by the horizontal top exterior track 5006*c*, the bottom exterior track 5008, one of the central interior studs 5030 and the second intermediate interior stud 5023.

Figure 59:
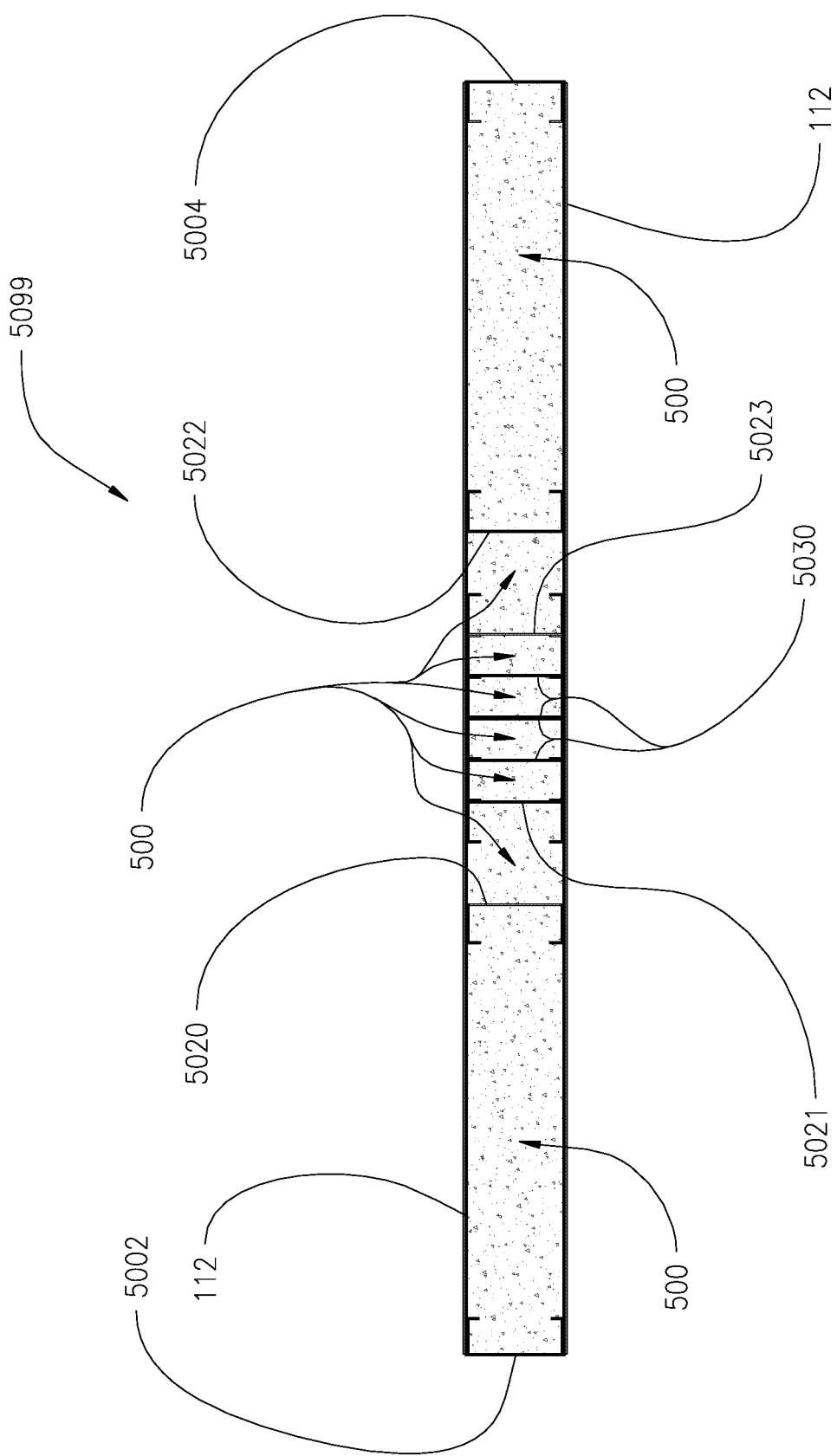
FIG. 59 is a cross-sectional view taken along line 59-59 in FIG. 58.
Figure 60:
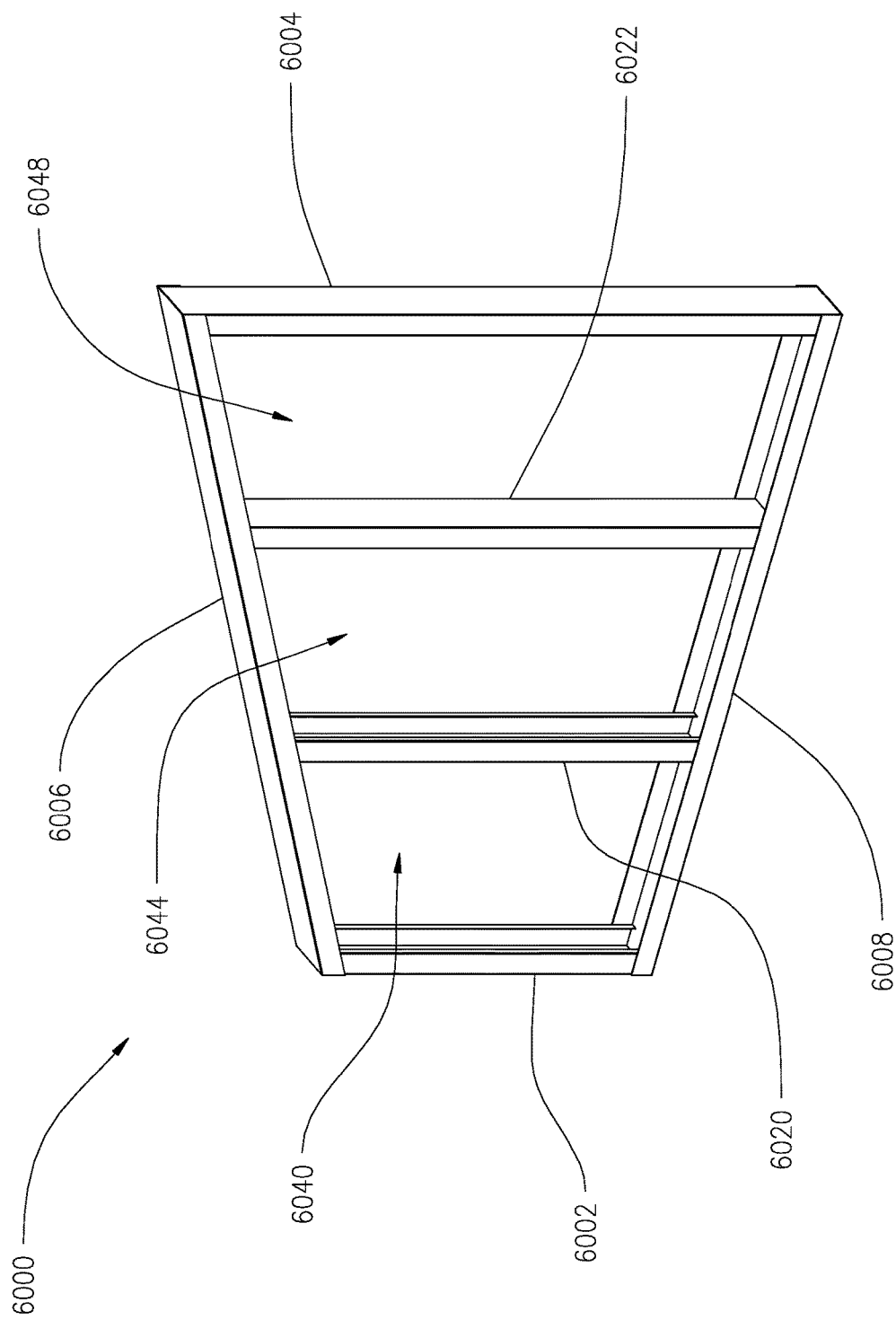
FIG. 60 is a perspective view of a frame, of a building panel according to another embodiment.
Figure 61:
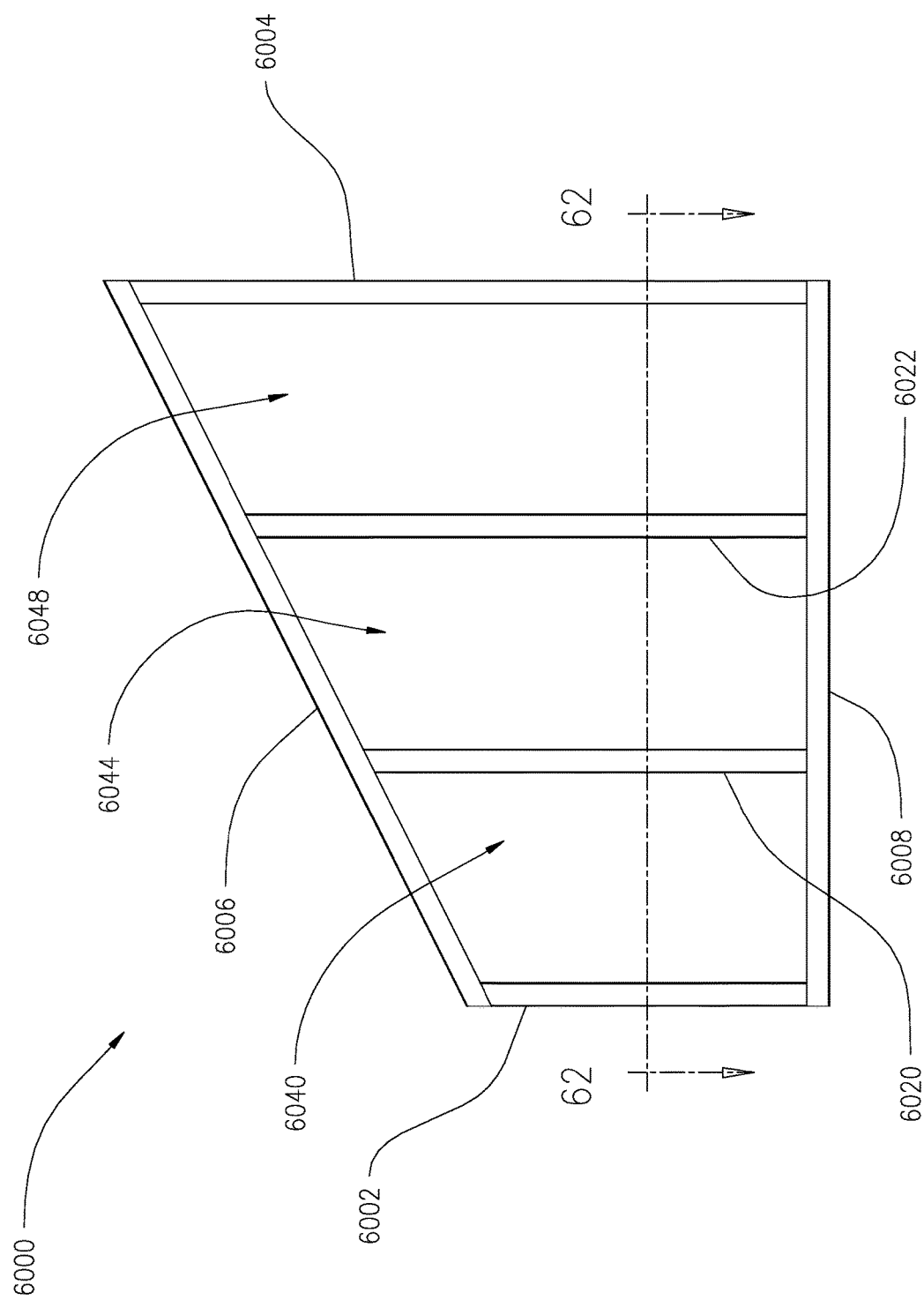
FIG. 61 is a front elevation view of the frame of FIG. 60.
Figure 62:
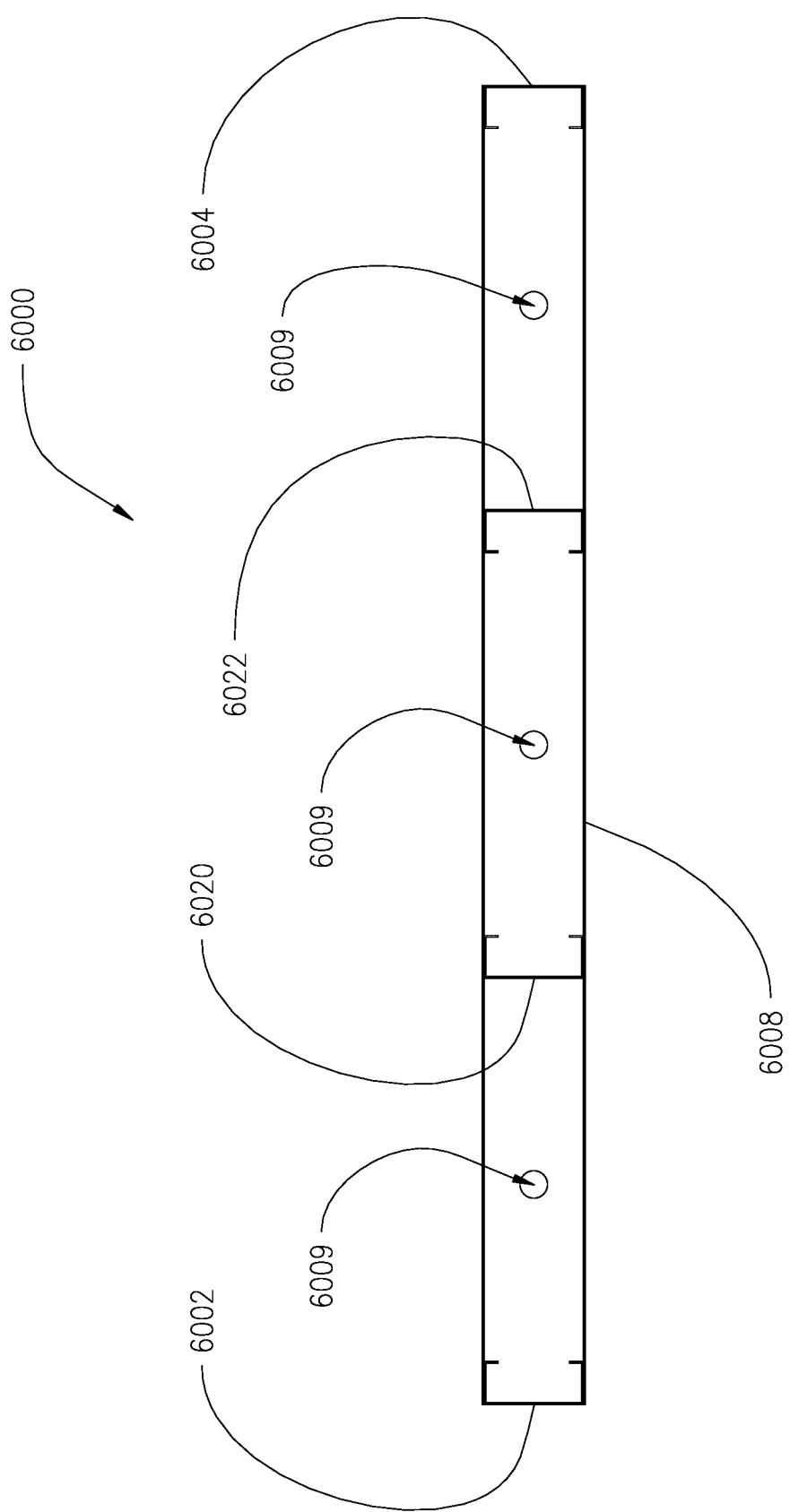
FIG. 62 is a cross-sectional view taken along line 62-62 in FIG. 61.
Figure 63:
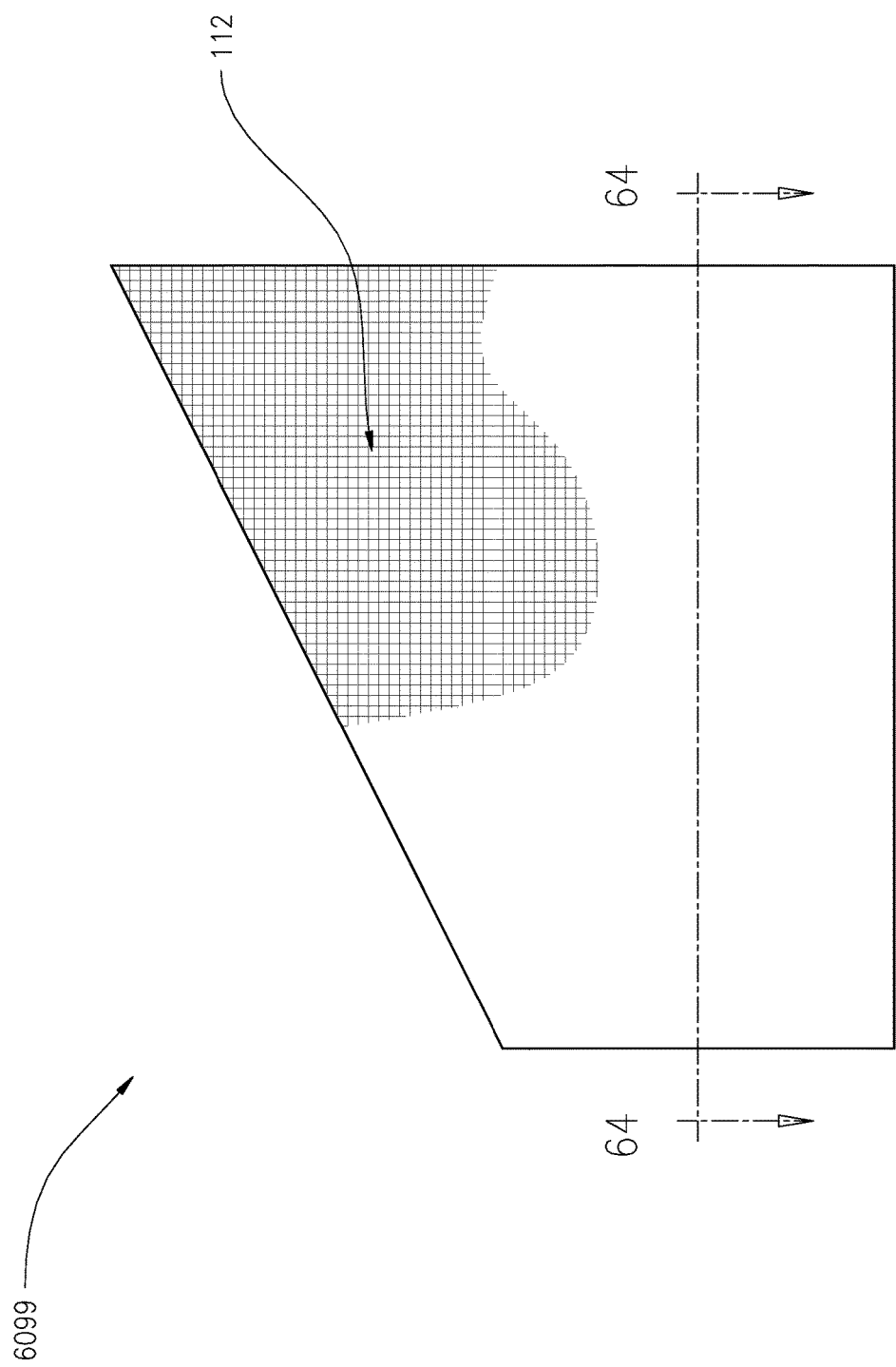
FIG. 63 is front elevation view of a building panel that includes the frame of FIG. 60.
Figure 66:
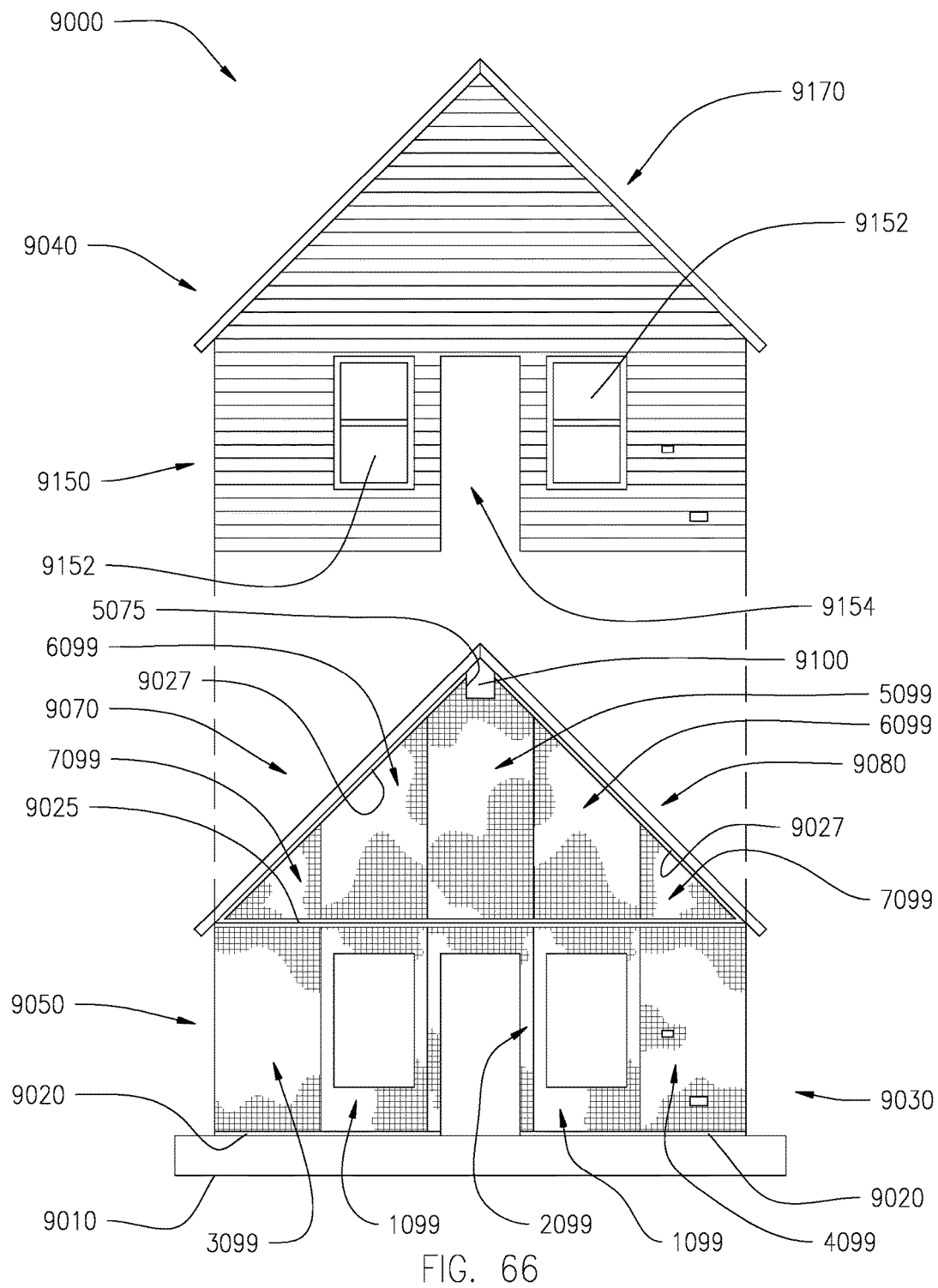
FIG. 66 is an exploded, front elevation view of a house.
Figure 67:
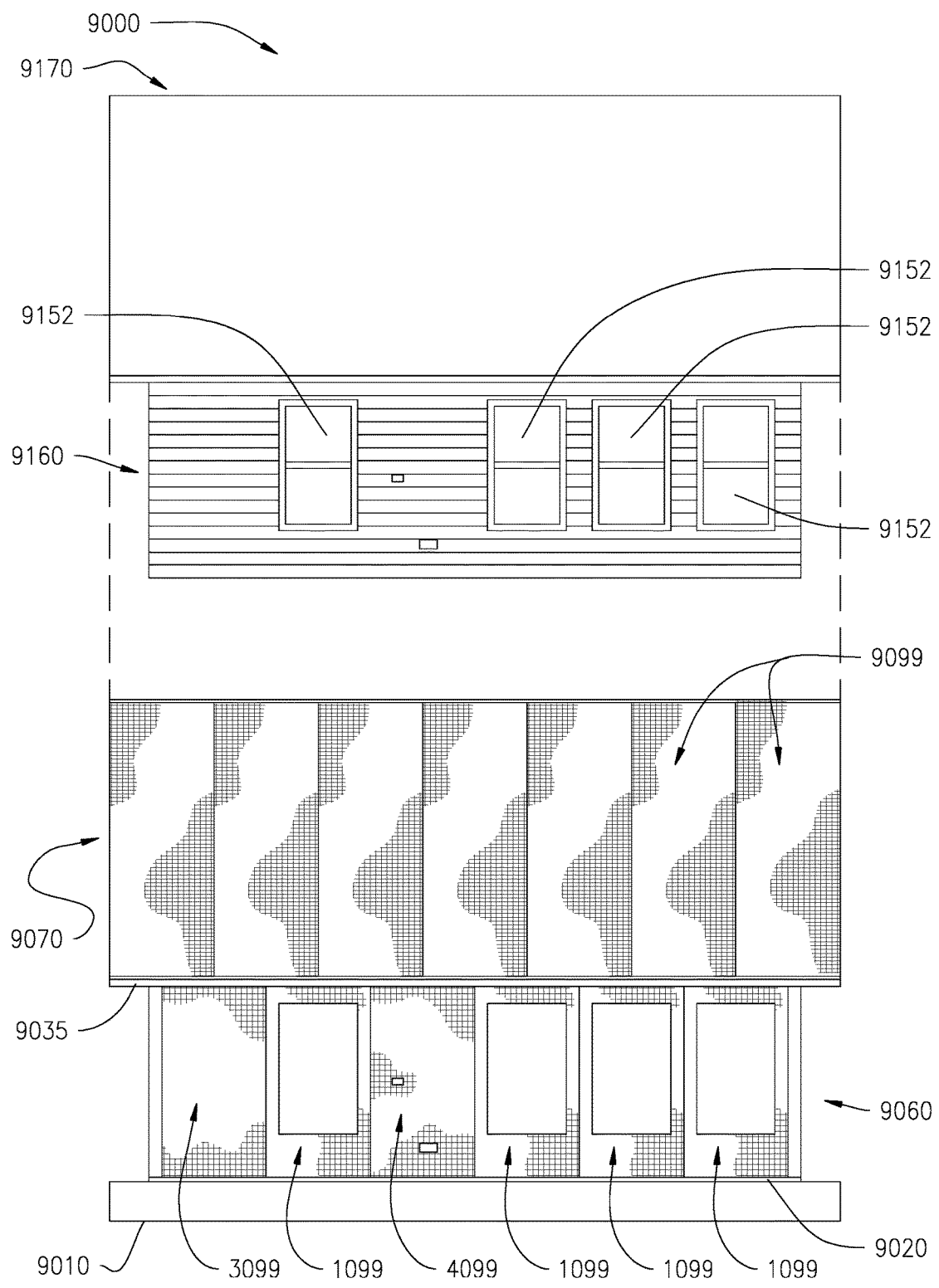
FIG. 67 is an exploded, side elevation view of a first side of the house of FIG. 66.

The first intermediate stud 5021, the second intermediate stud 5023, the first inclined top exterior track 5006*a*, the second inclined top exterior track 5006*b* and the horizontal top exterior track 5006*c* can cooperate to define a notch 5075. The notch 5075 can be shaped and sized to receive a ridge beam, e.g., ridge beam 9100 (FIG. 66), when the gable frame 5000 is installed on a structure, e.g., house 9000 (FIGS. 66 and 67). FIG. 59 illustrates the foam 500 which has formed in the cavities 5040, 5042, 5046, 5048, 5050, 5052, 5053 and 5054, as a result of injecting an expandable polymer through the injection apertures 5009 into each of these cavities.

Referring to FIGS. 60-64, gable panel 6099 can include a gable frame 6000 and can be used in conjunction with gable panel 5099, and one or more additional panels, e.g., gable panel 7099, to form a gable assembly, e.g., gable assembly 9080 (FIGS. 66 and 69) of house 9000. Frame 6000 can include a first side exterior stud 6002, a second side exterior stud 6004, a top exterior track 6006 and a bottom exterior track 6008. An upper end of the first side exterior stud 6002 and an upper end of the second side exterior stud 6004 can be attached to the top exterior track 6006. A bottom end of the first side exterior stud 6002 and a bottom end of the second side exterior stud 6004 can be attached to the bottom exterior track 6008. The frame 6000 can also include a first side interior stud 6020 and a second side interior stud 6022. An upper end of the first side interior stud 6020 and an upper end of the second side interior stud 6022 can be attached to the top exterior track 6006. A bottom end of the first side interior stud 6020 and a bottom end of the second side interior stud 6022 can be attached to the bottom exterior track 6008.

Figure 64:
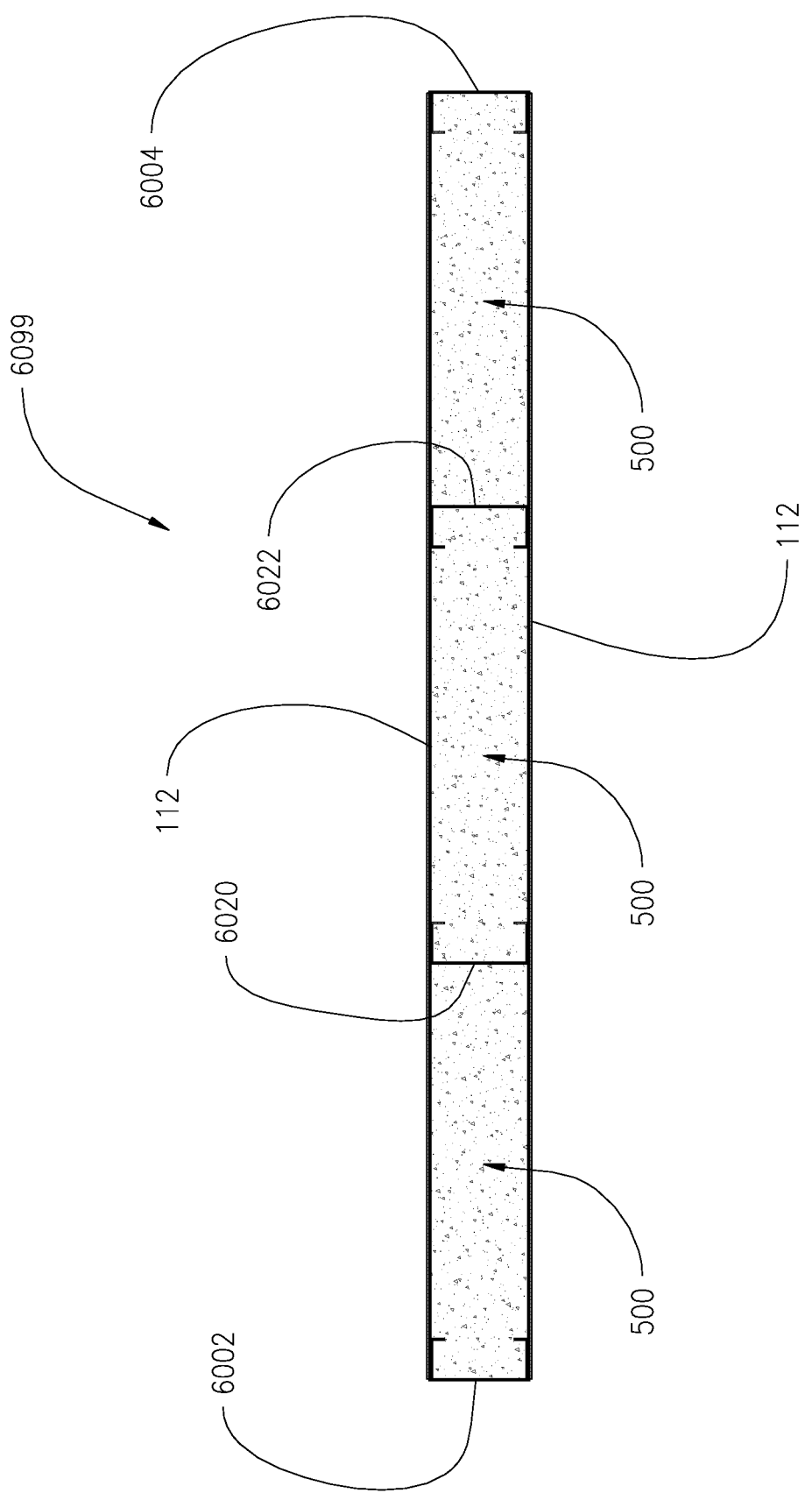
FIG. 64 is a cross-sectional view taken along line 64-64 in FIG. 63.

Gable frame 6000 can also define a plurality of cavities that can be filled with foam, e.g., foam 500. The gable frame 6000 can define cavities 6040, 6044 and 6048. The first side exterior stud 6002, the top exterior track 6006, the first side interior stud 6020 and the bottom exterior track 6008 can cooperate to define the cavity 6040. The first side interior stud 6020, the top exterior track 6006, the second side interior stud 6022 and the bottom exterior track 6008 can cooperate to define the cavity 6044. The second side interior stud 6022, the top exterior track 6006, the second side exterior stud 6004 and the bottom exterior track 6008 can cooperate to define the cavity 6048. The bottom exterior track 6008 can define a plurality of injection apertures 6009. FIG. 64 illustrates the foam 500 in the cavities 6040, 6044 and 6048.

FIG. 34 illustrates a specialty panel frame assembly fixture 14, according to one embodiment. The specialty panel frame assembly fixture 14 can be used to assemble the studs and tracks of frames of building panels that may not be conveniently or easily assembled, or that cannot be assembled, on the panel frame assembly fixture 12, due to the configurations and/or sizes of the frames of the building panels, e.g., a roof panel 9099 (FIGS. 66 and 67). Additionally, the specialty panel frame assembly fixture 14 can be used to assemble the studs and tracks of the frames of building panels that are part of an assembly of building panels to be subsequently attached to one another at a construction site.

The specialty panel frame assembly fixture 14 can include a plurality of support structures 514 (FIG. 34), which can be interlocking and self-leveling support structures. In one embodiment, each of the support structures 514 can be a table, as shown in FIG. 34. In one embodiment, the specialty panel frame assembly fixture 14 can include six support structures 514, which can be arranged in a first row 513*a* of three of the support structures 514 and a second row 513*b* of three of the support structures 514. Each of the support structures 514 can include a top 516, and a plurality of legs 518, which can be attached to the top 516 and extend downwardly from the top 516 to a surface which supports the specialty panel frame assembly fixture 14. The top 516 can include a plurality of longitudinally extending members, or beams, which can include a top surface 519, which can be planar. The top surfaces 519 of the longitudinally extending members can combine to form a top surface of the top 516 of each of the support structures 514.

FIG. 34 illustrates an arrangement 8000 of gable frames disposed on the top surfaces 519 of the tops 516 of several of the support structures 514 of the specialty panel frame assembly fixture 14. The arrangement 8000 can include one of the gable frames 5000, two of the gable frames 6000 and two gable frames 7000. As shown in FIG. 34, the gable frame 5000 can be the central one of the frames of the arrangement 8000. The gable frame 5000, the gable frames 6000 and the gable frames 7000 can be disposed in abutting relationship with one another, but not attached to one another. The studs and tracks of each of the frames 5000, 6000 and 7000 can be welded to one another while positioned on the top surfaces 519 of the tops 516 of the support structures 514. For example, the first side exterior stud 5002 of the frame 5000 can be attached, e.g., welded, to each of the bottom exterior track 5008 and the first inclined top exterior track 5006a, and the second side exterior stud 5004 of frame 5000 can be attached, e.g., welded, to each of the bottom exterior track 5008 and the second inclined top exterior track 5006b. As further examples, the second side exterior stud 6004 of frame 6000 can be attached, e.g., welded, to each of the bottom exterior track 6008 and the top exterior track 6006 of frame 6000. Also, the gable frame 7000 can include a first side exterior stud 7002, a top exterior track 7006 and a bottom exterior track 7008. The first side exterior stud 7002 can be attached, e.g., welded, to each of the top exterior track 7006 and the bottom exterior track 7008, while being supported on the specialty panel frame assembly fixture 14.

The arrangement 8000 of the gable frames 5000, 6000 and 7000 shown in FIG. 34 may not be attached to one another on the specialty panel frame assembly fixture 14. However, the use of the specialty panel frame assembly fixture 14 can enhance the quality of gable assemblies that can include gable frames 5000, 6000 and 7000, e.g. gable assembly 9080 (FIG. 66) of house 9000, which can include gable panels 5099, 6099 and 7099. For example, the first side exterior stud 7002 of each of the gable frames 7000 can be disposed adjacent to, and in contact with, the first side exterior stud 6002 of the adjacent one of the gable frames 6000. Also, as shown in FIG. 34, the second side exterior stud 6004 of one of the gable frames 6000 can be disposed adjacent to, and in contact with, the first side exterior stud 5002 of the gable frame 5000, and the second side exterior stud 6004 of the other one of the gable frames 6000 can be disposed adjacent to, and in contact with, the second side exterior stud 5004 of the gable frame 5000. The lengths of the studs of the gable frames 5000, 6000 and 7000, can be selected to achieve the desired size of the arrangement 8000, and to ensure that the bottom exterior track 5008 of gable frame 5000 is co-planar with the bottom exterior track 6008 of each of the gable frames 6000 and is co-planar with the bottom exterior track 7008 of each of the gable frames 7000. Additionally, the lengths of the studs of the gable frames 5000, 6000 and 7000 can be selected to ensure that the first inclined top exterior track 5006a of gable frame 5000 is co-planar with the top exterior track 6006 of the adjacent one of the gable frames 6000, and the top exterior track 7006 of one of the gable frames 7000. Also, the lengths of the studs of the gable frames 5000, 6000 and 7000 can be selected to ensure that the second inclined top exterior track 5006b of the gable frame 5000 is coplanar with the top exterior track 6006 of the adjacent one of the gable frames 6000, and the top exterior track 7006 of one of the gable frames 7000.

Figure 68:
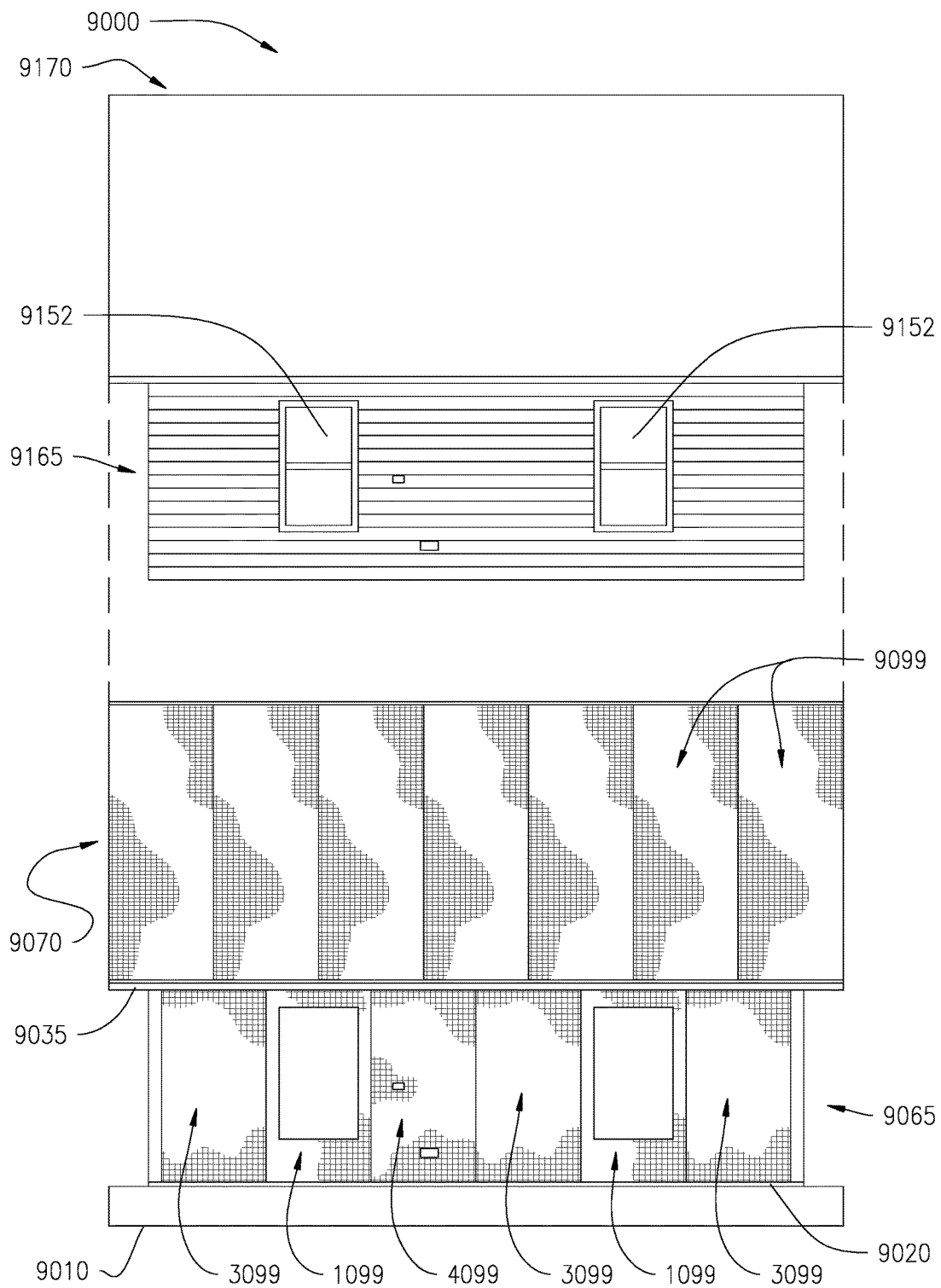
FIG. 68 is an exploded, side elevation view of a second side of the house of FIG. 66.

Specialty panel frame assembly fixture 14 can also be utilized to assemble the frames of relatively large building panels, for example ceiling panels, floor panels and roof panels, e.g., a roof panel 9099 (FIGS. 67 and 68). The length of the roof panel 9099 (e.g., twenty feet) can be significantly longer than the length of window panel 1099 or door panel 2009. A frame (not shown) of the roof panel 9099 can include a plurality of studs and tracks which can be attached to one another, e.g., welded, or attached with an epoxy, on the specialty panel frame assembly fixture 14. The tracks and studs can define a plurality of cavities. Each of the cavities can be in fluid communication with an injection aperture defined by the frame, which can permit an expandable polymer to be injected into each of the cavities. The fabric 112 can be applied to front and rear surfaces of the frame. In other embodiments, the fabric 112 can be omitted, which can be advantageous in the construction of certain houses having stucco exteriors, where it can be desirable to apply the stucco directly to the foam of the building panels. The length of the roof panel 9099 can be greater than the length of the multi-panel consolidation device 20. In this event, the frame of the roof panel 9099 can be positioned on a base or a shelf of a relatively longer multi-panel consolidation device, according to another embodiment (not shown), which can have a length that can be greater than, e.g., twice as long as, the length of the multi-panel consolidation device 20, but can otherwise be configured the same as or similar to, the multi-panel consolidation device 20. An expandable polymer can be injected into the cavities defined by the frame of the roof panel, with the shelves of the relatively longer multi-panel consolidation device in the collapsed configuration. The relatively longer multi-panel consolidation device can also be used to inject an expandable polymer, into cavities defined by the ceiling and/or floor panels. When cured, the expanded polymer can form an expanded foam, e.g., foam 500.

Figure 65:
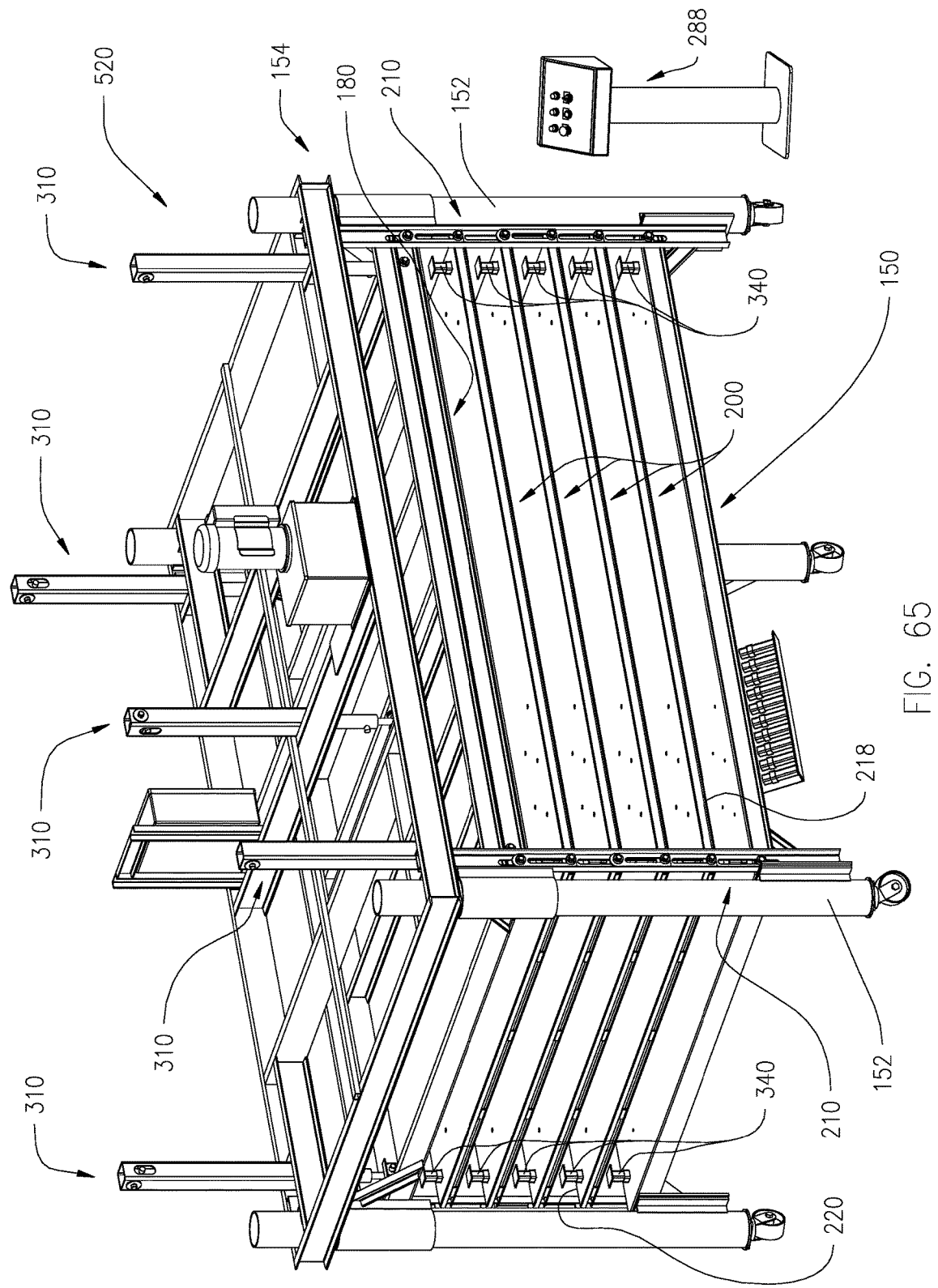
FIG. 65 is a perspective view of a multi-panel consolidation device according to another embodiment.

FIG. 65 illustrates a multi-panel consolidation device 520, according to another embodiment. The multi-panel consolidation device 520 can be wider than the multi-panel consolidation device 20, but can otherwise be the same as, or similar to, the multi-panel consolidation device 20. For example, like the multi-panel consolidation device 20, the multi-panel consolidation device 520 can include the base 150, the upper frame 154, a plurality of the posts 152 that can be attached to each of the base 150 and the upper frame 154, and can extend upwardly from the base 150. The multi-panel consolidation device 520 can also include the upper structure 180, which can be movably coupled with the posts 152, and a plurality of the shelves 200, which can be vertically spaced and disposed vertically between the base 150 and the upper structure 180. Like the multi-panel consolidation device 20, the multi-panel consolidation 520 can include a plurality of the link assemblies 210, and the shelves 200 can be connected to the upper structure 180 and can be interconnected with one another, with the link assemblies 210. The shelves 200 can be movable vertically between an expanded configuration (FIG. 65) and a collapsed configuration (not shown). A plurality of the spacers 340 can be connected to each one of the shelves 200. The multi-panel consolidation device 520 can also include the hydraulic system 280, which is shown schematically in FIG. 31, and which includes a plurality of the hydraulic cylinders 310, as shown in FIG. 65. The hydraulic cylinders 310 can be coupled with the upper structure 180, and can provide the motive force to move the upper structure 180 and the shelves 200 downwardly and upwardly. The hydraulic system 280 can include an operator console 288, which permits an operation to selectively move the upper structure 180 and the shelves 200 upwardly and downwardly.

The shelves 200 of the multi-panel consolidation device 20 can be 4 feet wide, or about 4 feet wide, as measured between the first side member 218 and the second side member 220 of each of the shelves 200. In contrast, the shelves 200 of the multi-panel consolidation device 520 can be 8 feet wide, or about 8 feet wide, as measured between the first side member 218 and the second side member 220 of each of the shelves 200. Similarly, the base 150 of the multi-panel consolidation device 520 can be 8 feet wide or about 8 feet wide. Accordingly, wider frames of building panels can be positioned on the base 150 and/or the shelves 200 of the multi-panel consolidation device 520, as compared to the size of the frames of building panels that can be positioned on the base 150 and/or on shelves 200 of the multi-panel consolidation device 20. For example, the frames of double window panels and the frames of double door panels, for example French doors or sliding doors, can be positioned on the shelves 200 of the multi-panel consolidation device 520. Also, two smaller building panels, which can each be 4 feet wide, for example, can be positioned side-by-side on the base 150 or on one of the shelves 200 of the multi-panel consolidation device 520. Each of the multi-panel consolidation device 20 and the multi-panel consolidation device 520 can accommodate frames of various lengths, for example, frames that are 8 feet, 9 feet or 10 feet long. In other embodiments, the shelves 200 of either one of the multi-panel consolidation devices 20 and 520 can include shelves having different widths and lengths.

FIGS. 66-69 illustrate a house 9000, which can include one or more of each of the following building panels: window panel 1099; door panel 2099; solid panel 3099; electrical panel 4099; gable panel 5099; gable panel 6099; gable panel 7099; and roof panel 9099. These building panels can also be used in various other structures, e.g., a variety of commercial buildings. The house 9000 can include a foundation 9010, which can be a concrete slab or another type of foundation, and a plurality of upwardly-facing, U-shaped tracks 9020 which can be attached to the concrete slab 9010. Each of the U-shaped tracks 9020 can define a cavity (not shown) which can be sized and shaped to receive the bottom exterior tracks of the frames of some of the building panels of house 9000, e.g., the bottom exterior track 1008 of the frame 1000 of the window panel 1099 and the bottom exterior track 2008 of the frame 2000 of the door panel 2099.

The house 9000 can include a structure 9030 that can include a front wall 9050 (FIG. 66), a first side wall 9060 (FIG. 67), a second side wall 9065 and a rear wall 9055 that can be interconnected. As shown in FIG. 66, the front wall 9050 can include one solid panel 3099, two window panels 1099, one door panel 2099 and one electrical panel 4099. The bottom exterior track of the frame of each of these panels, e.g., the bottom exterior track 1008 of frame 1000 of each panel 1099, the bottom exterior track 2008 of frame 2000 of panel 2099, the bottom exterior track 3008 of frame 3000 of panel 3099 and the bottom exterior track 4008 of frame 4000 of panel 4099, can be disposed in the cavity defined by one of the tracks 9020. The panels 1009, 2099, 3099 and 4099 can be attached to one another at the interface between each adjacent pair of the panels. For example, a first metal strap (not shown) can be used to attach the door panel 2099 to one of the adjacent window panels 1099, and a second metal strap (not shown) can be used to attach the door panel 2099 to the other adjacent window panel 1099. In addition to, or in lieu of, the metal straps, a foam can be sprayed into the interface between each adjacent pair of the panels to attach the panels to one another.

The house 9000 can include a pair of H-shaped track 9025, with one being associated with the front wall 9050 and one associated with the rear wall 9055. The H-shaped tracks 9025 can be formed by two U-shaped tracks attached to one another. Each track 9025 can define a first downwardly facing cavity and a second upwardly facing cavity. The track 9025 associated with the front wall 9050 can also be used to interconnect the window panels 1099, the door panel 2099, the solid panel 3099 and the electrical panel 4099 of the front wall 9050. For example, each of the following tracks can be disposed within the first downwardly facing cavity defined by the track 9025: the top exterior track 1006 of the frame 1000 of each of the window panels 1099; the top exterior track 2006 of the frame 2000 of the door panel 2099; the top exterior track 3006 of the frame 3000 of the solid panel 3099; and the top exterior track 4006 of the frame 4000 of the electrical panel 4099.

As shown in FIG. 67, the first side wall 9060 of structure 9030 can include four of the window panels 1099, one of the solid panels 3099 and one of the electrical panels 4099. Similar to the front wall 9050, the bottom track of each of these panels can be disposed within a cavity defined by one of the tracks 9020. Additionally, the panels 1099, 3099 and 4099 can be attached to one another with metal straps and/or with foam, similar to the attachment of adjacent panels of the front wall 9050. The house 9000 can also include a pair of H-shaped track 9035, which can be configured the same as, or similar to, the H-shaped track 9025, i.e., the track 9035 can define a first downwardly facing cavity and a second upwardly facing cavity. One of the tracks 9035 can be associated with the first side wall 9060 and one can be associated with the second side wall 9065. The top exterior track of the frame of each of the panels of the first side wall 9060, e.g., the top exterior track 1006 of the frame 1000 of each of the window panels 1099, of the first side wall 9060 can be disposed within the first downwardly facing cavity defined by the track 9035.

Figure 69:
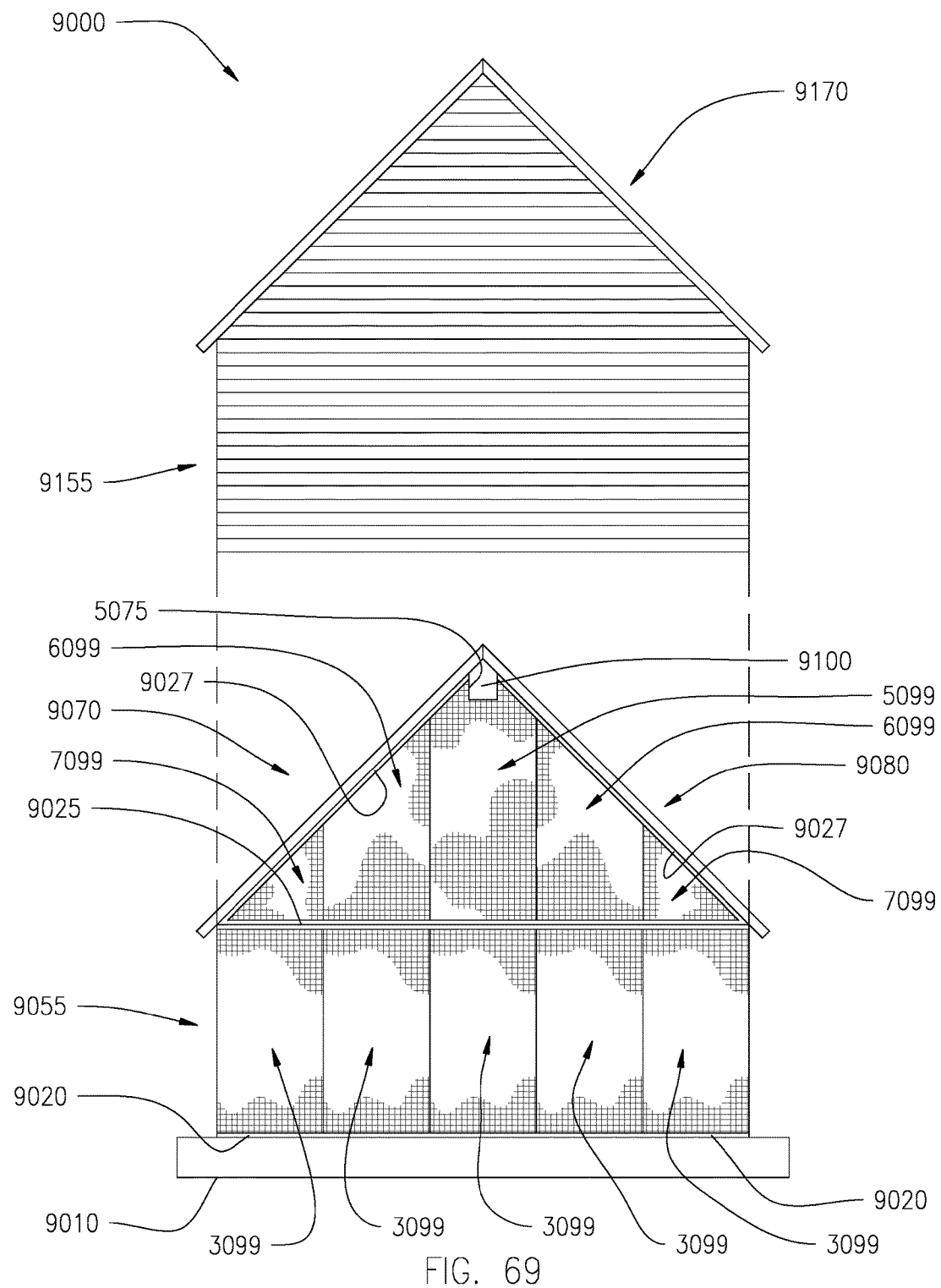
FIG. 69 is an exploded, rear elevation view of the house of FIG. 66.

Structure 9030 can also include a roof 9070. The roof 9070 can include first and second inclined sides, and each of the inclined sides can include a plurality of interconnected roof panels 9099, as shown in FIGS. 67 and 68. A bottom exterior track (not shown) of each of the roof panels 9099 on each side of roof 9070 (FIGS. 67 and 68) can be disposed within the upwardly facing cavity defined by one of the tracks 9035. Each of the roof panels 9099 can be interconnected, in the same manner that adjacent ones of the panels 1099, 2099, 3099 and 4099 can be interconnected to one another. The roof 9070 can also include a pair of gable assemblies 9080 (FIGS. 66 and 69). One of the gable assemblies 9080 can be disposed at each end of the roof 9070. One of the gable assemblies 9080 can be connected to the front wall 9050 and one of the gable assemblies 9080 can be connected to the rear wall 9055. As shown in FIGS. 66 and 69, each of the gable assemblies 9080 can include one of the gable panels 5099, two of the gable panels 6099, and two of the gable panels 7099. The bottom exterior track of the frame of each of these gable panels, e.g., the bottom exterior track 5008 of the frame 5000 of the gable panel 5099, can be disposed within the upwardly facing cavity defined by the track 9025.

The house 9000 can also include two pairs of H-shaped tracks 9027 with one pair associated with each of the gable assemblies 9080. Each one of the tracks 9027 can define a first, generally downwardly facing cavity and a second, generally upwardly facing cavity, with each being inclined relative to vertical. Each of the gable panels 7099, each of the gable panels 6099 and the gable panel 5099 of each gable assembly 9080 can be connected to the one of the tracks 9027. For example, for each of the gable assemblies 9080, the top exterior track 7006 of the frame of each gable panel 7099, the top exterior track 6006 of the frame 6000 of each gable panel 6099 and the first and second inclined top exterior tracks 5006a and 5006b, respectively, of the frame 5000 of the gable panel 5099, can be disposed within the generally downwardly facing cavity defined by one of the tracks 9027. The roof panels 9099 adjacent to each one of the gable assemblies 9080 can be connected to one of the tracks 9027. House 9000 can also include a ridge beam 9100 (FIGS. 66 and 69) that can be disposed in the notch 5075 defined by the gable panel 5099 of each of the gable assemblies 9080 (FIGS. 66 and 69). Ridge beam 9100 can extend the length of house 9000, between the two gable assemblies 9080, and can provide support for the roof 9070.

The house 9000 can also include an exterior structure 9040, which can be connected to the structure 9030. The exterior structure 9040 can include a front wall 9150, or façade, a first side wall 9160, a second side wall 9165, a rear wall 9155 and a roof 9170. Each wall can include siding, as shown in FIGS. 66-69, or can alternatively include a brick and/or stone exterior, for example. Each of the front wall 9150, the first side wall 9160 and the second side wall 9165 can include a plurality of windows 9152, and the front wall 9150 can define a door opening 9154. Each of the windows 9152 can be aligned with the opening 1060 defined by the frame 1000 of a respective one of the window panels 1099. The door opening 9154 can be aligned with the opening 2060 defined by the frame 2000 of the door panel 2099 which can be included in the front wall 9050 of the structure 9030.

The second side wall 9065 of the structure 9030 can include two of the window panels 1099, one electrical panel 4099, and three of the solid panels 3099. These panels can be connected to one of the tracks 9020 and one of the tracks 9035 in the same manner as the first side wall 9060 is connected to tracks 9020 and 9035. The rear wall 9055 can include five of the solid panels 3099, which can be connected to one of the tracks 9020 and one of tracks 9025 in the same manner as the front wall 9050 is connected to the tracks 9020 and 9025.

The use of system 10 and the associated method for manufacturing building panels, which can be used in residential and commercial structures, can result in various advantages that can include: the production of modular building panels which can be connected to one another in a variety of arrangements; the production of building panels having above, or greater than, industry-standard insulation characteristics, as well as fire-retardant characteristics, due to the metal frames (e.g., 1000) of the building panels (e.g., 1099) and the foam (e.g., 500) within cavities (e.g., 1040, 1042) defined by the frames (e.g., 1000); enhanced quality control of the building panels relative to conventional foam-filled building panels, e.g., a reduced dimensional tolerance of a thickness of the foam (e.g., 500) within the cavities (e.g., 1040, 1042) defined by an individual frame (e.g., 1000) of a building panel, and a reduced panel-to-panel dimensional variation of the thickness of the foam (e.g., 500); cost effective production of the building panels (e.g., 1099); and increased rate of production of the building panels (e.g., 1099).

The modular nature of the building panels (e.g., 1099, 2099, 3099, 4099, 5099, 6099 and 7099) provides flexibility in arranging the panels as required at a construction site, to accommodate various floor plans, e.g., floor plans of residential houses, e.g., house 9000, and to assemble the panels in an efficient manner. For example, the building panels to be used for a particular structure can be manufactured with the same thickness of the studs (e.g., 1002, 1020; 2002, 2020) and tracks (e.g., 1006, 1024; 2006, 2024) of the frames (e.g., 1000 and 2000), the building panels (e.g., 1099, 2099), and with the same length of the exterior studs (e.g., 1002, 1004; 2002, 2004) that form a portion of a periphery of the frames (e.g., 1000, 2000) of the building panels (e.g., 1099, 2099) so that the building panels can be positioned adjacent one another. For example, the window panel 1099 can be positioned adjacent to the door panel 2099, and either one of the window panel 1099 and the door panel 2099 can be positioned adjacent to a solid panel 3099. As another example, the gable panel 6099 can be positioned adjacent to each of the gable panels 5099 and 7099, e.g., which can be arranged to produce gable assemblies 9080.

The foam (e.g., 500) disposed within the cavities (e.g., 1040, 1042) of the building frames (e.g., 1099) can provide above industry-standard insulation R-values, as well as fire retardant characteristics, which can be advantageous relative to homes constructed with wooden frames, for example. Expansion of an expandable polymer, to form an expanded foam, e.g., foam 500, during the curing process, and can result in a significant force being exerted on a structure surrounding the foam, e.g., frame 1000. The use of a multi-panel consolidation device (e.g., 20, 520) to constrain the building panels (e.g., 1099) during the process of filling the cavities (e.g., 1040, 1042) with foam (e.g., 500) can counteract the force exerted by the expandable polymer during expansion and can permit a reduced dimensional tolerance, relative to a nominal value, of a foam thickness, e.g., F. of the expanded foam, e.g., foam 500. A base (e.g., 150) and each one of a plurality of shelves (e.g., 200) of a multi-panel consolidation device (e.g., 20, 520) can support one or more building panels (e.g., 1099) during the process of filling the cavities (e.g., 1040, 1042) defined by the frames (e.g., 1000) of the building panels (e.g., 1099) with foam (e.g., 500). The building panels (e.g., 1099) can be positioned on the base (e.g., 150) or one of the shelves (e.g., 200) of the multi-panel consolidation device (e.g., 20, 520) when the shelves are in an expanded configuration. After the building panels (e.g., 1099) have been positioned on either the base (e.g., 150) or one of the shelves (e.g., 200), the shelves can be forced downwardly by a plurality of hydraulic cylinders (e.g., 310) of a hydraulic system (e.g., 280) to a collapsed configuration of the shelves. Use of the multi-panel consolidation device 20 can enhance the rate of production of building panels, e.g., 1099, as an operator can start injecting an expandable polymer into one or more additional cavities while the expandable polymer within the first cavity is curing, i.e., forming an expanded foam, e.g., foam 500.

When the shelves (e.g., 200) are in the collapsed configuration, a lower surface (e.g., 202) of one of the shelves (e.g., 200) or a lower surface (e.g., 181) of an upper structure (e.g., 180) can apply a compressive force to the frame (e.g., 1000) of the building panel (e.g., 1099), and a contact surface (e.g., 354) of the associated spacers (e.g., 340). This can constrain each of the building panels (e.g., 1099) vertically between a pair of the shelves (e.g., 200) or between one of the shelves (e.g., 200) and either the base (e.g., 150), or the upper structure (e.g., 180), and the combined extend thrust of the hydraulic cylinders (e.g., 310) can prevent, or at least substantially prevent, the foam (e.g., 500) from expanding beyond either the front surface or the rear surface of the frame (e.g., 1000) of the building panel (e.g., 1099). Also, injecting an expandable polymer into each cavity for a predetermined period of time, can prevent, or at least substantially prevent, "over-filling" or "under-filling" the cavities with the expandable polymer. Consequently, the building panels (e.g., 1099) can be manufactured with a reduced variation, or tolerance, of the thickness of the foam (e.g., 500), for each building panel (e.g., 1099), and a reduced variation in the thickness of the foam (e.g., 500) from panel-to-panel, relative to conventional foam-filled building panels. This can result in a more consistent insulation R-value throughout the panel, as compared to conventional foam-filled panels, and can provide a uniform, smooth surface for the application of interior dry wall or exterior finishes. In contrast some conventional panels exhibit a bulge which at least inhibits proper application of dry wall or exterior finishes. A plurality of spacers (e.g., 340) can be placed on the base (e.g., 150) and each of the spacers (e.g., 340) can have a height, e.g., 356, which can be the same as a thickness, e.g., S, of the studs of the frame, e.g., 1000, which can prevent the studs of the frame (e.g., 1000) of the building panels (e.g., 1099) from being deformed, i.e. crushed, when the shelves (e.g., 200) are in the collapsed configuration.

The tracks (e.g., 1008) of the frame (e.g., 1000) of the building panel (e.g., 1099) can define a plurality of injection apertures (e.g., 1009). Each of the injection apertures (e.g., 1009) can be in fluid communication with one of the cavities (e.g., 1040, 1042) of the frame (e.g., 1000) of the building panel (e.g., 1099), and the injection apertures (e.g., 1009) can be positioned adjacent to an open end of the multi-panel consolidation device (e.g., 20, 520). This can permit an expandable polymer, in a liquid state, to be injected through the injection apertures (e.g., 1009) into the cavities (e.g., 1040, 1042) while the frames for (e.g., 1000) are vertically constrained by the multi-panel consolidation device (e.g., 20, 520). The expandable polymer can form an expanded foam, e.g., foam 500.

The multi-panel consolidation device (e.g., 20, 520) can accommodate a plurality of building panels, which can be the same or can be a mixture of different building panels. The cavities of each of the building panels can be filled with foam, without raising the shelves to an expanded configuration and removing the building panels. This enhances the rate of production of manufacturing building panels. Also, when the expandable polymer, which forms a foam, e.g., foam 500, that has been injected into one of the cavities (e.g., 1040) defined by the frame (e.g., 1000) of the building panel (e.g., 1099) is curing, an expandable polymer can be injected into another cavity (e.g., 1042), which can also enhance the rate of production of manufacturing building panels. The spacers (e.g., 340) can be releasably attached to either the base (e.g., 150) or one of the shelves (e.g., 200) of the multi-panel consolidation device, and sets of spacers (e.g., 340) can be provided that have different heights (e.g., 356), and each height can correspond with a standard thickness of the studs of a frame of a building panel. This can reduce the time required to reconfigure the multi-panel consolidation device (e.g., 20, 520) to receive building panels having different configurations.

The use of panel positioning members (e.g., 205) can enhance the rate of production by facilitating positioning the frames (e.g., 1000) on a multi-panel consolidation device (e.g., 20). The rate of producing the building panels (e.g., 1099) can also be enhanced, or increased, as a result of the following: the open configuration of the panel frame assembly fixture 12, which permits a welder to reach in through the open space to weld a back side of a joint between a stud and a track of a building frame; the ability to produce studs and tracks that are perpendicular to one another due to the configuration of the first and second side frames of the panel frame assembly fixture (e.g., 12); the use of trolleys (e.g., 64) to conveniently position a welding machine, e.g., a spot welder; and the ability of a multi-panel consolidation device (e.g., 20, 520) to support building panels having different lengths and/or widths.

While various embodiments of a method and apparatus for manufacturing building panels have been illustrated by the foregoing description and have been described in considerable detail, it is not intended to restrict or in any way limit the scope of the appended claims to such detail. Additional advantages and modifications will be readily apparent to those skilled in the art.

What is claimed is:

1. A method of manufacturing building panels, the method comprising:
    assembling a frame of a building panel, the frame defining at least one cavity and at least one injection aperture in fluid communication with the at least one cavity;
    positioning the frame on one of a base and a shelf of a multi-panel consolidation device, which comprises a plurality of shelves, with the shelves being in an expanded configuration;
    forcing the shelves of the multi-panel consolidation device into a collapsed configuration;
    injecting an expandable polymer through the at least one injection aperture into the at least one cavity; and
    forcing the shelves of the multi-panel consolidation device into an expanded configuration after a predetermined period of time selected to permit the expandable polymer to form a stable expanded foam within the at least one cavity and bonded to the frame; wherein the forcing the shelves of the multi-panel consolidation device into a collapsed configuration comprises:
    applying a compressive force to the frame; and
    constraining expansion of the expandable polymer.

2. The method of claim 1, wherein:
    the injecting further comprises injecting the expandable polymer for a predetermined period of time, the predetermined period of time being determined in part by a volume of the at least one cavity.

3. The method of claim 2, wherein:
    the applying a compressive force to the frame, the constraining expansion of the expandable polymer, and the injecting an expandable polymer for a predetermined period of time cooperate to limit a variation in a thickness of the foam from about minus 0.0625 inches to about plus 0.0625 inches.

4. The method of claim 1, wherein the frame defines a plurality of the cavities and a plurality of the injection apertures, each of the cavities being in fluid communication with a respective one of the injection apertures, wherein:
    the injecting the expandable polymer further comprises a plurality of separate injections, each of the separate injections being through one of the injection apertures into a respective one of the cavities.

5. The method of claim 4, further comprising:
    covering each of the cavities, wherein the covering comprises:
    bonding at least one piece of fabric to a front surface of the frame; and
    bonding at least one piece of fabric to a rear surface of the frame.

6. The method of claim 4, wherein the multi-panel consolidation device further comprises an upper structure and a plurality of link assemblies, the method further comprising:
    interconnecting the shelves with one another and with the upper structure, with the link assemblies; wherein the upper structure and each of the shelves are vertically movable downwardly and upwardly between the expanded configuration and the collapsed configuration.

7. The method of claim 6, wherein:
the upper structure, the plurality of shelves and the base of the multi-panel consolidation device cooperate to at least partially define a plurality of spaces; and
the positioning the frame comprises positioning the frame of a building panel on one of the base and the shelf, in a respective one of the spaces.

8. The method of claim 7, wherein the frame comprises a plurality of studs and a plurality of tracks attached to one another, the method further comprising:
limiting a downward movement of the upper structure and each of the shelves, the limiting a downward movement comprising:
releasably connecting a plurality of spacers to the base and each one of the shelves; and
sizing each of the spacers to have a height equal to a thickness of the studs of the frame positioned on the one of the shelves and the base to which the spacer is releasably connected.

9. The method of claim 6, wherein the multi-panel consolidation device further comprises a hydraulic system, the hydraulic system comprising a plurality of hydraulic cylinders, each of the hydraulic cylinders comprising a piston and a piston rod attached to the piston, each of the piston rods being coupled with the upper structure, wherein:
the forcing the shelves into the collapsed configuration further comprises extending the piston rod of each of the hydraulic cylinders; and
the forcing the shelves into the expanded configuration further comprises retracting the piston rod of each of the hydraulic cylinders.

10. The method of claim 1, wherein the frame of the building panel comprises a plurality of studs and a plurality of tracks, and the assembling a frame comprises:
selecting a template defining a plurality of apertures arranged in a pattern to facilitate assembling the studs and the tracks of the frame of the building panel;
positioning the template on a panel frame assembly fixture comprising a plurality of receptacles;
aligning each of the apertures defined by the template with a respective one of the receptacles of the panel frame assembly fixture;
inserting one of a plurality of pegs through each one of the apertures and into an aligned one of the receptacles;
removing the template;
supporting each one of at least some of the studs of the frame with at least one of the pegs; and
attaching the studs and the tracks of the frame to one another.

11. The method of claim 1, further comprising:
plugging the at least one injection aperture with a plug after the injecting the expandable polymer;
removing the plug after the predetermined period of time; and
removing the building panel from the multi-panel consolidation device after forcing the shelves of the multi-panel consolidation device into the expanded configuration.

12. The method of claim 1, further comprising:
covering the at least one cavity;
repeating assembling the frame, positioning the frame and the covering the at least one cavity, for a plurality of frames of building panels prior to forcing the shelves of the multi-panel consolidation device into the collapsed configuration; and
repeating the injecting the expandable polymer, for each of the frames, after the forcing the shelves of the multi-panel consolidation device into the collapsed configuration.

13. The method of claim 1, further comprising:
covering the at least one cavity with a fabric, the fabric comprising a woven polymeric material.

14. The method of claim 1, further comprising:
covering the at least one cavity with a fabric, the fabric comprising a non-woven polymeric material.

15. The method of claim 1, wherein the frame comprises a top exterior track, a bottom exterior track, a first side exterior stud and a second side exterior stud, each of the top exterior track and the bottom exterior track being generally U-shaped and defining a U-shaped cavity, wherein the assembling comprises inserting a first end of the first side exterior stud and a first end of the second side exterior stud into the cavity defined by the bottom exterior track, and inserting a second end of the first side exterior stud and a second end of the second side exterior stud into the cavity defined by the top exterior track.

16. A method for making a foam-filled building panel, comprising:
providing a frame having a periphery that includes a front peripheral frame surface and a rear peripheral frame surface, the frame defining a cavity, the front frame surface defining a front opening and the rear frame surface defining a rear opening, where the frame has a thickness defined between the front peripheral frame surface and the rear peripheral frame surface;
providing a top planar shelf having a lower surface, and a bottom planar shelf having an upper surface;
providing a plurality of spacers, each having an upper surface and a lower surface, and a height defined between the upper surface and the lower surface, and placing the lower surfaces of the plurality of spacers against the upper surface of the bottom planar shelf at spaced-apart positions, where the heights of the plurality of spacers are the same as the thickness of the frame;
placing the lower surface of the top planar shelf over and in contact with the front peripheral frame surface to close completely the front opening, and the upper surface of the bottom planar shelf over and in contact with the rear peripheral frame surface to close completely the rear frame opening;
applying a first force against the top planar shelf and a second force against the bottom planar shelf;
injecting an amount of an expandable polymer through an aperture in the frame into the cavity, and closing the aperture;
maintaining the applied forces for a time sufficient for the expandable polymer to expand and fill the cavity, and to form a stable expanded foam; and
releasing the first and second forces and removing the top and bottom planar shelves from the front and rear frame surfaces to form the foam-filled building panel;
wherein: the applied first force and applied second force are sufficient to maintain the top and bottom planar shelves in contact with the front peripheral frame surface and the rear peripheral frame surface of the frame while the expandable polymer is expanding and filling the cavity, the top planar shelf and the bottom planar shelf have a rigidity sufficient to maintain planarity against the applied first and second forces and an expanding force of the expandable polymer, and wherein lower surface of the top planar shelf contacts the upper surfaces of the plurality of spacers, whereby the plurality of spacers define a minimum distance between the top planar shelf and the bottom planar shelf during the application of the applied force to limit crushing of the frame beyond such minimum distance.

17. The method of claim 16, further comprising:
covering the cavity with a fabric, the fabric comprising at least one of a woven polymeric material and a non-woven polymeric material, and wherein the covering comprises:
bonding at least one piece of the fabric to the front frame surface; and
bonding at least one piece of the fabric to the rear frame surface.

18. The method of claim 16, wherein the first force and second force are applied by one or more hydraulic cylinders.

19. The method of claim 16, wherein the frame comprises a plurality of studs and a plurality of tracks attached to one another, wherein where the heights of the plurality of spacers are the same as a thickness of the studs.

20. The method of claim 19, wherein the plurality of tracks includes a top exterior track and a bottom exterior track, each being generally U-shaped and defining a U-shaped cavity, the plurality of studs includes a first side exterior stud and a second side exterior stud, wherein a first end of the first side exterior stud and a first end of the second side exterior stud are disposed in the cavity defined by the bottom exterior track, and a second end of the first side exterior stud and a second end of the second side exterior stud are disposed in the cavity defined by the top exterior track.

* * * * *